(12) United States Patent
Morrison et al.

(10) Patent No.: US 12,299,252 B2
(45) Date of Patent: May 13, 2025

(54) SYSTEMS AND METHODS FOR COORDINATING OPERATION OF A HEAD-WEARABLE DEVICE AND AN ELECTRONIC DEVICE TO ASSIST A USER IN INTERACTING WITH THE ELECTRONIC DEVICE

(71) Applicant: Meta Platforms Technologies, LLC, Menlo Park, CA (US)

(72) Inventors: Andrew Morrison, Kirkland, WA (US); Willy Huang, San Francisco, CA (US); Jonathan Lim, Oakland, CA (US); Szeyin Lee, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/330,310

(22) Filed: Jun. 6, 2023

(65) Prior Publication Data

US 2023/0400958 A1 Dec. 14, 2023

Related U.S. Application Data

(60) Provisional application No. 63/351,320, filed on Jun. 10, 2022.

(51) Int. Cl.
*G06F 3/04815* (2022.01)
*G02B 27/01* (2006.01)
(Continued)

(52) U.S. Cl.
CPC ..... *G06F 3/04815* (2013.01); *G02B 27/0172* (2013.01); *G02B 27/0179* (2013.01);
(Continued)

(58) Field of Classification Search
CPC ...... G02B 2027/014; G02B 2027/0141; G02B 2027/0178; G02B 2027/0187;
(Continued)

(56) References Cited

U.S. PATENT DOCUMENTS

| 5,813,990 A | 9/1998 | Ryll |
| 7,376,238 B1 | 5/2008 | Rivas et al. |

(Continued)

FOREIGN PATENT DOCUMENTS

| CN | 104834106 A | 8/2015 |
| CN | 215603765 U | 1/2022 |
| KR | 20080029394 A | 4/2008 |

OTHER PUBLICATIONS

International Preliminary Report on Patentability for International Application No. PCT/US2023/021916, mailed Nov. 21, 2024, 9 pages.

(Continued)

*Primary Examiner* — Dmitriy Bolotin
(74) *Attorney, Agent, or Firm* — Morgan, Lewis & Bockius LLP

(57) ABSTRACT

Methods and systems for coordinating operation of a head-wearable device and an electronic device to assist a user in interacting with the electronic device are disclosed. A method includes, while a user interface is displayed on a display of an electronic device associated with a user, receiving sensor data from one or more sensors of the electronic device or from a head-wearable device worn by the user that is in communication with the electronic device. The method includes determining, based at least in part on the sensor data from the one or more sensors, whether an augmented-display criterion is satisfied for the electronic device, and, in accordance with a determination that the augmented-display criterion is satisfied, causing presenta- (Continued)

tion, via a display of the head-wearable device, of an augmented representation of the user interface.

20 Claims, 34 Drawing Sheets

(51) Int. Cl.
*G06F 3/01* (2006.01)
*G06F 3/04842* (2022.01)
*G06F 3/04883* (2022.01)
*G06F 3/14* (2006.01)

(52) U.S. Cl.
CPC .............. *G06F 3/015* (2013.01); *G06F 3/017* (2013.01); *G06F 3/04842* (2013.01); *G06F 3/04883* (2013.01); *G06F 3/1423* (2013.01); *G02B 2027/014* (2013.01); *G02B 2027/0141* (2013.01); *G02B 2027/0178* (2013.01); *G02B 2027/0187* (2013.01)

(58) Field of Classification Search
CPC .............. G02B 27/017; G02B 27/0172; G02B 27/0179; G06F 1/163; G06F 3/011; G06F 3/015; G06F 3/017; G06F 3/04815; G06F 3/04842; G06F 3/04883; G06F 3/14; G06F 3/1423
See application file for complete search history.

(56) References Cited

U.S. PATENT DOCUMENTS

| | | | |
|---|---|---|---|
| 8,604,923 | B1 | 12/2013 | Rivas Alvarez |
| 11,340,460 | B2* | 5/2022 | Muldoon ............ G02B 27/0172 |
| 11,567,329 | B2* | 1/2023 | Muldoon ............... G06F 3/0488 |
| 2006/0226991 | A1 | 10/2006 | Rivas |
| 2014/0055352 | A1* | 2/2014 | Davis ...................... G06F 3/014 345/156 |
| 2014/0278229 | A1 | 9/2014 | Hong et al. |
| 2015/0258431 | A1* | 9/2015 | Stafford .................. G06F 3/014 463/31 |
| 2015/0258432 | A1* | 9/2015 | Stafford ............... A63F 13/426 463/32 |
| 2016/0223578 | A1 | 8/2016 | Klosinski, Jr. et al. |
| 2017/0046503 | A1 | 2/2017 | Cho et al. |
| 2017/0365097 | A1* | 12/2017 | Lim ..................... G06F 3/04817 |
| 2018/0088687 | A1 | 3/2018 | Hanover |
| 2018/0246348 | A1 | 8/2018 | Shiratori |
| 2019/0009168 | A1 | 1/2019 | Aman et al. |
| 2019/0065026 | A1* | 2/2019 | Kiemele ................. A63F 13/92 |
| 2019/0286224 | A1 | 9/2019 | De Nardi et al. |
| 2021/0356743 | A1* | 11/2021 | Muldoon .............. G06F 3/0304 |
| 2023/0329636 | A1 | 10/2023 | Ramp et al. |

OTHER PUBLICATIONS

International Search Report and Written Opinion for International Application No. PCT/US2023/021916, mailed Aug. 9, 2023, 12 pages.

* cited by examiner

SYSTEMS AND METHODS FOR COORDINATING OPERATION OF A HEAD-WEARABLE DEVICE AND AN ELECTRONIC DEVICE TO ASSIST A USER IN INTERACTING WITH THE ELECTRONIC DEVICE

CROSS-REFERENCE TO RELATED APPLICATIONS

This application claims priority to U.S. Prov. App. No. 63/351,320, filed on Jun. 10, 2022, and entitled "Systems And Methods For Coordinating Operation Of A Head-Wearable Device And An Electronic Device To Assist A User In Interacting With The Electronic Device," which is incorporated herein by reference.

TECHNICAL FIELD

This application relates generally to presenting information to a user via a head-wearable device, more particularly, to presenting and facilitating interaction with augmented representations of user interfaces displayed at an electronic device, such as a wrist-wearable device.

BACKGROUND

Wearable devices and/or portable electronic devices have smaller displays due to design constraints and user convenience. The smaller displays limit the amount of information that can be presented to a user. To access information on the wearable devices and/or the portable electronic devices a user is typically required to provide several inputs to navigate through different user interfaces contain the requested information. Additionally, information presented to a user through the smaller displays can be minimized or downscaled, which makes it difficult for users to read and use the presented information. The limited capabilities of the displays of the wearable devices and/or portable electronic devices take away from a user's experience and force the user to constantly interact with the devices.

As such, there is a need for wearable devices (and systems including multiple wearable devices) that coordinate their operations to allow for more accurate and precise sustained user interactions, thereby improving the man-machine interfaces for wearable device systems and, in some instances, doing so without requiring the user to manually initiate the coordination between devices.

SUMMARY

To avoid one or more of the drawbacks or challenges discussed above, a head-wearable device worn by a user present an augmented representation of a user interface associated with an electronic device. In particular, while a user interface is displayed on a display of an electronic device associated with a user (e.g., a wrist-wearable device), sensor data from one or more sensors of the electronic device or from the head-wearable device that is in communication with the electronic device is collected and used to determine whether an augmented-display criterion for the electronic device is satisfied. In accordance with a determination that the augmented-display criterion for the electronic device is satisfied, the head-wearable device presents, via its display, an augmented representation of the user interface. The augmented representation of the user interface includes at least one visual characteristic that was not present in the user interface displayed on the electronic device. The augmented representation of the user interface can be overlaid over the display of the electronic device and can be upscaled or include additional user interface elements that were not present in the user interface presented by the electronic device. Further, the head-wearable device allows for the user to provide one or more inputs via the presented augmented representation of the user interface. For example, the user can open one or more applications and perform one or more actions specific to the application via the augmented representation of the user interfaces.

The augmented representation of the user interface presented by the head-wearable device provides users larger user interface elements that makes it easier for users to use their wearable devices and/or portable devices. In some embodiments, the augmented representation of the user interface includes additional user interface elements that allow the user to perform additional actions that were not possible or hard to access with their wearable devices and/or portable devices. Further, in some embodiments, the augmented representation of the user interface can be presented as an additional display that can be used to improve a user's productivity (e.g., by allowing the user to multitask or display additional information across a number of displays). Additional examples and advantages of the presented augmented representation of the user interface are provided below.

The head-wearable device 110 can be used in real-world environments and/or in artificial reality (AR) environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. For example, the head-wearable device 110 can provide augmented representations of user interfaces displayed on electronic devices.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

In accordance with common practice, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

Embodiments of this disclosure can include or be implemented in conjunction with various types or embodiments of artificial-reality systems. Artificial-reality, as described herein, is any superimposed functionality and or sensory-detectable presentation provided by an artificial-reality system within a user's physical surroundings. Such artificial-realities (AR) can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. In some embodiments of an AR system, ambient light (e.g., a live feed of the surrounding environment that a user would normally see) can be passed through a display element of a respective head-wearable device presenting aspects of the AR system. In some embodiments, ambient light can be passed through respective aspect of the AR system. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

Figure 1A:
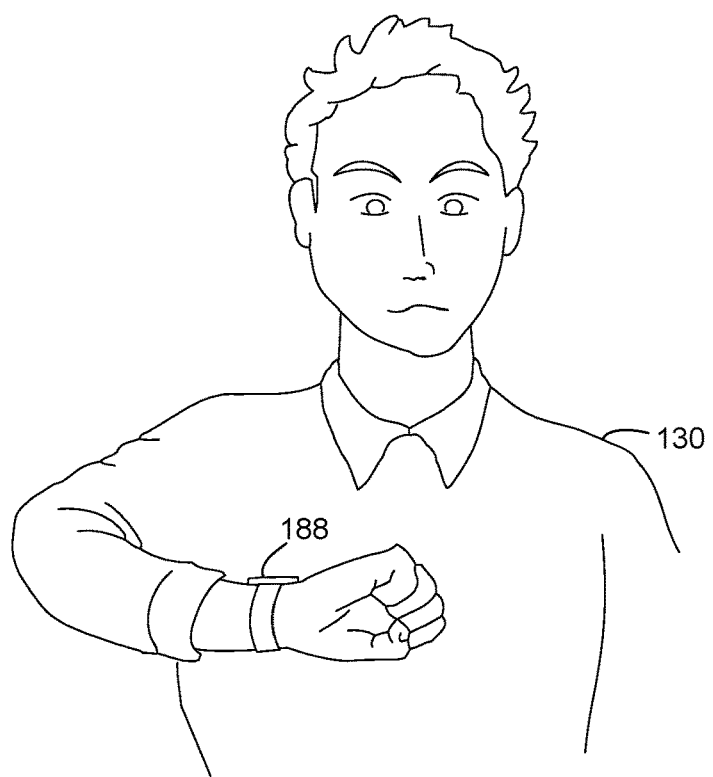
FIGS. 1A and 1B show a user without a head-wearable device interacting with an electronic device.
Figure 1B:
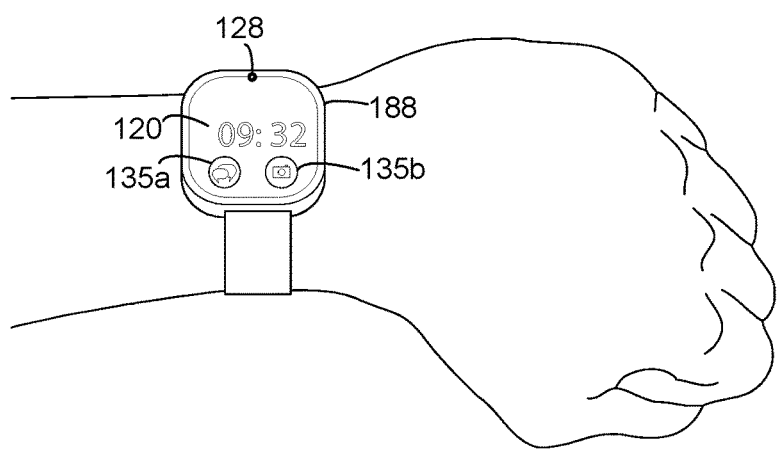
Figure 1C:
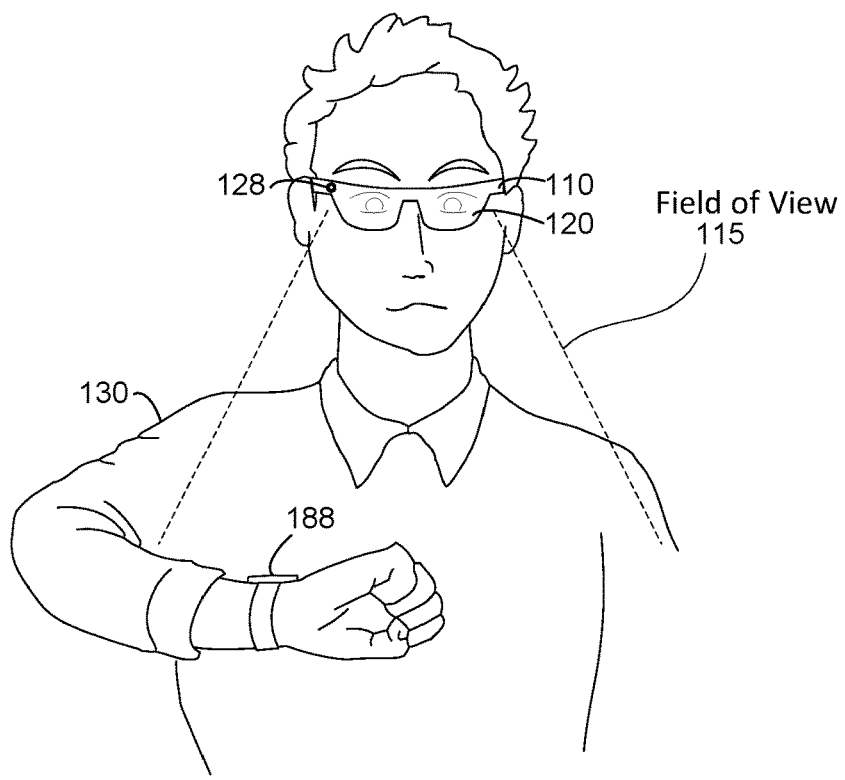
FIGS. 1C and 1D, illustrate a user wearing a head-wearable device interacting with an electronic device, in accordance with some embodiments.
Figure 1D:
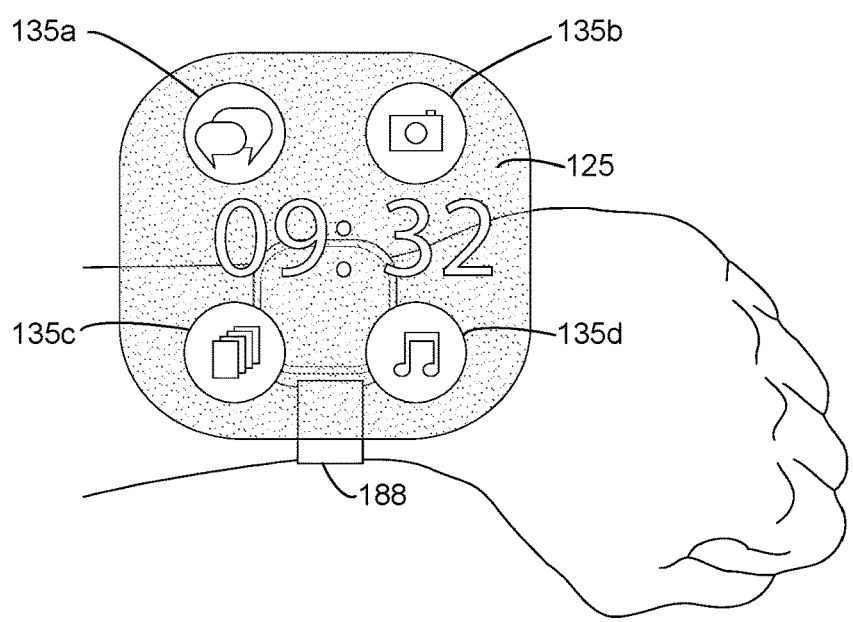
Figure 1E:
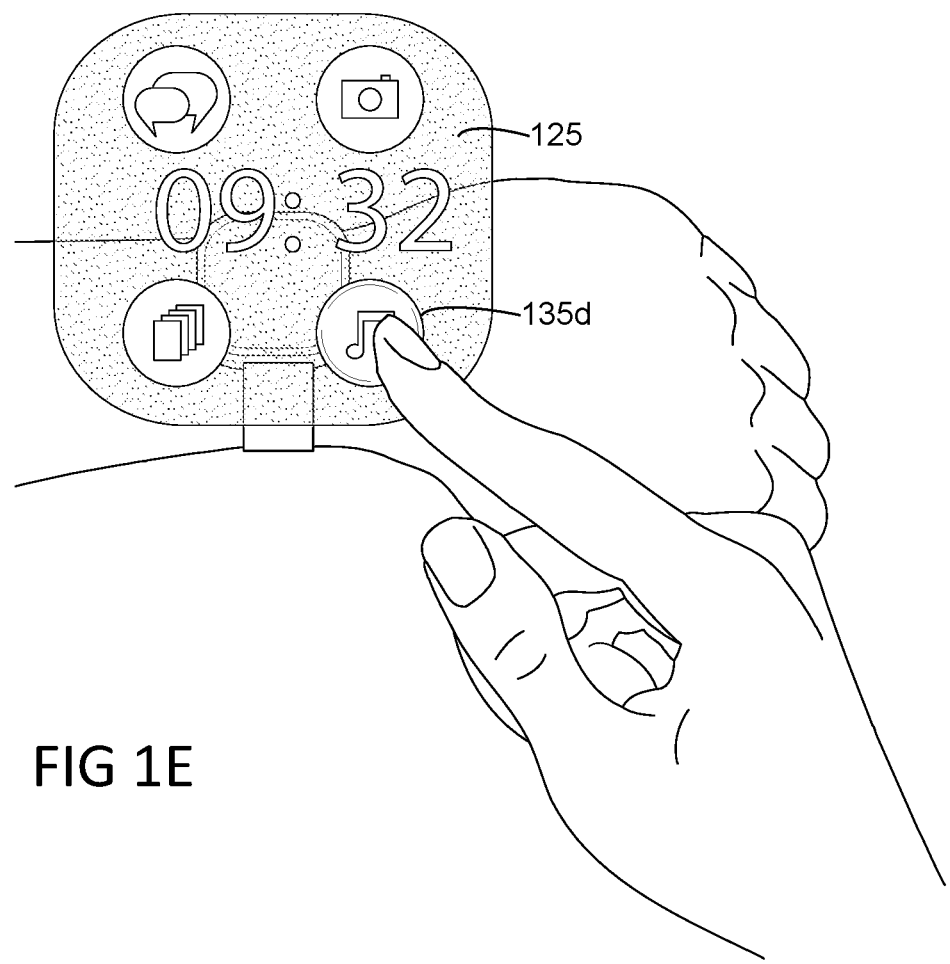
FIGS. 1E and 1T, illustrate different augmented representations of UIs for one or more applications presented by the head-wearable device, in accordance with some embodiments.
Figure 1F:
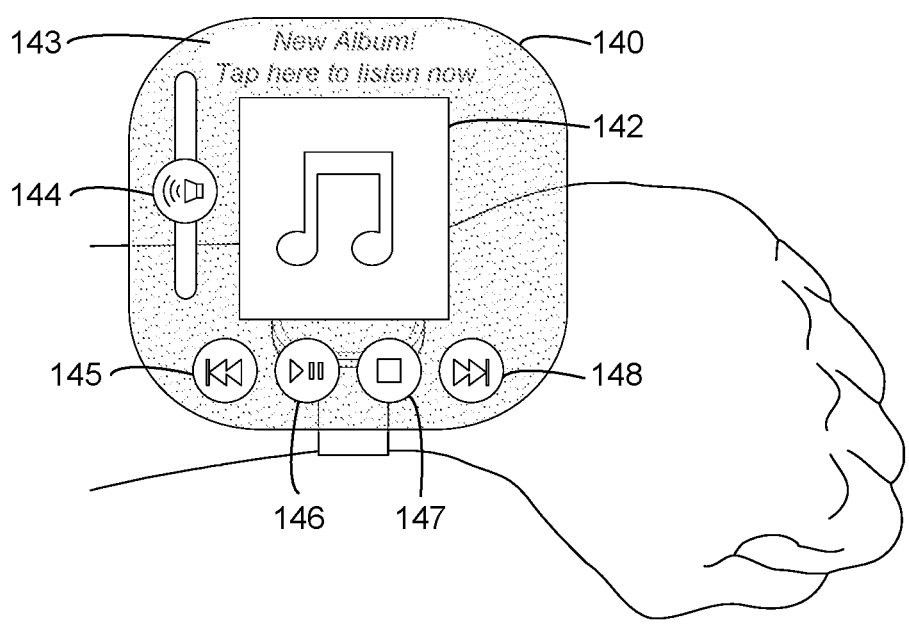
FIGS. 1U and 1V, illustrate a user wearing a head-wearable device ceasing to interact with an electronic device, in accordance with some embodiments.
FIGS. 1W and 1X, illustrate a user wearing a head-wearable device interacting with another electronic device, in accordance with some embodiments.
Figure 1G:
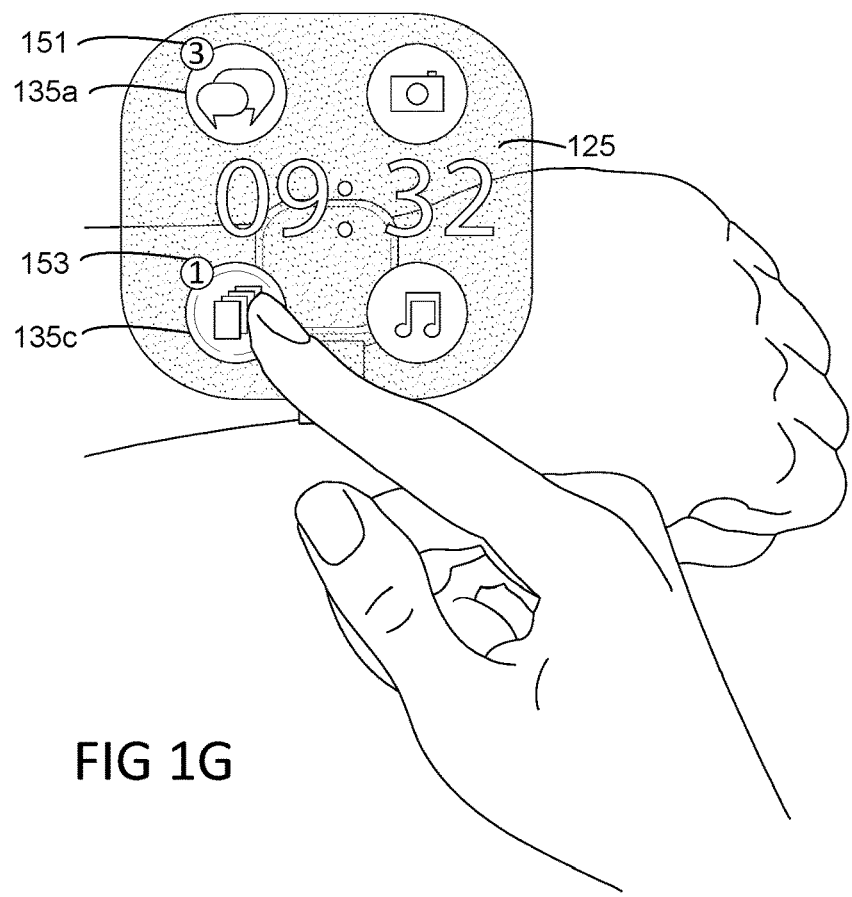
Figure 1H:
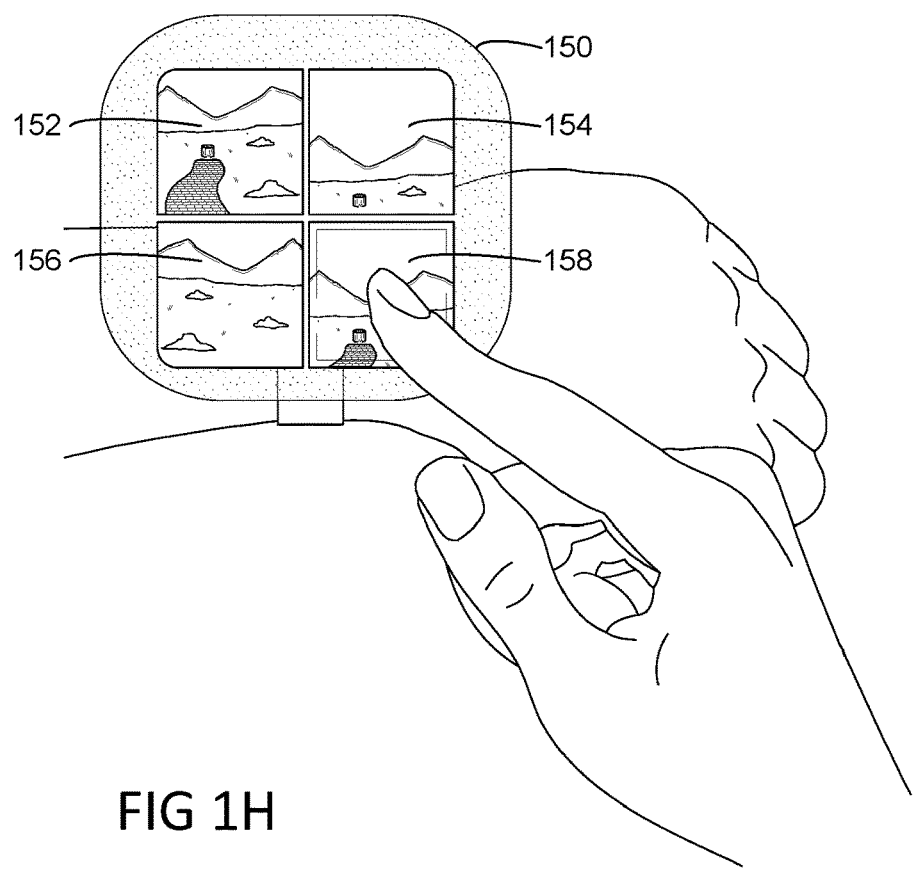
Figure 1I:
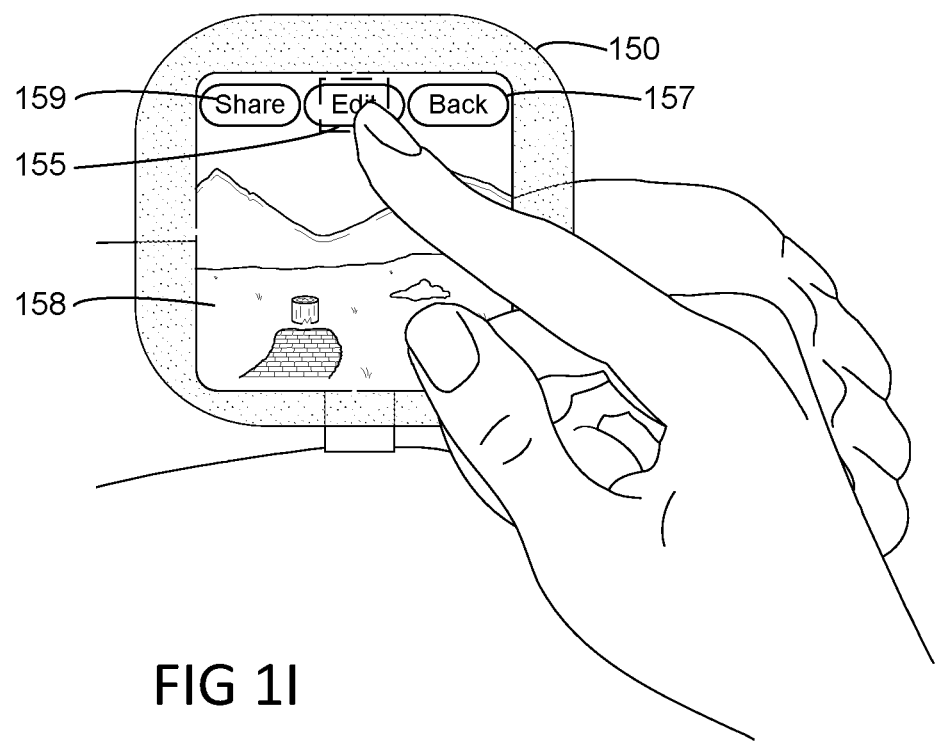
Figure 1J:
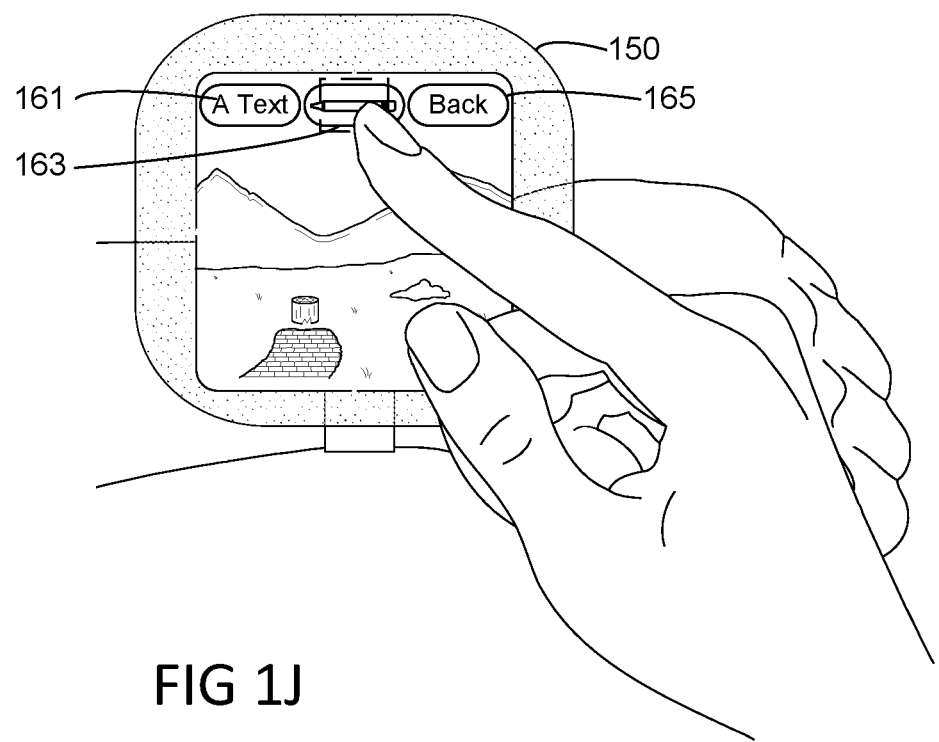
Figure 1K:
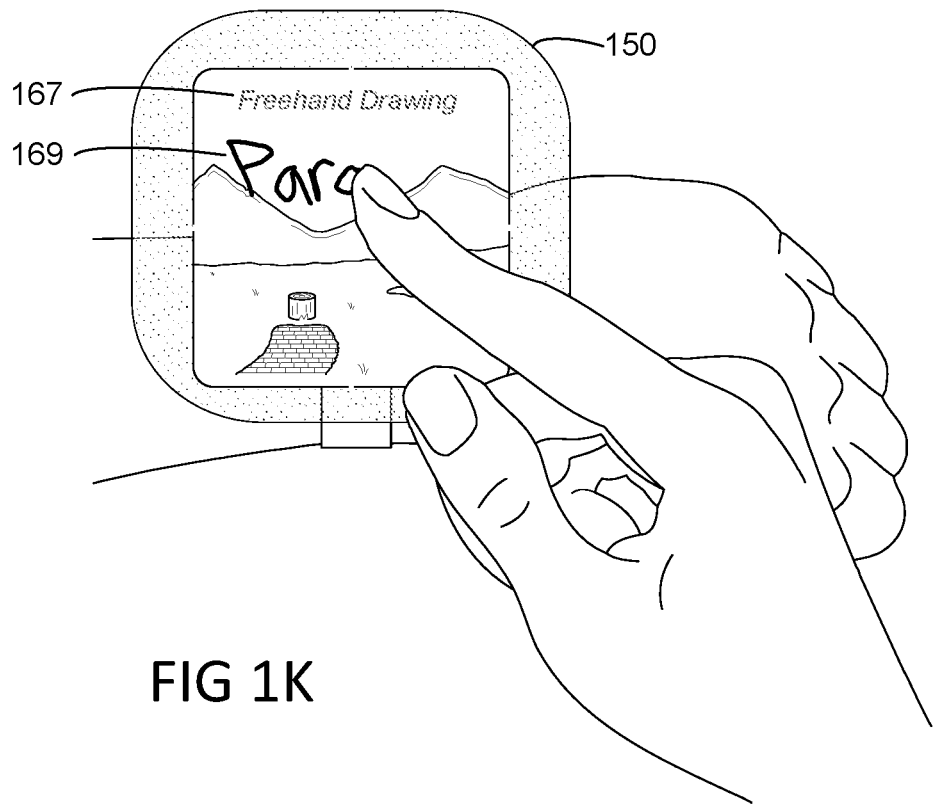
Figures 1, 1L:
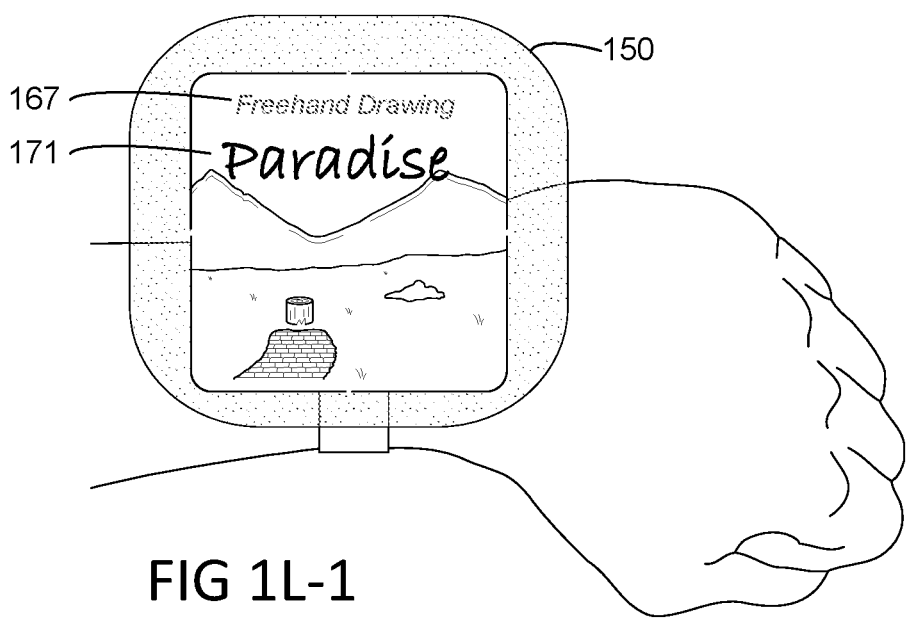
Figures 1, 1L, 2:
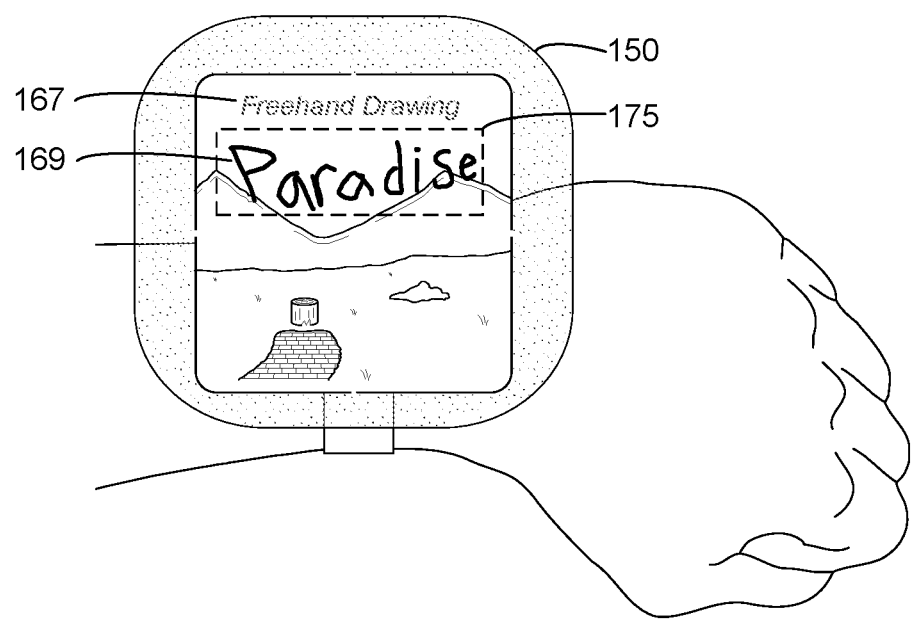
FIGS. 2A-2C illustrate another head-wearable device to present an augmented representation of a user interface associated with an electronic device, in accordance with some embodiments
Figure 1M:
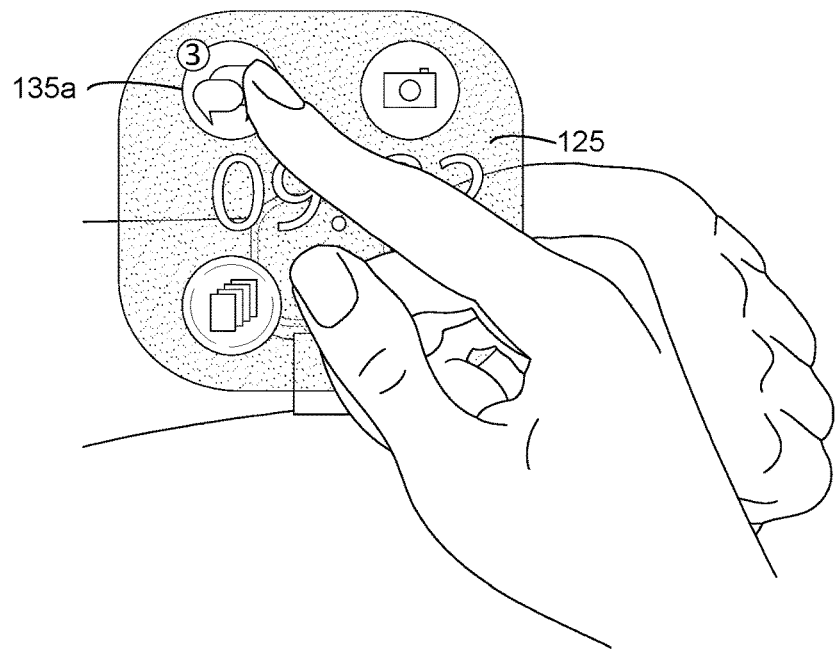
Figure 1N:
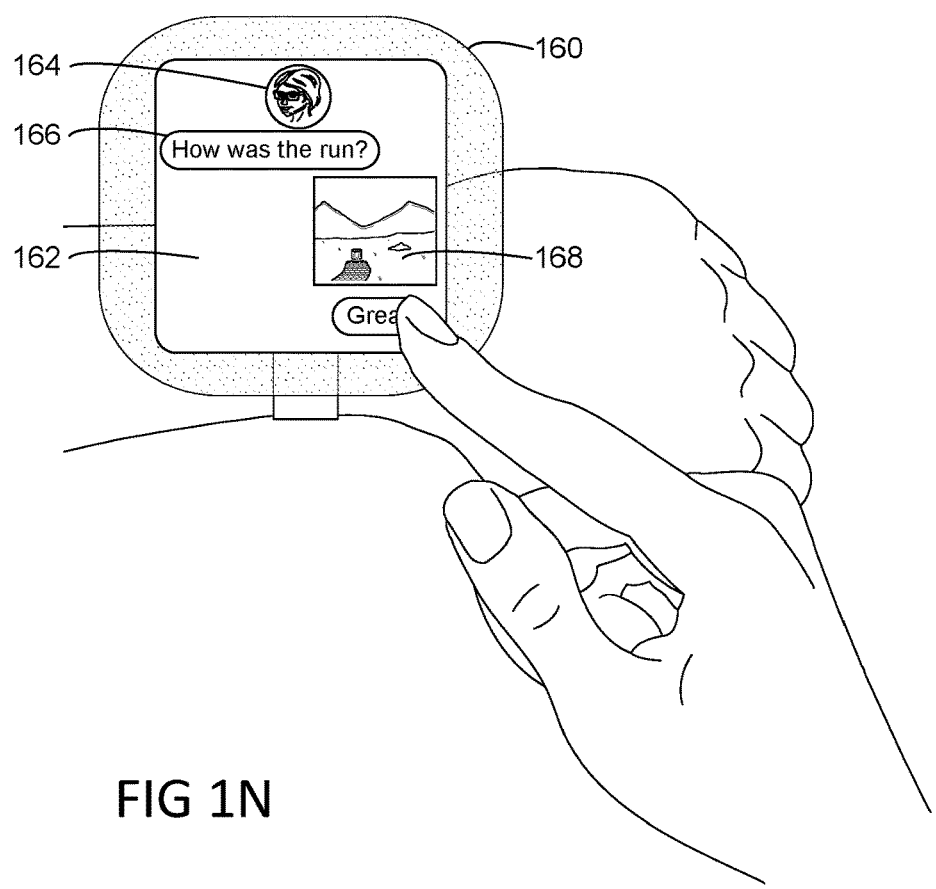
Figure 1O:
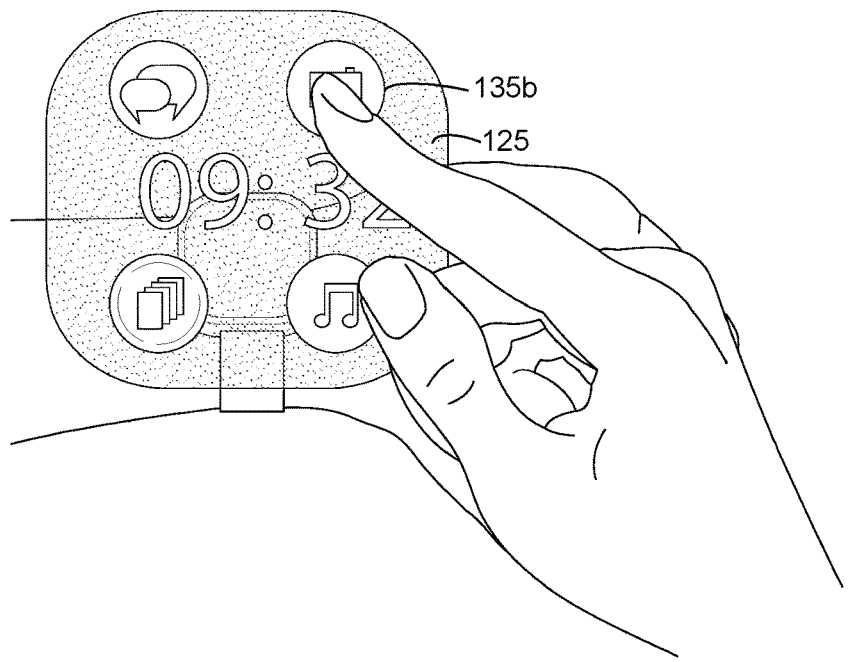
Figure 1P:
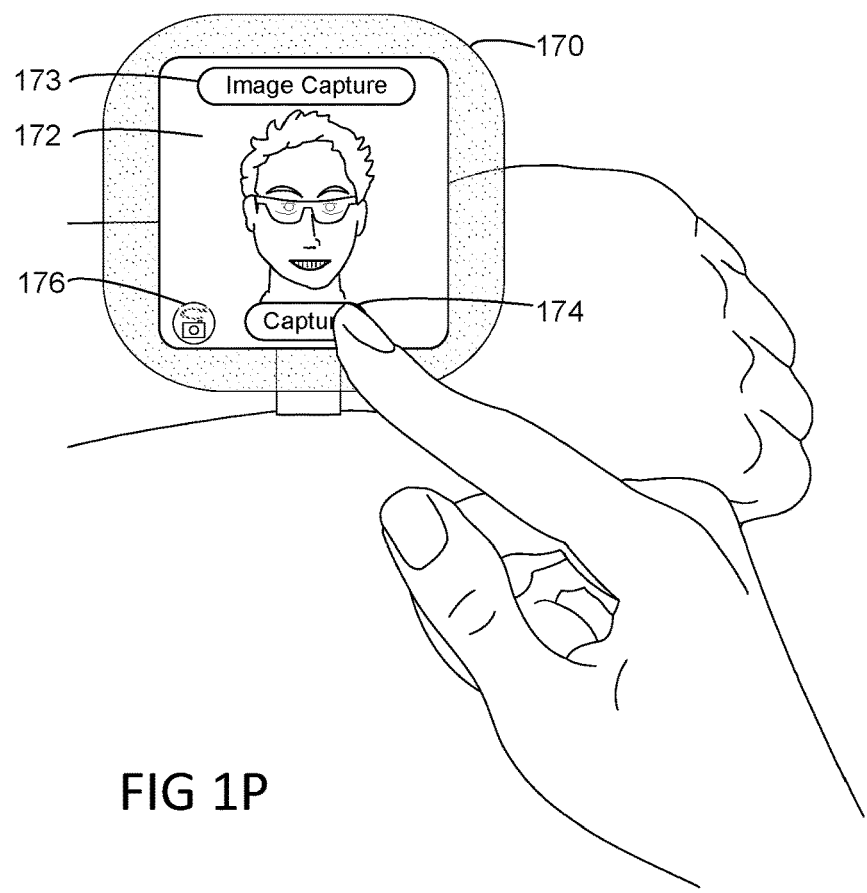
Figure 1Q:
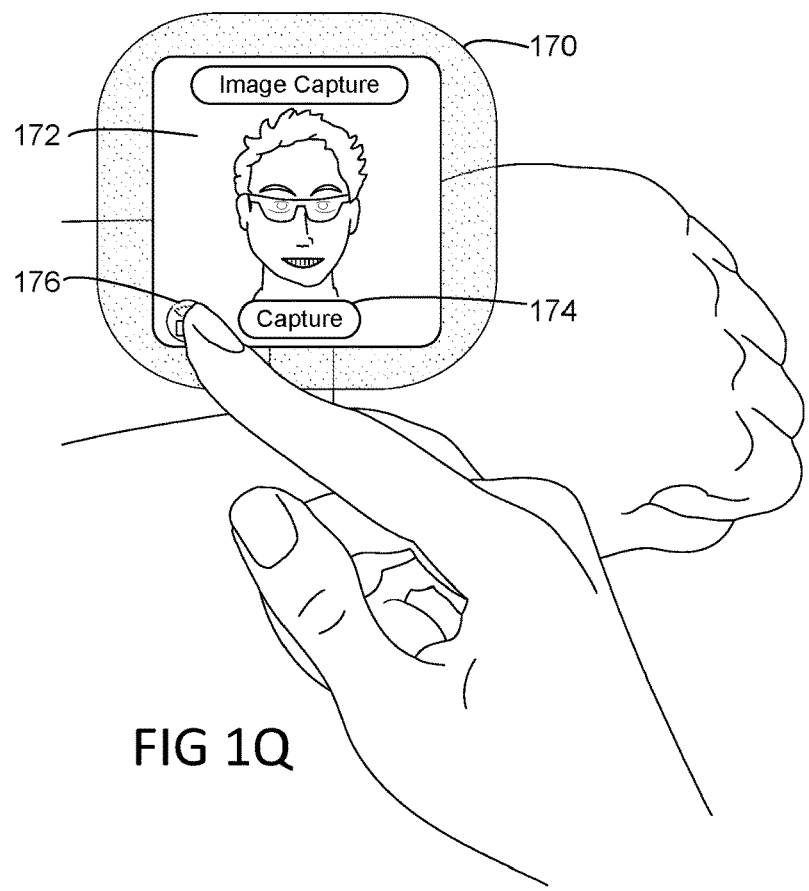
Figure 1R:
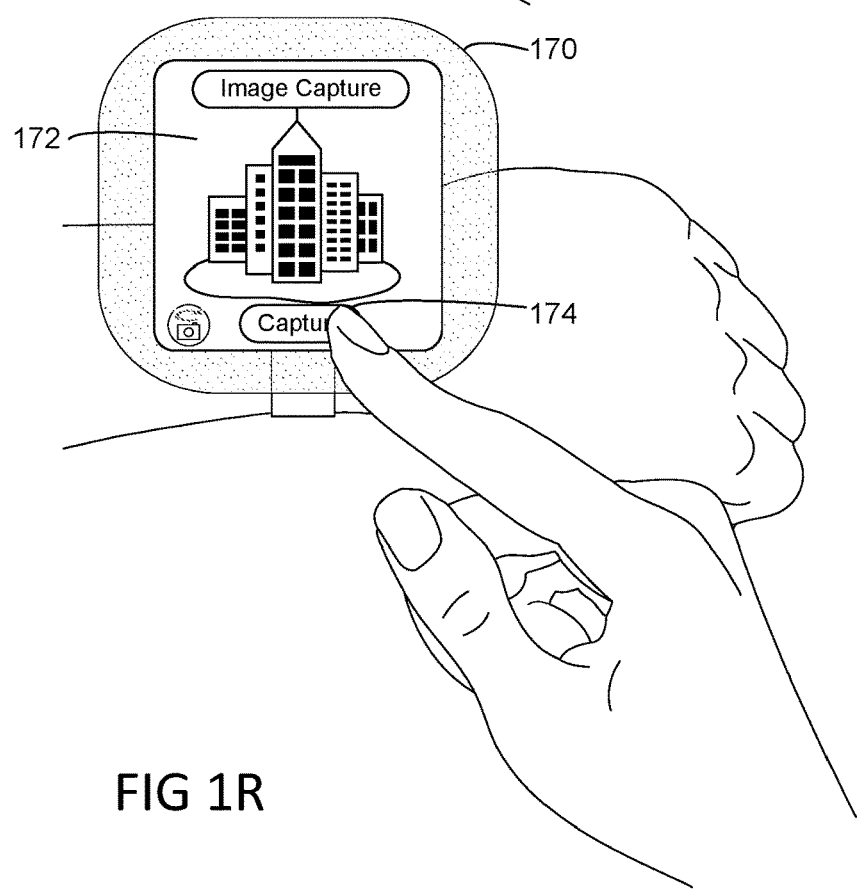
Figure 1S:
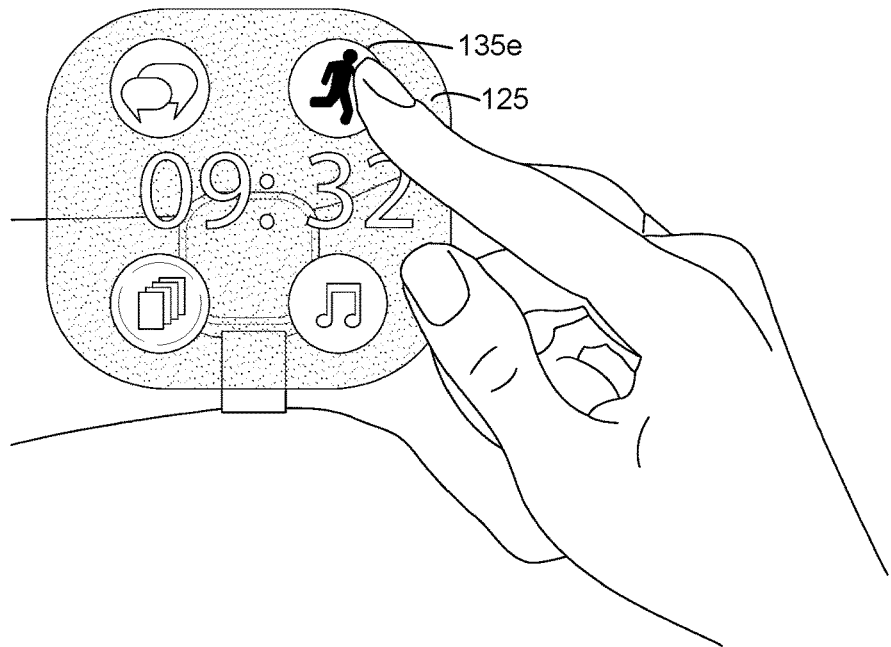
Figure 1T:
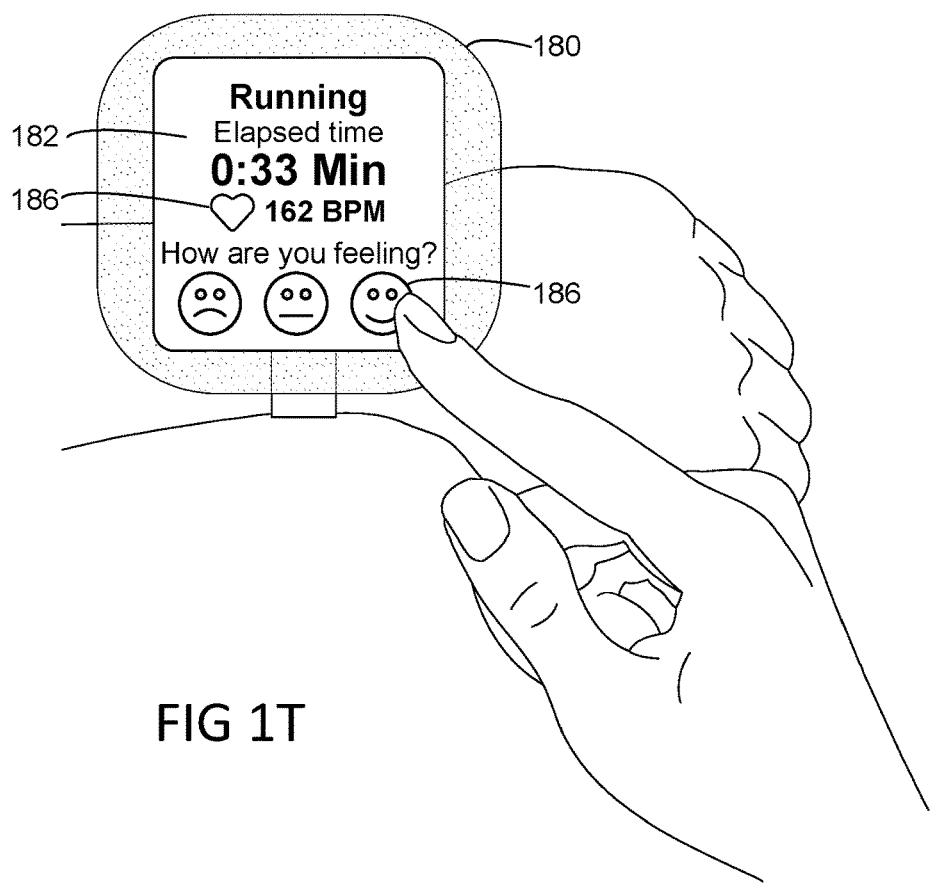
Figure 1U:
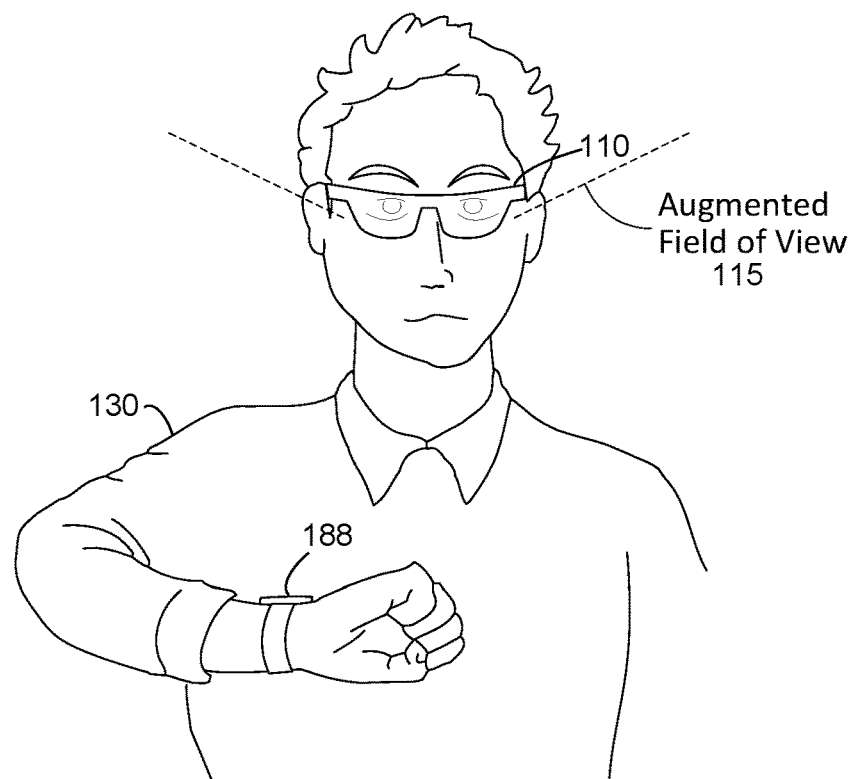
Figure 1V:
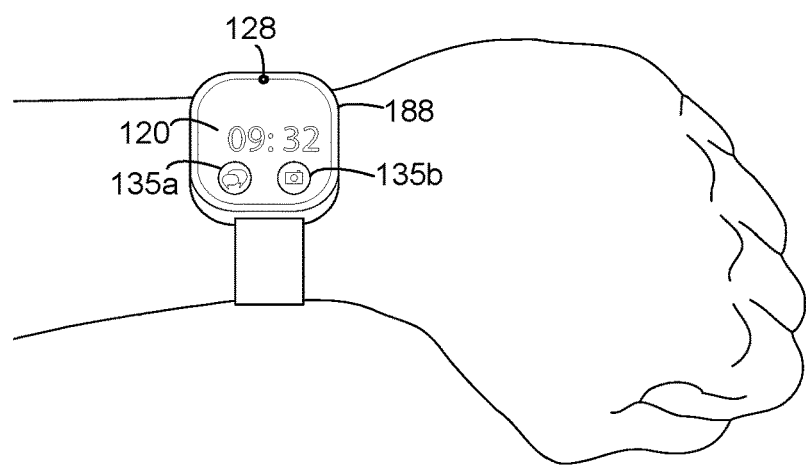
Figure 1W:
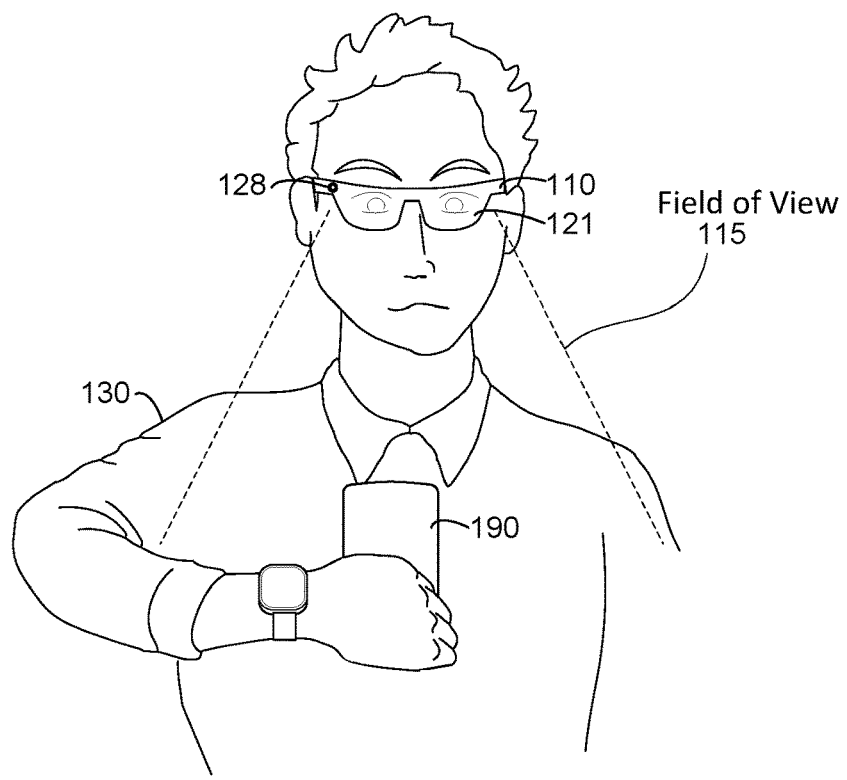
Figure 1X:
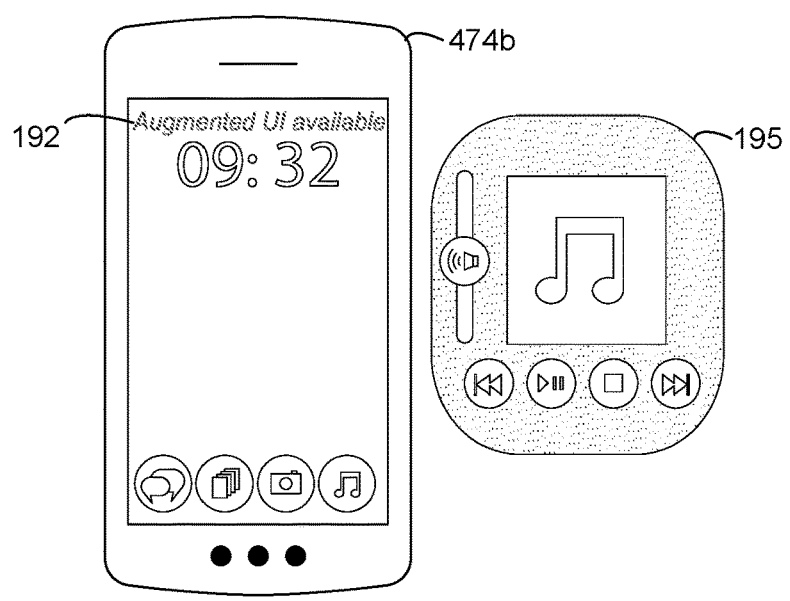

FIGS. 1A-1X illustrate using a head-wearable device to present an augmented representation of a user interface (UI) associated with an electronic device, in accordance with some embodiments. In some embodiments, the head-wearable device 110 is communicatively coupled with an electronic device, such as a wrist-wearable device 188 (e.g., by way of a Bluetooth connection between the two devices). In some embodiments, the wrist-wearable device 188 and the head-wearable device 110 are communicatively coupled via an intermediary device (e.g., a server 1170, a computer 1174a, a smartphone 1174b, a tablet, and/or other devices described below in reference to FIGS. 11A-11B) that is configured to provide instructions and data to and between the two devices; control the wrist-wearable device 188 and head-wearable device 110; and/or perform one or more operations in conjunction the operations performed by the wrist-wearable device 188 and/or head-wearable device 110. In some embodiments, the head-wearable device 110 is communicatively coupled to more than one device (e.g., the wrist-wearable device 188, a smartphone 1174b, speakers, sensors (or other fitness tracking device), and/or other devices).

Figure 11A:
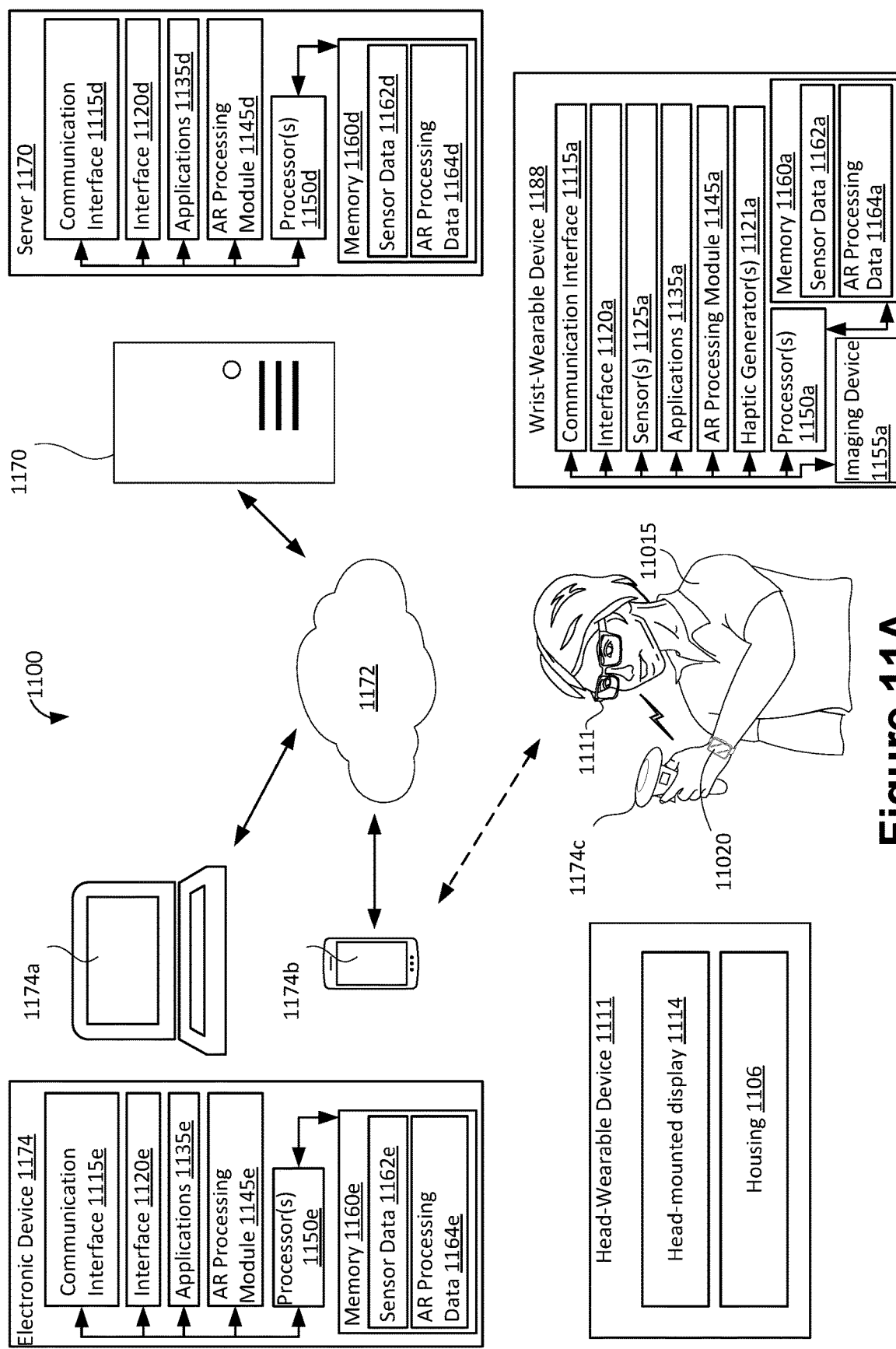
FIGS. 11A and 11B are block diagrams illustrating an example artificial-reality system in accordance with some embodiments.
Figure 11B:
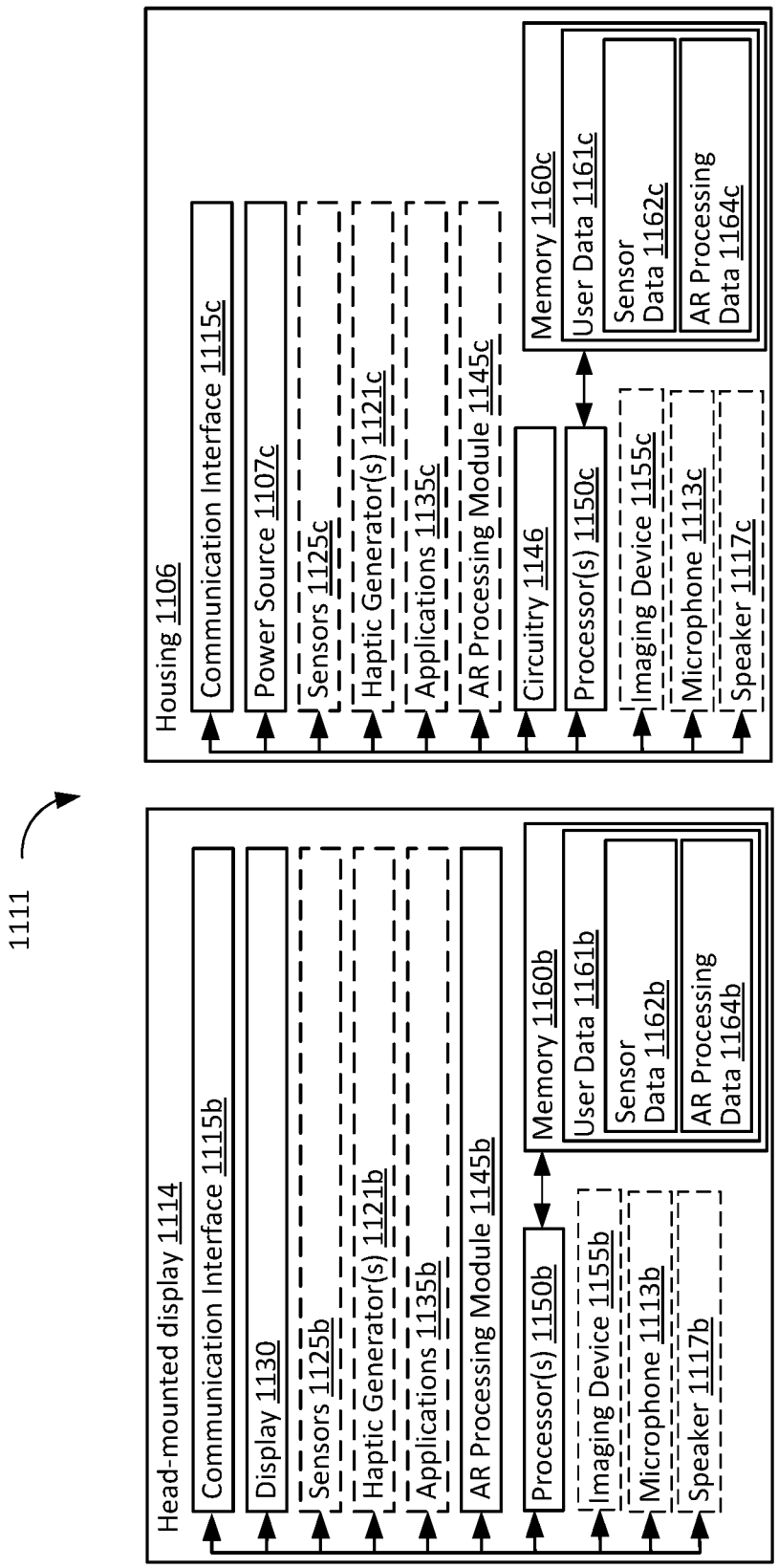

The head-wearable device 110 includes one or more imaging devices 128 (e.g., a camera) for capturing image data and/or video data (referred to as "camera data"), microphones, speakers for presenting an audio representation of data to a user 130, displays 121 (e.g., a heads-up display, a built-in or integrated monitor or screen, a projector, and/or similar device) for presenting a visual representation of data to the user 130, and/or sensors (e.g., sensors 1125c, such as electromyography (EMG) sensors, inertial measurement units (IMU)s, biometric sensors, position sensors, and/or any other sensors described below in reference to FIGS. 11A-11B) for monitoring user activity. In some embodiments, the head-wearable device 110 is configured to capture audio data via an microphone and/or present a representation of the audio data via speakers. In some embodiments, the head-wearable device 110 is a pair of smart glasses, augmented reality goggles (with or without a heads-up display), augmented reality glasses (with or without a heads-up display), other head-mounted displays, or head-wearable device 110). In some embodiments, the one or more components of the head-wearable device 110 described above are coupled with the housing and/or lenses of the head-wearable device 110. The head-wearable device can be used in real-world environments and/or in AR environments. For example, the head-wearable device 110 can present to a user 130 an augmented representation of content (e.g. UIs, media items, games) that is presented on an electronic device communicatively coupled with the head-wearable device 110.

The wrist-wearable device 188 can include one or more displays 120 (e.g., a touch screen), speakers, microphones, imaging devices 128, and sensors (e.g., sensors 1125*c*; FIGS. 11A-11B). In some embodiments, the one or more components of the wrist-wearable device 188 described above are coupled with a wrist-wearable structure (e.g., a band portion) of the wrist-wearable device 188, housed within a capsule portion of the wrist-wearable device 188 or a combination of the wrist-wearable structure and the capsule portion. In some embodiments, the wrist-wearable device 188 and the head-wearable device 110 include similar components (e.g., sensors 1125*a*). In some embodiments, the wrist-wearable device 188 includes at least one sensor or sensor type not included in the head-wearable device 110.

The head-wearable device 110, while worn by the user 130, is configured to present, via its display 121, an augmented representation of a UI associated with an electronic device. In particular, the head-wearable device 110 can present, via its display 121, an augmented representation of the UI displayed on another device that is communicatively coupled with the head-wearable device 110, such as the wrist-wearable device 188. The augmented representation of the UI presented by the head-wearable device 110 can include at least one visual characteristic that was not present in the UI displayed on the electronic device. In some embodiments, the head-wearable device 110 presents the augmented representation of the UI in accordance with a determination that an augmented-display criterion is satisfied for the electronic device displaying a UI. The augmented-display criterion is satisfied when it is determined that the electronic device is within a field of view of the head-wearable device 110. A determination that an augmented-display criterion is satisfied is based, at least in part, on sensor data received from the electronic device (e.g., the wrist-wearable device 188) and/or the head-wearable device 110 while the electronic device displays the UI on its display.

In some embodiments, the systems and methods disclosed herein are configured to emulate a wearable experience on the head-wearable device (e.g., glasses). For example, a watch experience or UI can be reproduced and laid out to be optimal on glasses screen. The head-wearable device 110 can emulate the experience of other devices, such as a tablet, a smartphone, public Kiosks (e.g., train ticket terminals, airport terminals, bank ATMs), etc. The head-wearable device 110 improves user accessibility by allowing a user to view a larger representation of a UI displayed on smaller and/or handheld devices such as a smartphone 1174*b* and/or a wrist-wearable device 188. Additionally, head-wearable device 110 can further improve a user's experience by providing additional functionality or commands that were previously not displayed on the smaller and/or handheld devices. Although the primary examples described below in reference to FIGS. 1A-1X relate to the interaction between the head-wearable device 110 and the wrist-wearable device 188, other more general example use cases are also contemplated. For example, the head-wearable device 110 can be used with a laptop or other computing device to extend or augment the information displayed (e.g., presenting an additional display, presenting an additional content tab, presenting additional selectable UI elements).

Turning to FIG. 1A, a user 130 wearing a wrist-wearable device 188 without a head-wearable device 110 is shown. The user 130 interacts with their wrist-wearable device 188 via a UI presented by the display 120 of the wrist-wearable device 188. As shown in FIG. 1B, the UI presented on the wrist-wearable device 188 is limited based on the size of the display 120, which can be limited by a number of factors including user comfort, ease of use, aesthetics, convenience, etc. Because a display 120 of a wrist-wearable device 188 can have a smaller form factor (e.g., a watch case or display 120 that is less than 70 mm), the information included in the UI can be scaled down or limited. For example, as shown in FIG. 1B, the only two UIs elements (e.g., a messaging UI element 135*a* and a camera UI element 135*b*) are presented on the display 120, which can also be scaled down to fit within the display 120.

In FIG. 1C, the user 130 is shown wearing the wrist-wearable device 188 and the head-wearable device 110. As described above, the head-wearable device 110 is caused to present an augmented representation of a UI in accordance with a determination that an augmented-display criterion is satisfied for the electronic device displaying a UI. For example, the augmented-display criterion can be satisfied when it is determined that the wrist-wearable device 188 is within a field of view 115 of the head-wearable device 110. In some embodiments, the augmented-display criterion includes a position and/or orientation thresholds, a signal-strength threshold, a proximity threshold, and a tilt threshold. For example, a positional threshold can include the user 130 tilting their head (e.g., detected via the head-wearable device 110) downwards towards the wrist-wearable device 188, the user lifting the wrist-wearable device 188 towards the head-wearable device 110, or a combination of the two. In some embodiments, the augmented-display criterion includes image recognition, eye tracking, hand gesture recognition, in-air gestures, surface contact gestures, etc. In some embodiments, additional checks are performed in addition to checking for satisfaction of the augmented-display criterion, such as ensuring that a respective electronic device is communicatively coupled with the head-wearable device 110 and/or that the respective electronic device is associated with a same user 130 as the head-wearable device 110 (e.g., by ensuring that the devices are logged into common accounts). Some embodiments can make use of device-specific augmented-display criterion, which can mean that different criterion is used for different types of devices (e.g., different criterion for smartphones as compared to smartwatches, etc.).

In some embodiments, sensor data received from the wrist-wearable device 188 and/or the head-wearable device 110, while the wrist-wearable device 188 displays the UI on its display 120, is used to determine that an augmented-display criterion is satisfied. For example, an IMU sensor of the wrist-wearable device 188 and/or the head-wearable device 110 can provide data indicative of a position and/or orientation of the wrist-wearable device 188 and/or the head-wearable device 110, which is used to determine whether an augmented-display criterion. In some embodiments, a signal-strength measured by one or more communication radios is used to determine whether an augmented-display criterion is satisfied. Non-limiting examples of the sensors used to receive sensor data include Ultra-wideband (UWB) sensors, accelerometers, magnetometers, EMG sensors, communication radios. Additional examples of the one or more sensors are provided below in reference to FIGS. 11A-11B.

In some embodiments, image data from one or more imaging devices can be used to determine whether an augmented-display criterion is satisfied. In some embodiments, an imaging device 128 of the head-wearable device 110 and/or the wrist-wearable device 188 is automatically activated when a user 130 wearing the head-wearable device 110 looks down at the wrist-wearable device 188. Alternatively, an imaging device 128 of the head-wearable device 110 and/or wrist-wearable device 188 can obtain transient image data (e.g., image data that is not permanently stored) of a field of view a coupled imaging device 128, which in turn processes the transient image data to determine whether an augmented-display criterion is satisfied based on the presence of an electronic device. In some embodiments, image data from the imaging device 128 of the head-wearable device 110 can be used to determine whether the wrist-wearable device 188 is in a field of view 115 of the head-wearable device 110, image data from an imaging device 128 of the wrist-wearable device 188 can be used to determine whether the head-wearable device 110 is focused on the wrist-wearable device 188; and/or a combination of the image data from the head-wearable device 110 and the wrist-wearable device 188 can be used to determine that the user 130 is focused on the wrist-wearable device 188. Focused, for purposes of this disclosure, means that the user 130 is interacting with the device and/or looking at the electronic device.

In some embodiments, sensor data from a single sensor (e.g., IMU data from the wrist-wearable device 188 or a head-wearable device 110) and/or imaging data from a single imaging device (e.g., imaging data of the head-wearable device 110 or the wrist-wearable device 188) is used to determine whether an augmented-display criterion is satisfied. Alternatively, in some embodiments, a combination of sensor data from multiple sensors of one or more devices (e.g., the wrist-wearable device 188 and/or the head-wearable device 110), as well as other data (e.g., image data) from one or more devices can be used to determine whether an augmented-display criterion is satisfied.

FIG. 1D illustrates an example of an augmented representation of a UI displayed on another device that is communicatively coupled with the head-wearable device, in accordance with some embodiments. As shown in FIG. 1D, the head-wearable device 110 can present, via its display 121, an augmented representation 125 of the UI displayed on the wrist-wearable device 188 that is communicatively coupled with the head-wearable device 110. In some embodiments, the augmented representation 125 of the UI displayed on the wrist-wearable device 188 is presented via the display 121 of the head-wearable device 110 in accordance with a determination that an augmented-display criterion is satisfied. Data for facilitating presentation of and/or interaction with the augmented representation 125 of the UI can be provided between the wrist-wearable device 188 and the head-wearable device 110 via a communication interface 1115c (FIGS. 11A-11B), such as WiFiDirect, Bluetooth™, etc.

The augmented representation 125 of the UI presented by the head-wearable device 110 can include at least one visual characteristic that was not present in the UI displayed on the electronic device. The at least one visual characteristic that was not present in the UI displayed on the electronic device is one or more of (i) a larger size of UI and (ii) one or more additional UI elements. For example, as shown in FIG. 1D, the augmented representation 125 of the UI presented by the head-wearable device 110 is larger than the UI displayed on the wrist-wearable device 188 of FIG. 1B, and includes additional UI elements (e.g., an image viewing application UI element 135c and a music application UI element 135d). In some embodiments, the at least one visual characteristic is a larger size of the UI, and the causing presentation of the augmented representation 125 of the UI includes magnifying the UI such that it appears, when viewed through the head-wearable device 110, to be in a region of space that is above the electronic device. In some embodiments, presentation of the augmented representation 125 of the UI includes magnifying the UI in a 3-dimensional space above a surface of the display of the electronic device. For example, the augmented representation 125 of the UI is displayed as a 3-dimensional representation over the display 120 of the wrist-wearable device 188. In some embodiments, the augmented representation 125 can include enhancing one or more UI elements (e.g., higher resolution, finer detail, etc.), animating one or more UI elements, generating 3-dimensional representations of one or more UI elements, etc.

In some embodiments, the augmented representation 125 of the UI is repositioned, via the display 121 of the head-wearable device 110, as the electronic device is moved and while the augmented-display criterion remains satisfied, such that the augmented representation of the UI remains above the electronic device as it is repositioned. For example, as the user 130 moves the wrist-wearable device 188 and an augmented-display criterion is satisfied, the augmented representation 125 of the UI is repositioned (via the display 121 of the head-wearable device 110) such that the user 130 views the augmented representation 125 of the UI above the wrist-wearable device 188. In some embodiments, the augmented representation 125 of the UI is oriented and repositioned using spatial positioning. Spatial positioning determines an orientation and reposition of the augmented representation 125 of the UI based on the relative position of each device (e.g., the wrist-wearable device 188 and the head-wearable device 110), the user 130's position, and/or content presented by the UI (e.g., 3D images may be repositioned to maintain their intended appearance). In some embodiments, the augmented representation 125 of the UI is presented to via the head-wearable device 110 zoomed-in using spatial positioning.

In some embodiments, the display of the electronic device ceases to display the UI in conjunction with the presentation of the augmented representation 125 of the UI. For example, the display 120 of the wrist-wearable device 188 can be turned off when an augmented-display criterion is satisfied and the head-wearable device 110 presents the augmented representation 125 of the UI. Automatically turning off the display conserves the battery life of the wearable device or other electronic device. Further, by turning off the display, the disclosed techniques increase security by only allowing the user of the head-wearable device to view data the UI displayed by the electronic device (e.g., as the display of an electronic device is disabled only the wearer of the head-wearable device 110 can view the augmented representation of the UI). Alternatively, in some embodiments, the electronic device (e.g., the wrist-wearable device 188) can be configured to continue to display information via its display 120.

FIG. 1E illustrates user interaction with the augmented representation 125 of the UI presented via the head-wearable device 110. In some embodiments, while the augmented representation 125 of the UI is presented via the display 121 of the head-wearable device 110, user inputs selecting a UI element from within the augmented representation 125 of the UI can be detected. The user inputs can be contact with one or more portions of the augmented representation 125 of the UI. In some embodiments, contact with one or more portions of the augmented representation 125 of the UI can be interpreted via data from one or more sensors of the wrist-wearable device 188 and/or the head-wearable device 110 (e.g., EMG data, IMU data, etc.) and/or image recognition (e.g., image data from the wrist-wearable device 188 and/or the head-wearable device 110 processed to determine a relative position and/or contact location of the user's phalanges with respect to the augmented representation 125 of the UI). Alternatively or additionally, in some embodiments, the user input can be in-air gestures, surface contact gestures, voice commands, eye tracking, etc. (e.g., interpreted from the EMG data, IMU data, image data, etc. detected and/or captured by the sensors of the head-wearable device 110 and/or wrist-wearable device 188). Each UI element is associated with an input command that, when selected, causes an update to the augmented representation 125 of the UI based on performance of the input command. In other words, the augmented representation 125 of the UI can be directly interacted with to cause performance of commands (e.g., the UI elements within the augmented representation can be selected without needing to interact with the electronic device (e.g., the wrist-wearable device 188).

In some embodiments, the resulting augmented representation 125 of the UI after selection of a UI element can be specific to an application. For example, as shown in FIGS. 1E and 1F, selection of a music application UI element 135*d*, via the augmented representation 125 of the UI, causes the augmented representation 125 of the UI to be updated to present an augmented representation of a music application UI 140. Similar to the augmented representation 125 of the UI, the augmented representation of the music application UI 140 can include one or more UI elements that allow the user to interact with the music application. For example, the augmented representation of the music application UI 140 shown in FIG. 1F includes an album cover or currently playing track UI element 142, a volume UI element 144, a back UI element 145, a play/pause UI element 146, a stop UI element 147, and a skip/forward UI element 148. The augmented representation of the music application UI 140 allows the user 130 to perform specific actions at each application from the augmented view.

In some embodiments, while the augmented representation of the music application UI 140 presented via the head-wearable device, the wrist-wearable device 188 can provide information associated with an electronic notification from the music application executing on the wrist-wearable device 188. The electronic notification provided by the wrist-wearable device 188 can be presented to the user 130 via the augmented representation of the music application UI 140. For example, as shown in FIG. 1F, the user 130 can be presented with electronic notification 143 notifying the user of a new album. The electronic notification 143 can be further configured to allow the user 130 to interact with the augmented representation of the UI (e.g., "tap here to listen now"). In some embodiments, the information associated with the electronic notification is displayed only via the display 121 of the head-wearable device 110 while presentation of the augmented representation via the head-wearable device 110 is ongoing. The above example of the electronic notification 143 is non-limiting. In some embodiments, each application is associated with one or more distinct electronic notifications.

FIG. 1G illustrates additional user interactions with the augmented representation 125 of the UI presented via the head-wearable device 110. In some embodiments, an electronic device can provide information associated with an electronic notification from one or more applications stored (or installed) on the electronic device that are not currently executing. In other words, one or more applications of the electronic device do not have be executing for the electronic device to provide information associated with an electronic notification from the one or more applications. For example, as shown in FIG. 1G, the wrist-wearable device 188 can provide electronic notifications (e.g., messaging notification 151 and image notification 153) for one or more application that are included in the presented the augmented representation 125 of the UI but not currently executing. The messaging notification 151 and image notification 153 can notify the user of new or unseen activity or actions association with the messaging application and the imaging application. In some embodiments, each application is associated with one or more respective electronic notifications.

As further shown in FIG. 1G, user 130 selection the image viewing UI element 135*c* results in an augmented representation of the image viewing UI 150 (FIG. 1H) to be presented to the user 130 via the head-wearable device 110. As described above, the user 130 will be able to perform specific actions at each application from the augmented representation of the UI. For example, as described herein, the user 130 would be able to send messages, select photos, capture video, start workout, play games, edit documents, etc.

FIG. 1H shows an augmented representation of the image viewing UI 150, which is associated with an image viewing application. As described above, selection of the image viewing UI element 135*c* initiates the image viewing application and causes the head-wearable device 110 to present the augmented representation of the image viewing UI 150. The augmented representation of the image viewing UI 150 is an image viewing UI including one or more stored images that are represented as respective image UI elements (e.g., first, second, third, and fourth image UI elements 152, 154, 156, and 154). More specifically, one or more UI elements from within the augmented representation of the image viewing UI 150 can be associated with one or more stored images. The augmented representation of the image viewing UI 150 allows the user to view different images stored on the electronic device (e.g., the wrist-wearable device 188) or any other device communicatively coupled to the head-wearable device 110.

In some embodiments, while the head-wearable device 110 displays the augmented representation of the image viewing UI 150, user inputs selecting a UI element from within the augmented representation of the image viewing UI 150 can be detected. For example, as further shown in FIG. 1H, the user selects the fourth image UI element 158. The head-wearable device 110 can be caused to present an augmented representation of an image associated with the selected image UI element. The augmented representation of the image can be a 2-dimensional representation of the selected image with higher resolution (e.g., 1080p or higher instead of 400$p$). In some embodiments, the augmented representation of the image can be 3-dimensional representation of the selected image. In some embodiments, the head-wearable device 110 generates the 3-dimensional representation of the selected image to improve the user 130's experience by improving the user 130's immersion and interaction with an image.

FIG. 1I shows an augmented representation of a selected image via the image viewing UI 150. As described above in reference to FIG. 1H, selection of a UI element from within the augmented representation of the image viewing UI 150 causes an augmented representation the selected image to presented. In some embodiments, the augmented representation the selected image is presented with one or more additional UI elements that allow the user to further interact with the selected image and/or the image viewing application. For example, the augmented representation an image associated with the fourth image UI element 158 is presented in conjunction with a back UI element 157, an edit UI element 155, and a share UI element 159. In some embodiment, each UI element is associated with a specific command or action to be performed by the imaging application. For example, the back UI element 157, when selected, can cause the head-wearable device 110 to return to the previously display UI (e.g., the augmented representation of the image viewing UI 150); the edit UI element 155, when selected, causes one or more image editing UI elements to be presented to the user 130 (as described below in reference to FIG. 1J); and the share UI element 159, when selected, presents the user 130 with one or more options for sharing the selected image.

FIG. 1J illustrates one or more image editing UI elements presented to the user 130 in response to selection of the edit UI element 155. Non-limiting examples of the image editing UI elements can include a text overlay UI element 161 and a freehand or handwriting UI element 163. Any number of image editing UI elements can be presented to the user. For example, the user 130 can be presented with image editing UI elements that allows the user 130 to apply different filters, crop an image, resize an image, combine images, recolor an image, etc. Each image editing UI element can be selected by the user 130 via the augmented representation of the image viewing UI 150. For example, as shown in FIG. 1J, the user selects the handwriting UI element 163.

FIG. 1K illustrates example edits or modifications to an image by the user. In particular, FIG. 1K illustrates one or more inputs provided by the user 130 after selection of the handwriting UI element 163. In some embodiments, the user can provide one or more user inputs via the augmented representation of the image viewing UI 150 that cause a handwritten symbol to be presented on the augmented representation of the image viewing UI 150. For example, as shown in FIG. 1K, the user 130 uses their finger to handwrite a message (e.g., handwritten message 169) over the image in the augmented representation of the image viewing UI 150. In some embodiments, EMG data and/or IMU data collected by the one or more sensors of the wrist-wearable device 188 can be used to determine one or more symbols, gestures, or text that a user 130 would like to input. For example, instead of drawing "paradise" on the display 120 as shown in FIG. 1K, the user 130 can imitate the writing gesture on the hand wearing the wrist-wearable device 188 and based on the EMG data and/or INIU data, the text "paradise" is presented in the augmented representation of the image viewing UI 150. In some embodiments, the handwritten symbol is saved to the image. Although the above example describes the handwritten symbol as text, other symbols are also contemplated, such as emojis, emoticons, predetermined gestures (e.g., gestures that are associated with one or more commands that are performed when an associated handwritten symbol is detected, such as a user performing a thumbs up gesture causing a thumb up emoji to be presented), and/or user customized gestures (e.g., user defined gestures that are associated with one or more commands that are performed when an associated handwritten symbol is detected).

In some embodiments, an electronic notification including one or more instructions for editing an image can be presented to the user 130. For example, the augmented representation of the image viewing UI 150 includes a freehand drawing notification 167 that provides the user with instructions on the current editing mode. Although the above-example describes presenting the handwritten symbol via an augmented display, in some embodiments, the head-wearable device 110 can detect and present handwritten symbols that allow the user 130 to interact with one or more user interfaces displayed at the head-wearable device 110.

FIG. 1L-1 illustrates transformation of the handwritten symbol. In particular, the handwritten message 169 is converted to a typed message with a standardized font. In this way, the user 130 is able to handwrite a message and covert the handwritten message to a typed message 171 that is easier to read and/or includes a desired style. The standardized font can be any font stored within a font library of the wrist-wearable device 188 and/or the head-wearable device 110. In some embodiments, the user is able to select the font used to convert the handwritten message.

FIG. 1L-2 illustrates a completed handwritten symbol. In particular, the handwritten message 169 is overlaid the image within the augmented representation of the image viewing UI 150. In some embodiments, the user 130 can select the handwritten message 169 to edit, delete, and/or move the handwritten message 169. In some embodiments, a bounding box 175 is presented around the handwritten message 169 to notify the user that the handwritten message 169 has been selected. In some embodiments, the bounding box 175 can be used to move, copy, or delete the handwritten message 169.

FIG. 1M illustrates selection of the messaging UI element 135*a* via the augmented representation 125 of the UI displayed on the wrist-wearable device 188. Selection of the messaging UI element 135*a* causes the head-wearable device 110 to display an augmented representation of a messaging UI 160 associated with a messaging application of the wrist-wearable device 188.

FIG. 1N illustrates the augmented representation of the messaging UI 160. In some embodiments, the augmented representation of the messaging UI 160 includes message thread UI 162 including a contact UI element 164, one or more UI elements for received messages (e.g., received message UI element 166), one or more UI elements for sent messages (e.g., sent message UI element 168). In some embodiments, the received and/or sent messages can be text, images, audio files, video, contacts (e.g., phone numbers, emails, etc.), and/or other digital content. The contact UI element 164 can be selected from within the augmented representation of the messaging UI 160, which, when selected by the user 130, causes the augmented representation of the messaging UI 160 to be updated to show additional information about the contact (e.g., name, phone number, email, address). Similarly, each received and/or sent message UI can be selected from within the augmented representation of the messaging UI 160 to provide additional information about the message, such a delivery time, a read time, metadata associated with the message, attachments, etc.

In some embodiments, the augmented representation of the messaging UI 160 can include a digital keyboard and/or other UI elements that allow the user to input one or more message, send one or more messages. In some embodiments, the augmented representation of the messaging UI 160 includes an UI element that allows the user to call (e.g., audio or video call) a contact.

FIG. 1O illustrates selection of the camera UI element 135*b* via the augmented representation 125 of the UI displayed on the wrist-wearable device 188. Selection of the camera UI element 135*b* causes the head-wearable device 110 to display an augmented representation of a camera UI 170 associated with a camera application of the wrist-wearable device 188 and/or head-wearable device 110.

FIG. 1P illustrates the augmented representation of the camera UI 170. In some embodiments, the augmented representation of the camera UI 170 includes a preview image 172 that provides a representation of the image data captured by the imaging device 128 of the wrist-wearable device 188. In some embodiments, the augmented representation of the camera UI 170 includes an switch camera UI element 176 and a capture UI element 174. The capture UI element 174, when selected from within the augmented representation of the camera UI 170, cause a communicatively coupled imaging device to capture image data. For example, as shown in FIG. 1P, selection of the capture UI element 174 causes the imaging device 128 of the wrist-wearable device to capture the image data. In some embodiments, a representation of the image data captured by the imaging device 128 can be a 2-dimensional render with higher resolution. In some embodiments, a representation of the image data captured by the imaging device 128 can be a 3-dimensional render which enhances user experience. For example, spatial positioning can be used to generate a 3-dimensional render of the image data captured by the wrist-wearable device 188 (e.g., sensor data and/or imaging data from the wrist-wearable device 188, the head-wearable device 110, and/or another communicatively coupled device can be used to generate the 3-dimensional render). In some embodiments, an electronic notification is presented to the user 130, via the augmented representation of the camera UI 170, to notify the user that the image data was capture as shown by electronic notification 173.

Turning to FIG. 1Q, the switch camera UI element 176 is selected from within the augmented representation of the camera UI 170. When the switch camera UI element 176, the augmented representation of the camera UI 170 is caused to update the preview image 172 such that a representation of the image data captured by another communicatively coupled imaging device 128 is presented to the user 130. For example, as shown in FIG. 1R, after the switch camera UI element 176 is selected, the preview image 172 is updated to show a representation of image data captured by the imaging device 128 of the head-wearable device 110. In some embodiments, the preview image 172 can be updated to provide a representation of image data captured from any communicatively coupled imaging device. In this way, the augmented representation of the camera UI 170 gives the user 130 greater flexibility in moving different camera angles and viewing different views.

FIG. 1S illustrates selection of a fitness UI element 135*e* via the augmented representation 125 of the UI displayed on the wrist-wearable device 188. Selection of the fitness UI element 135*e* causes the head-wearable device 110 to display an augmented representation of a fitness UI 180 associated with a fitness application of the wrist-wearable device 188 and/or head-wearable device 110.

FIG. 1T illustrates the augmented representation of the fitness UI 180 associated with the fitness application of the wrist-wearable device 188 and/or head-wearable device 110. In some embodiments, the augmented representation of the fitness UI 180 includes information about the user 130's ongoing physical workout including sensor data (e.g., biometric data, steps, distance), an elapsed time, a type of physical activity. In some embodiments, the augmented representation of the fitness UI 180 includes one or more user interface elements that allow the user 130 to provide feedback about the ongoing physical workout (e.g., feedback UI element 186).

FIG. 1U shows the user 130 lifting their head such that the augmented-display criterion is no longer satisfied. In some embodiments, in accordance with a determination that the sensor data from the head-wearable device 110 and/or the wrist-wearable device 188 indicates that the augmented-display criterion is no longer satisfied, the head-wearable device 110 is caused to cease presenting the augmented representation 125 of the user interface via the display 121 of the head-wearable device 110. For example, as shown in FIG. 1V, after the user 130 has moved their head, the wrist-wearable device 188 resumes presenting the UI at its display 120 while the head-wearable device 110 ceases to present the augmented representation 125 of the user interface.

FIG. 1W, shows the user wearing the head-wearable device 110 and using another electronic device. As described above, the head-wearable device 110 is caused to present an augmented representation of a UI in accordance with a determination that an augmented-display criterion is satisfied for the electronic device displaying a UI. In some embodiments, the augmented representation of the UI can be a UI displayed on any portable device communicatively coupled with the head-wearable device 110, such as a smartphone 1174*b*.

FIG. 1X illustrates an example of an augmented representation of the UI displayed on a smartphone 1174*b* communicatively coupled with the head-wearable device 110. In some embodiments, the augmented representation of the UI 195 displayed on the smartphone 1174*b* can be an extended display. For example, as shown in FIG. 1X, the UI of the smartphone 1174*b* display a home screen while the augmented representation of the UI 195 presents a music application UI. In this way, the user 130 is provide with multiple display to improve their overall productivity when using wearable devices, portable devices, electronic devices without a display, or any other electronic device described below in reference to FIGS. 11A-11B.

In some embodiments, before causing presentation of the augmented representation of the UI, a notification or indication is provided to the user 130 notifying the user 130 that an augmented representation of a UI is available (e.g., electronic notification 192). In some embodiments, the notification or indication is provided to the user 130 via the head-wearable device 110 and/or the electronic device whose UI is being augmented (e.g., the smartphone 1174*b*). In some embodiments, the user 130 must provide confirmation that they would like to see the augmented representation before it is displayed. Alternatively, in some embodiments, the augmented representation is presented without requiring user confirmation (e.g., because the user has already configured settings indicating that they would also like augmented representations to be displayed once available).

In some embodiments, an electronic device does not have a display or has the display in an off state. In such situations, the head-wearable device 110 can detect that the one or more electronic devices are within its field of view or that respective augmented-display criterion are satisfied, present, via its display 121, one or more controls for activating respective functions of the one or more electronic devices. In some embodiments, the head-wearable device 110 can switch between electronic devices and present each respective electronic device's augmented representation of a UI. This allows for seamlessly switching to augmented representations for a variety of different electronic devices.

In addition to devices that might be displaying user interfaces, devices that are either not currently displaying user interfaces or that do not have a display can also be associated with augmented representations. For instances, televisions in a display-off state can have augmented representations displayed at the head-wearable device that can allow for display of a remote-control-like UI, and, as one other example, electronic devices such as speakers or light switches that do not have associated displays can be associated with augmented representations that can allow for controlling volume and brightness levels, respectively. One example of this type of an augmented representation is discussed below.

Figure 2A:
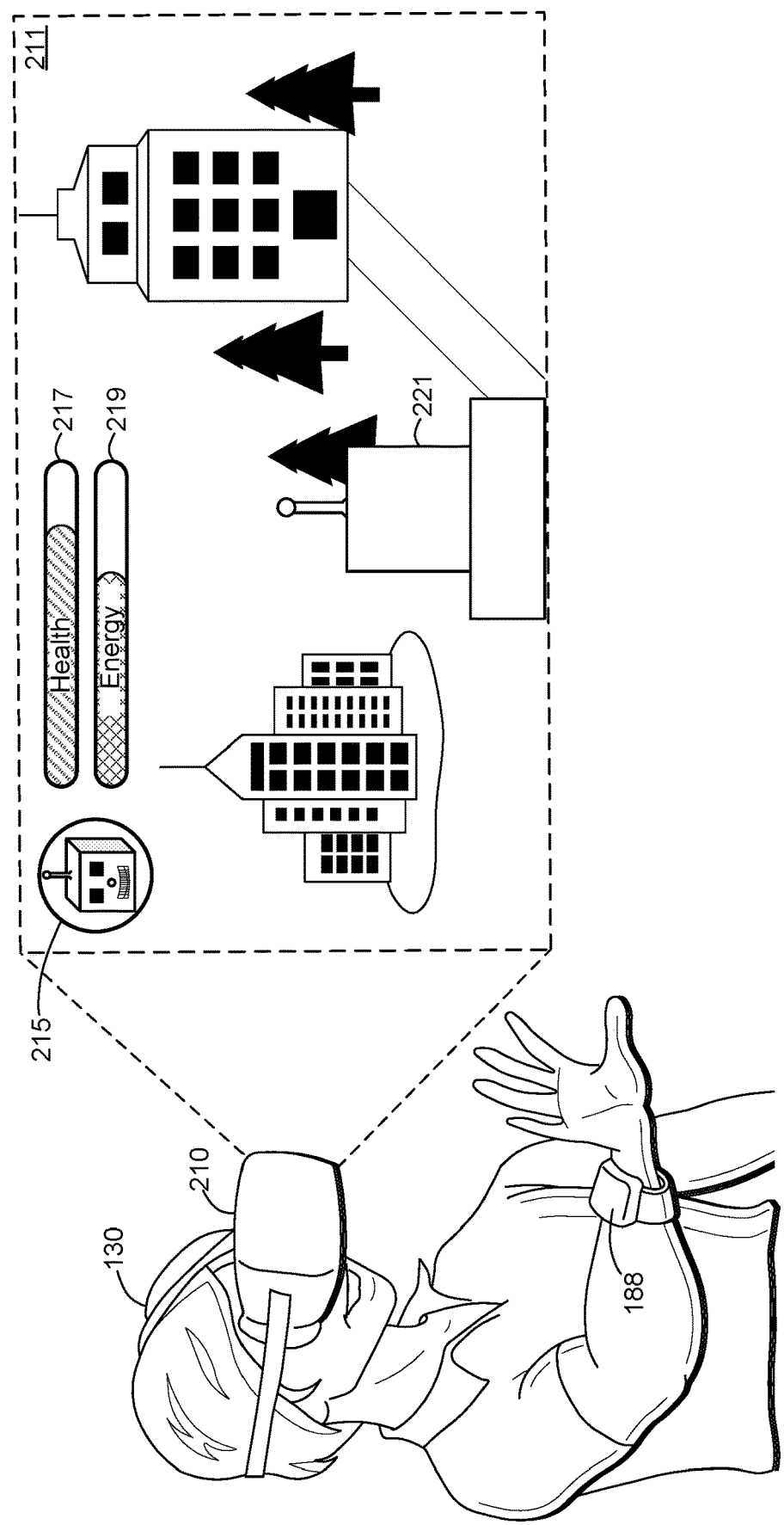
Figure 2B:
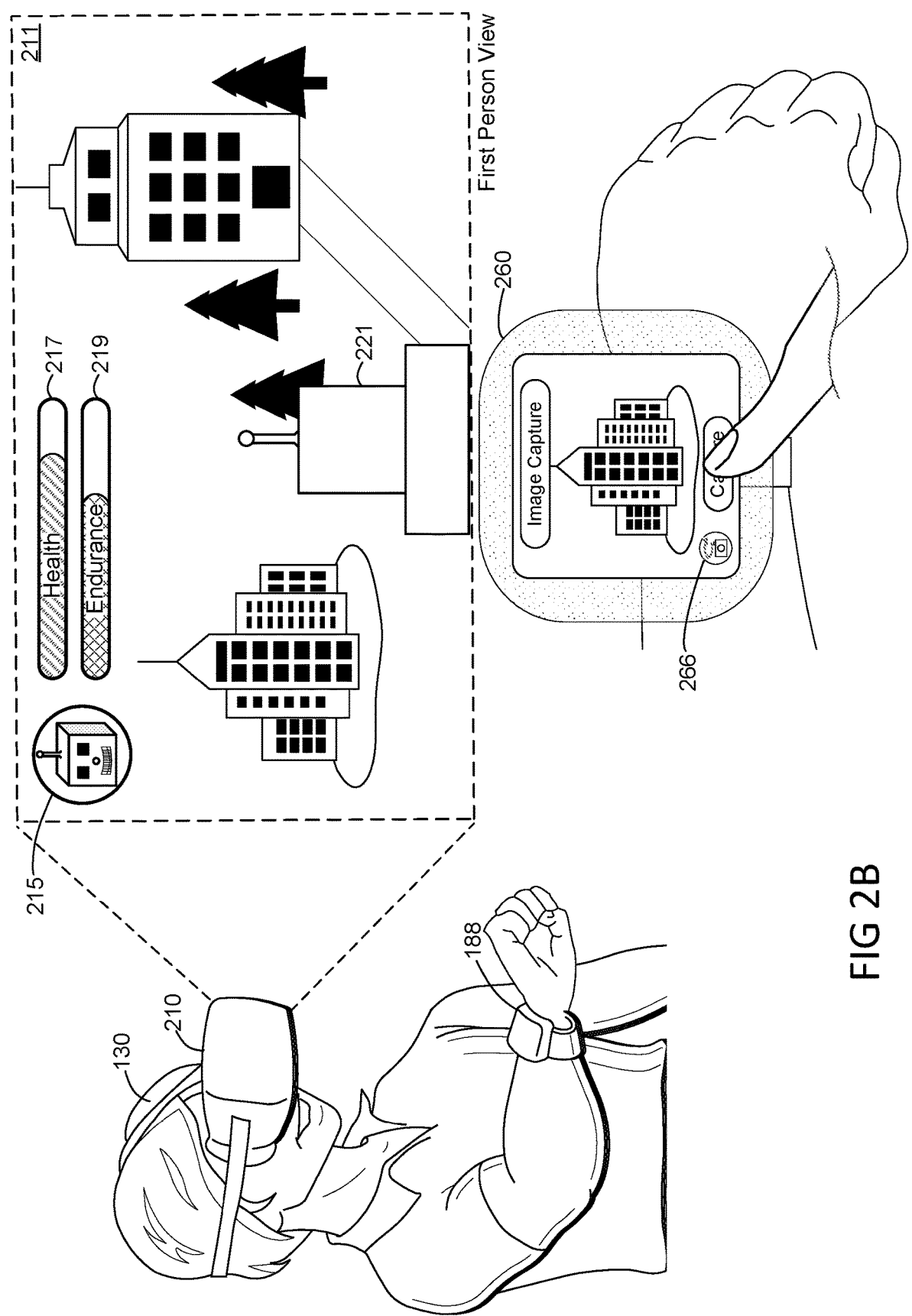
Figure 2C:
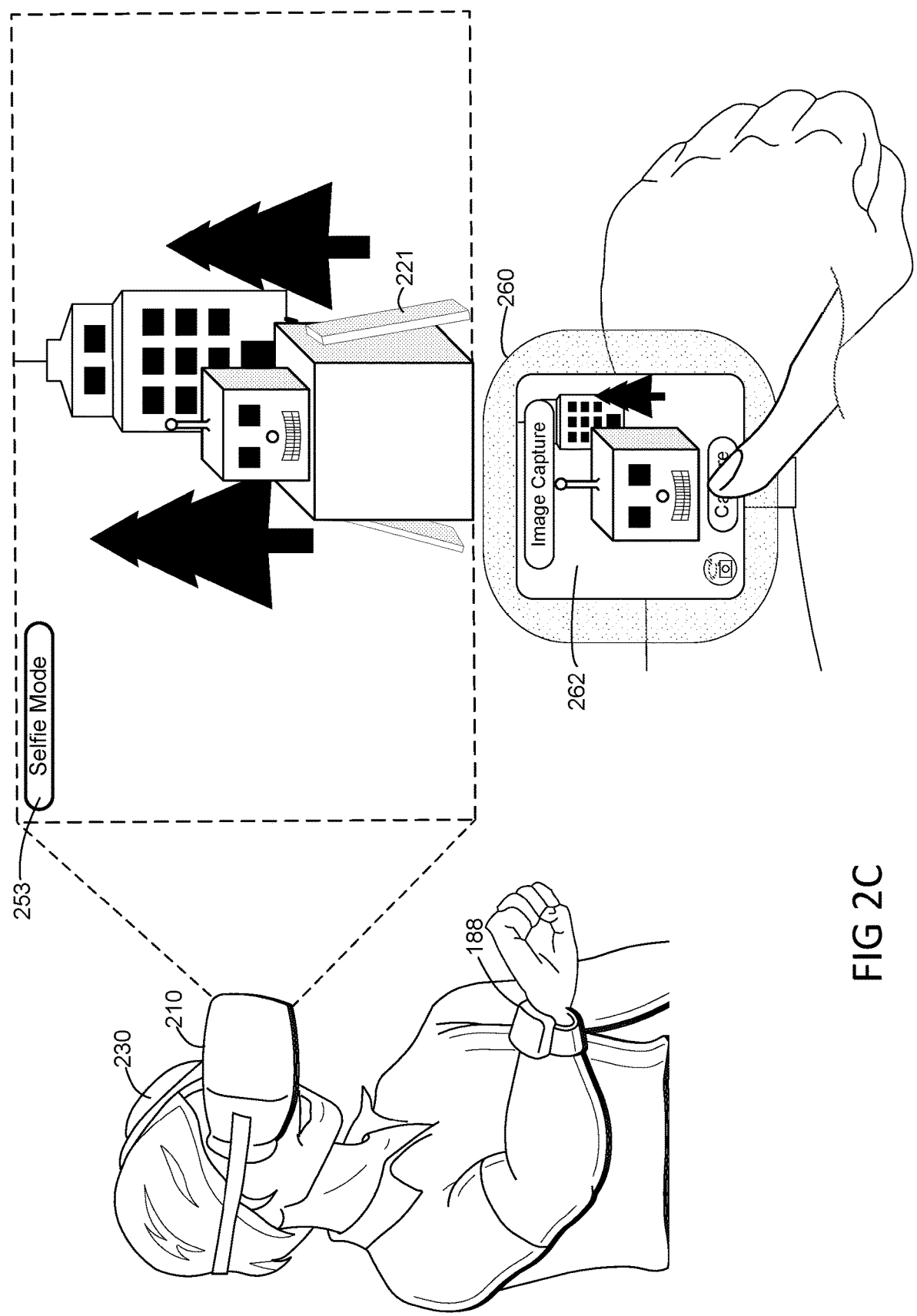

FIGS. 2A-2C illustrate another head-wearable device to present an augmented representation of a user interface associated with an electronic device, in accordance with some embodiments. The other head-wearable device is an AR headset 210 and the electronic device is a wrist-wearable device 188. The AR headset 210 is configured to present to the user 130 a visual representation of a virtual world 211. In some embodiments, the virtual world 211 is presented in conjunction with one or more UI elements, such as the user 130's avatar 215, the user 130's playable character 221, character specific information (e.g., health UI element 217 and energy UI element 219). In some embodiments, the UI elements presented with the virtual world 211 are specific to the virtual world. For example, a virtual game will have different UI elements than a virtual travel application.

In some embodiments, the wrist-wearable device 188 operates as a controller for the virtual world 211. In other words, the wrist-wearable device 188 can be used to interact with one or more UI elements or AR objects in the virtual world 211. Additionally or alternatively, in some embodiments, the wrist-wearable device 188 is configured to provide the user 130 with additional information within the virtual world 211. For example, a user 130 wearing the AR headset 210 and the wrist-wearable device 188 can look down at the wrist-wearable device 188 (satisfying an augmented-display criterion), which causes the AR headset 210 to present an additional UI in the virtual world 211. For example, as shown in FIG. 2B, the AR headset 210 can present a representation of an image capturing UI 260 displayed on the wrist-wearable device 188 within the virtual world 211. Further, the user 130 can use the representation of an image capturing UI 260 to capture image data of the virtual world 211. In some embodiments, the user 130 can use the representation of the image capturing UI 260 to adjust an image capture angle. For example, the user can select a camera switch UI element 266 that allows the user 130 to capture a selfie within the AR environment. As shown in FIG. 2C, the user 130 can view a preview of the image data 262 via the representation of the image capturing UI 260. In some embodiments, the user can make the camera within the AR environment stationary, which allows the user 130 to position themselves within the virtual world 211 as desired. Similarly, the user 130 can adjust a capture angle the camera within the AR environment to allow the user 130 with greater flexibility in capturing personalized images.

The above example is non-limiting; different UIs can be presented to the user in the virtual world 211 to allow the user 130 to interact with the AR environment. In some embodiments, the UIs presented in an AR environment provide the user with a quick connection to the real world. For example, a user 130 can receive a call while wearing the AR headset 210 and the user 130 can use a representation of a UI displayed at the wrist-wearable device 188 to answer the call.

Figure 3:
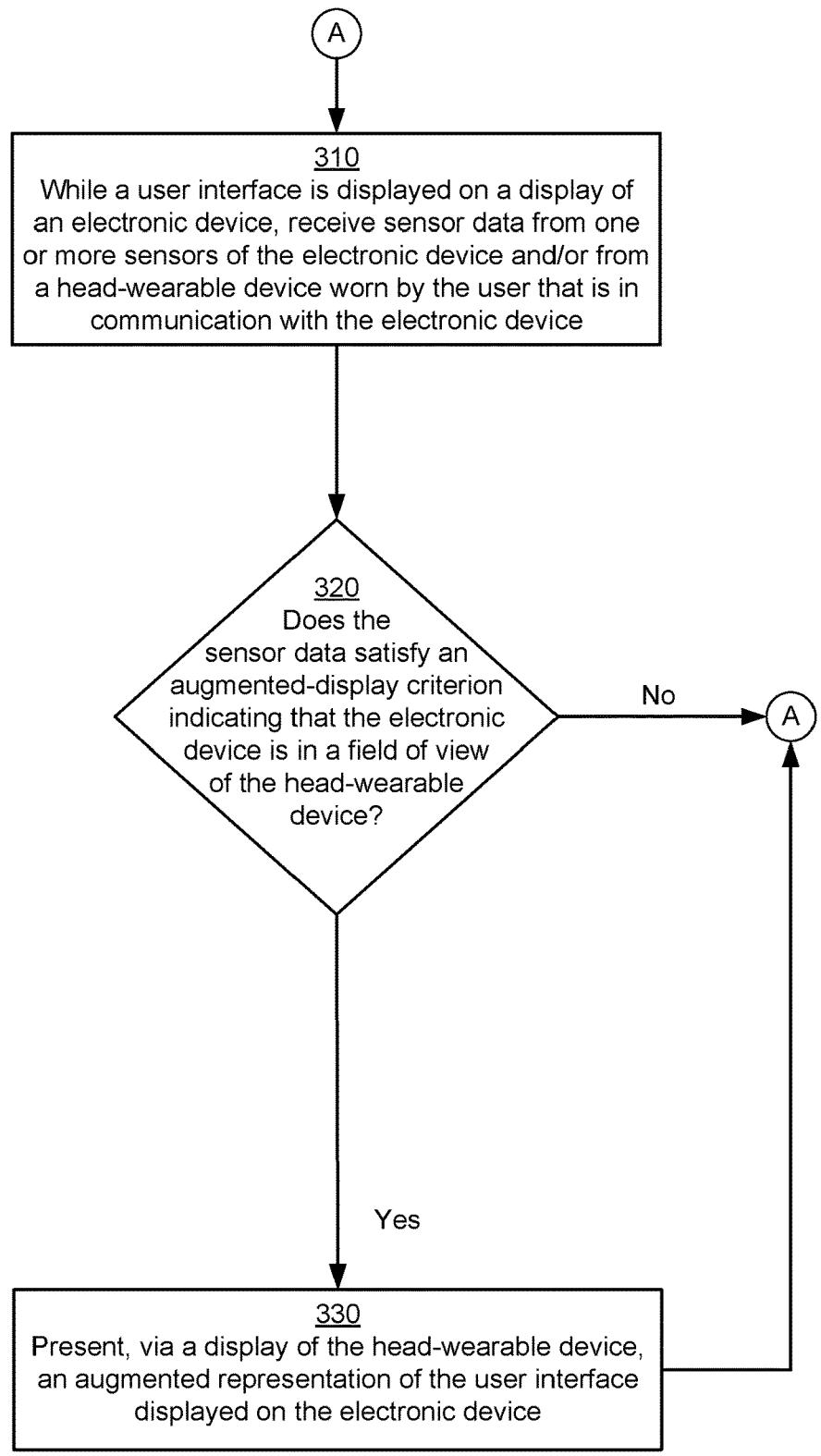
FIG. 3 is a flow diagram illustrating a method of using a head-wearable device to present an augmented representation of a user interface displayed by an electronic device, in accordance with some embodiments.

FIG. 3 is a flow diagram illustrating a method of using a head-wearable device 110 to present an augmented representation of a user interface associated with an electronic device, in accordance with some embodiments. Operations (e.g., steps) of the method 300 can be performed by one or more processors of one or more devices described below in reference to FIGS. 11A-11B (e.g., a computer 1174a, a smartphone 1174b, a controller 1174c, a head-wearable device 110, a wrist-wearable device 188, etc.). In some embodiments, the head-wearable device 110 device is communicatively coupled with one or more sensors (e.g., various sensors 1125c described below in reference to FIGS. 11A-11B), an imaging device 1155, a microphone, and a speaker to perform the one or more operations. In some embodiments, the head-wearable device 110 is communicatively coupled with a display 1130 (FIGS. 11A-11B). At least some of the operations shown in FIG. 3 correspond to instructions stored in a computer memory or computer-readable storage medium (e.g., memory 1160a, 1160b, and 1160c; FIGS. 11A-11B). Operations of the method 300 can be performed by a single device (e.g., a head-wearable device 110) or at least two devices communicatively coupled to one another (e.g., the head-wearable device 110 and a wrist-wearable device 188, a smartphone, a computer, a server 1170, etc.). Additionally or alternatively, operations of the method 300 can be performed by instructions stored in memory or computer-readable medium of another device communicatively coupled to one or more devices described above in reference to FIGS. 11A-11B.

The method 300 includes (310) while a user interface is displayed on a display of an electronic device, receiving sensor data from one or more sensors of the electronic device and/or from the head-wearable device 110 worn by the user that is in communication with the electronic device. For example, the sensor data can be received from a wrist-wearable device 188, head-wearable device 110, or any other device communicatively coupled to the head-wearable device 110, as shown and described above in reference to FIGS. 1C-1X. In some embodiments, sensor data can be received from an electronic device that the user wearing the head-wearable device 110 is focused on.

The method 300 further includes (320) determining whether the sensor data satisfies an augmented-display criterion indicating that the electronic device is in a field of view of the head-wearable device 110. In response to a determination that the sensor data satisfies an augmented-display criterion ("No" at operation 320), the method 300 returns to operation (310) and awaits sensor data from one or more sensors of the electronic device.

Alternatively, in response to a determination that the sensor data satisfies an augmented-display criterion ("Yes" at operation 320), the method 300 includes presenting (330), via a display of the head-wearable device 110, an augmented representation of the user interface displayed on the electronic device. For example, as shown in FIG. 1C-1X, when it is determined that the received sensor data satisfies an augmented-display criterion, different augmented representations of the wrist-wearable device 188's UIs or application specific UIs are presented via the head-wearable device 110. The augmented representation of the user interface presented by the head-wearable device 110 is presented as long as the augmented-display criterion is satisfied. When the augmented-display criterion is no longer satisfied, the method 300 returns to operation (310) and awaits sensor data from one or more sensors of the electronic device.

Figure 4:
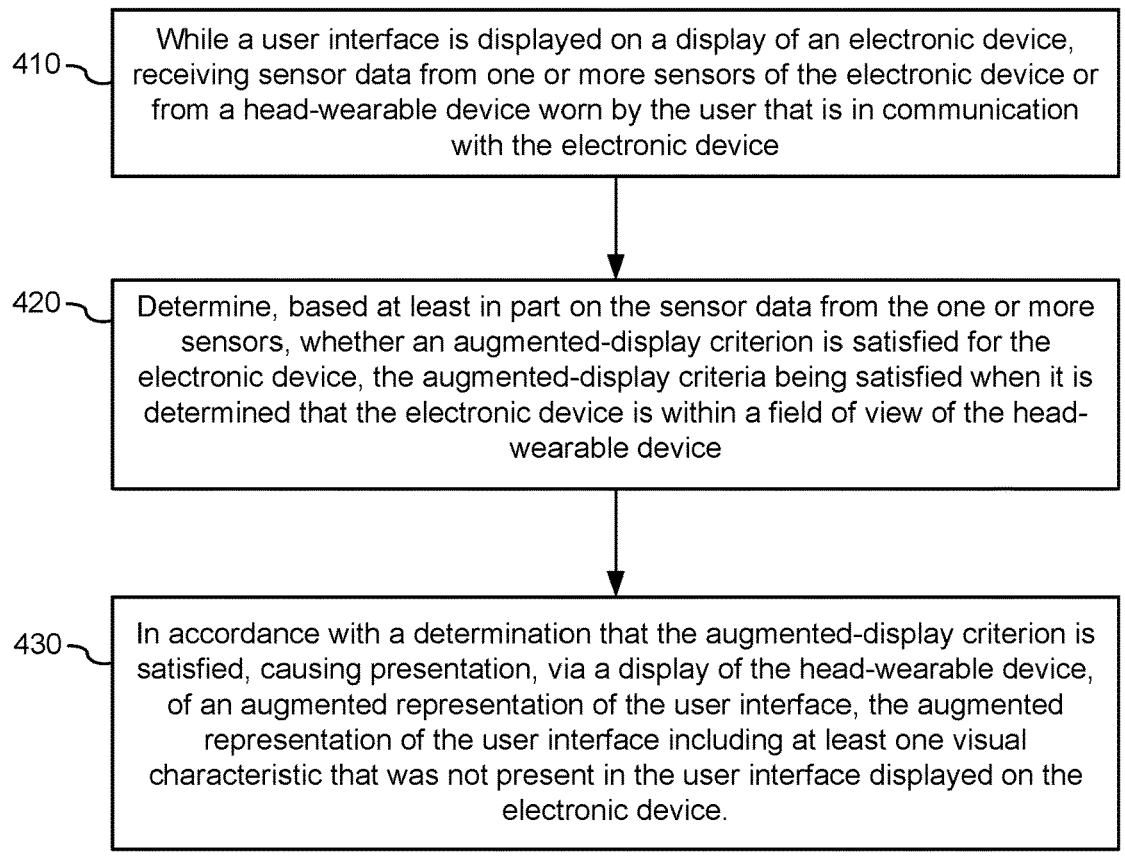
FIG. 4 is a detailed flow diagram illustrating a method of using a head-wearable device to present an augmented representation of a user interface displayed by an electronic device, in accordance with some embodiments.

FIG. 4 is a detailed flow diagram illustrating a method of using a head-wearable device 110 to present an augmented representation of a user interface displayed by an electronic device. Similar to method 300 of FIG. 3, operations of the method 400 can be performed by one or more processors of the one or more devices described below in reference to FIGS. 11A-11B. At least some of the operations shown in FIG. 4 correspond to instructions stored in a computer memory or computer-readable storage medium. Operations of the method 400 can be performed by a single device or at least two devices communicatively coupled to one another. Additionally or alternatively, operations of the method 400 can be performed by instructions stored in memory or computer-readable medium of another device communicatively coupled to one or more devices described above in reference to FIGS. 11A-11B. For ease, method 400 is described as being performed at a head-wearable device 110 (FIGS. 1A-2C).

Method 400 includes (410) while a user interface is displayed on a display of an electronic device, receiving sensor data from one or more sensors of the electronic device or from a head-wearable device 110 worn by the user 130 that is in communication with the electronic device. In some embodiments, the head-wearable device 110 are smart glasses and the electronic device is a wrist-wearable device 188. Alternatively, in some embodiments, the head-wearable device 110 is an artificial reality (AR) headset. In some embodiments, the electronic device is a portable device, such as a smartphone 1174b (FIGS. 11A-11B) or an intermediary device. In some embodiments, the one or more sensors of the electronic device and/or the head-wearable device include one or more inertial measurement unit (IMU) sensors, ultra-wideband (UWB) sensors, accelerometers, and magnetometers. Additional examples of the one or more sensors are provided below in reference to FIGS. 11A-11B.

Method 400 includes determining (420) based at least in part on the sensor data from the one or more sensors, whether an augmented-display criterion is satisfied for the electronic device, the augmented-display criterion being satisfied when it is determined that the electronic device is within a field of view of the head-wearable device 110. In some embodiments, the sensor data used to determine whether the augmented-display criterion is satisfied includes one or more of position and orientation data from an inertial measurement unit, neuromuscular signals sensed by an EMG, signal-strength data obtained from a communication radio. The sensor data from each sensor can be used individually or combined to determine whether the augmented-display criterion is satisfied.

In some embodiments, the electronic device can be determined to be in a field of view of the head-wearable device 110 based on an imaging device of the electronic device, an imaging device of the head-wearable device 110, or a combination of the two. In some embodiments, an imaging device of the head-wearable device 110 is initiated to obtain transient image data that is used to detect the presence of the electronic device, an imaging device of the electronic device is initiated to obtain transient image data that is used to detect the presence of the head-wearable device 110, or a combination of the two. Alternatively, in some embodiments, looking down at the electronic device while wearing the head-wearable device 110, automatically causes the imaging device of the head-wearable device 110 and/or the imaging device of the electronic device to activate to obtain transient image data that is used to detect the presence of the head-wearable device 110, the electronic device, or a combination of the two.

Method 400 further includes, in accordance with a determination (430) that the augmented-display criterion is satisfied, causing presentation, via a display of the head-wearable device 110 of an augmented representation of the user interface, the augmented representation of the user interface including at least one visual characteristic that was not present in the user interface displayed on the electronic device. In some embodiments, at least one visual characteristic that was not present in the user interface displayed in the electronic device is one or more of a larger size of the user interface and one or more additional user interface elements. In some embodiments, the at least one visual characteristic is the larger size of the user interface, and the causing presentation of the augmented representation of the user interface includes magnifying the user interface such that it appears, when viewed through the head-wearable device, to be in a region of space that is above the electronic device. For example, the augmented representation of the user interface can include magnifying the user interface in a 3-dimensional space above a surface of the display of the electronic device. Additional examples of the augmented representations of user interfaces are provided above in reference to FIGS. 1C-1T. In some embodiments, after a determination that the augmented-display criterion is satisfied, the method can include transferring data between the electronic device and the head-wearable device 110 to facilitate the presentation and interaction with an augmented representation of a user interface. The data can be provided via WifiDirect and/or other communications interface described below in reference to FIGS. 11A-11B.

In some embodiments, additional checks are performed in addition to checking for satisfaction of the augmented-display criterion, such as ensuring that a respective electronic device is communicatively coupled with the head-wearable device 110 and/or that the respective electronic device is associated with a same user 130 as the head-wearable device 110 (e.g., by ensuring that the devices are logged into common accounts). Some embodiments can make use of device-specific augmented-display criterion, which can mean that different criterion is used for different types of devices (e.g., different criterion for smartphones as compared to smartwatches, etc.).

In some embodiments, before causing presentation of the augmented representation of the user interface, the method 400 includes providing an indication to the user 130 that an augmented representation is available. The indication can be presented at one or both of the electronic device and the head-wearable device 110. In some embodiments, the user 130 must provide confirmation that they would like to see the augmented representation before it is displayed, while other embodiments proceed without requiring such confirmation (e.g., because the user 130 has already configured settings indicated that they would also like augmented representations to be displayed once available).

In some embodiments, the method 400 includes repositioning the augmented representation of the user interface, via the display of the head-wearable device 110, as the electronic device is moved and while the augmented-display criterion remains satisfied, such that the augmented representation of the user interface remains above the electronic device as it is repositioned. For example, if the user 130 is walking while looking at their wrist-wearable device 188 (satisfying the augmented-display criterion) and viewing an augmented representation of the user interface through the head-wearable device 110, the augmented representation of the user interface can be repositioned to appear above of the electronic device even as the user 130's arms move or their heard moves around to avoid crashing into objects or people. In some embodiments, the augmented representation of the user interface is oriented and repositioned using special positioning. This makes utilizing the augmented representation of the user interface while moving in any way more user 130 friendly so that, with each small movement, the augmented representation of the user interface is not deactivated every time a slight movement is made and the augmented representation of the user interface is presented in an accurate position in relation to each device.

In some embodiments, in conjunction with presenting the augmented representation of the user interface via the display of the head-wearable device 110, the method 400 incudes causing the display of the electronic device to cease displaying the user interface. For example, the wrist-wearable device 188 can go to sleep/turn off, or in additional embodiments, the wrist-wearable could display other information. Automatically turning off the display of an electronic device while an augmented representation of the user interface of the electronic device is presented by the head-wearable device 110 conserves the battery life of the electronic device. Furthermore, by turning off the display of the electronic device, the method 400 increases security by only allowing the user 130 of the head-wearable device 110 to view data displayed by the UI of the electronic device.

In some embodiments, the method 400 includes, while presenting the augmented representation of the user interface via the display of the head-wearable device 110, detecting a user input selecting a user interface element from within the augmented representation of the user interface, the user element being associated with an input command. The method 400 further includes, in response to the user 130, causing an update to the augmented representation of the user interface based on performance of the input command. Thus, the augmented representation can be directly interacted with to cause performance of commands (e.g., the user interface elements within the augmented representation can be selected without needing to interact with the electronic device). The resulting augmented representation can be specific to an application. For example, if a messaging application is initiated, a message thread can be presented to the user 130 in an augmented representation of the messaging application UI. Similarly, image viewing applications can display images, music applications can display album covers and audio tracks, streaming applications can show video tracks or live streams, etc. The user 130 will be able to perform specific actions at each application from the augmented representations of the respective application UIs. For example, the user 130 would be able to send messages, select photos, capture video, start workout, etc. via the augmented representations of the respective UIs. Additional examples of the different augmented representations of the UIs are provide above in reference to FIGS. 1C-1X.

In some embodiments, the user interface is associated with a first application executing on the electronic device, and the method 400 further includes, while causing presentation of the augmented representation via the display of the head-wearable device 110, receiving, via the electronic device, information associated with an electronic notification from a second application executing on the electronic device and causing the information associated with the electronic notification to be presented via the display of the head-wearable device 110. For example, if the user 130 is viewing a photo in a photo application, and the user 130 receives a text message, the text message notification can be displayed on the head-wearable device 110 in addition to the photo. Alternatively, the user 130 can set their settings so that for all or specific notifications, a notification could occupy the entire display and cause the head-wearable device 110 to cease presenting the information currently displayed. In some embodiments, the information associated with the electronic notification is displayed only via the display of the head-wearable device 110 while presentation of the augmented representation via the display of the head-wearable device 110 is ongoing. Additional examples of the electronic notifications are provided above in reference to FIGS. 1F and 1G.

In some embodiments, the first application is a fitness application and the initiation of the application causes the head-wearable device 110 to present an augmented representation for a fitness user interface including captured biometric information. The biometric information can include heart rate, steps, workout time, etc. An example of an augmented representation of a fitness application UI is provided above in reference to FIG. 1T.

In some embodiments, the application is an image viewing application and initiation of the application presents an augmented representation of an image viewing user interface including one or more stored images via the head-wearable device 110. The user interface can be a gallery that allows the user 130 to view different images stored on the electronic device (e.g., the wrist-wearable device 188) or any other device communicatively coupled to the head-wearable device 110. In some embodiments, the user can view one or more images at once on the image viewing user interface.

In some embodiments, while the head-wearable device 110 displays the augmented representation of the image viewing interface, the method 400 includes detecting a user input selecting, via the augmented representation of the image viewing user interface, a user element associated with an image of the one or more stored images. In response to the user input, the method includes presenting an augmented representation of the image selected via the user input. In some embodiments, the augmented representation of the image includes a 3-dimensional representation of the image. In this way, the method improves the user 130's experience by increasing user 130 immersion and interaction with an image.

In some embodiments, the application is an image capturing application and initiation of the application causes the head-wearable device 110 to present an augmented representation of a field of view of an imaging device communicatively coupled with the head-wearable device 110. As described above in reference to FIGS. 1O-1R, the user 130 can capture an image using the augmented representation of the field of view of the imaging device. The augmented representation of the field of view of the imaging device gives the user 130 greater flexibility in moving the camera into different angles and different views. In some embodiments, the augmented representation of the field of view of the imaging device is a 3-dimensional representation of image data captured by the imaging device communicatively coupled with the head-wearable device 110. For example, while the user 130 has the imaging device pointed at one or more objects, the live feed displayed on the head-wearable device 110 is a 3-dimensional representation. Additionally, in some embodiments, after the image data is captured, a representation of the image data displayed on the head-wearable device 110 (e.g., via the augmented representation of the image viewing user interface) is presented as a 3-dimensional render.

In some embodiments, the imaging device is a first imaging device and the head-wearable device 110 is communicatively coupled with a second imaging device. The method 400 can further include, while the head-wearable device 110 presents the augmented representation of the field of view of the first imaging device, detecting a user 130 input selecting, via the augmented representation of the field of view of the first imaging device, a user element configured to cause the head-wearable device 110 to present an augmented representation of the field of view of the second imaging device. In response to the user input, the method 400 includes presenting, via the head-wearable device 110, the augmented representation of the field of view of the second imaging device. For examples, as shown in FIGS. 1O-1R, the user 130 can switch between the camera of the wrist-wearable device 188 and the camera of the head-wearable device 110. The user 130 can switch between the imaging device on the electronic device, the imaging device on the head-wearable device 110, and any device communicatively coupled to the head-wearable device 110. For example, the user can switch from the imaging devices of the head-wearable device 110 and/or the wrist-wearable device 188 to a communicatively coupled camera of a smartphone, a table, a computer, or a communicatively coupled security camera.

In some embodiments, the method includes, while an additional electronic device, distinct from the electronic device, is displaying an additional user interface, receiving further sensor data from one or more sensors, and in accordance with a determination that the augmented-display criterion is satisfied for the additional electronic device, causing presentation, via the display of the head-wearable device 110, of an augmented representation of the additional user interface. The augmented representation of the additional user interface including at least one visual characteristic that was not present in the additional user interface displayed on the additional electronic device. For example, if the user 130 looks over at their smartphone 1174*b* and augmented-display criterion for the smartphone 1174*b* is satisfied, the head-wearable device 110 presents, via its display, an augmented representation of the smartphone 1174*b* UI. Examples of an augmented representation of a smartphone 1174*b* UI is provided above in reference to FIGS. 1W and 1X. By allowing users to seamlessly switch between augmented representations of UIs for a variety of different electronic devices, the method disclosed herein improves user experience by reducing the number of physical interactions required with each device and allows the user to have access to all of their information from different devices.

In addition to devices that might be displaying user interfaces, devices that are either not currently displaying user interfaces or that do not have a display can also be associated with augmented representations. For instance, televisions in a display-off state can have augmented representations displayed at the head-wearable device 110 that can allow for display of a remote-control-like user interface. As one other example, electronic devices such as speakers or light switches that do not have associated displays can be associated with augmented representations that can allow for controlling volume and brightness levels, respectively. Additionally, a wrist band without a display can also be associated with augmented representations, and display a watch user interface through the head-wearable device 110. One example of this type of an augmented representation is discussed below. In some embodiments, the method 400 includes, while causing presentation of the augmented representation of the user interface via the display of the head-wearable device 110, detecting one more electronic devices within the field of view of the head-wearable device that either do not have a display or are in a display-off state, and in response to the detecting, causing presentation via the display of the head-wearable device 110 of one or more controls for activating respective functions of the one more electronic device.

In some embodiments, the augmented representation of the user interface is an AR user interface presented to the user in an AR environment via the display of the head-wearable device 110. In an AR environment, the user can use the interaction between the head-wearable device and another electronic device (e.g., the wrist-wearable device or a controller) to interact with AR UIs. In some embodiments, the user can set up a remote or stationary camera that can be control remotely. Additionally, the user can see an image preview via the augmented representation of the AR UI while capturing an image. In some embodiments, the image captured is an image of the AR environment and/or their AR avatar. In some embodiments, the user 130 can simultaneously control the capture of an image in the AR environment as well as a camera in the real world (e.g., control an AR camera and a webcam), which allows the user to capture reactionary images that are associated with an event that occurred in an AR environment. Additional examples of the augmented representation of the AR UI are provided above in reference to FIGS. 2A-2C.

In some embodiments, the method 400 includes receiving updated sensor data from the one or more sensors and, in accordance with a determination that the updated sensor data indicates that the augmented-display criterion is no longer satisfied, ceasing to cause presentation of the augmented representation of the user interface via the display of the head-wearable device 110. In some embodiments, when the augmented-display criterion is no longer satisfied and presentation of the augmented representation of the user interface ceases, the electronic device resumes to present the user interface on its display. For example, as shown in FIGS. 1U and 1V, when the user 130 is no longer focused on the wrist-wearable device 188, the wrist-wearable device 188 resumes to present its UI on its display 120.

Method 400 is configured to emulate a wearable experience on the head-wearable device 110 (e.g., glasses). For example, a watch experience or user interface is reproduced and laid out to be optimal on the glasses screen or display. The head-wearable device 110 can emulate the experience of other devices, such as a tablet, a smartphone, public Kiosks (e.g., train tickets, airport terminals, bank ATMs), etc.

FIGS. 5A-5E illustrate receiving a hand-drawn gesture at a wrist-wearable device 188 and displaying the hand-drawn gesture with a predetermined typeface at a head-wearable device 110, in accordance with some embodiments. The hand-drawn gesture can be received at a touch-sensitive display of a wrist-wearable device 188 and modified into the predetermined typeface, as discussed in detail below. Alternatively, in some embodiments, as shown in FIGS. 5A-5E, the head-wearable device 110 displays an augmented representation of a UI (analogous to the augmented representations discussed above in reference to FIGS. 1A-1X) of the wrist-wearable device 188, such as a messaging UI 160, and allows the user to provide the hand-drawn gesture at the augmented representation of the user interface of the wrist-wearable device 188. In some embodiments, the augmented representation of the messaging UI 160 includes a message thread 162 including a contact element 164, one or more UI elements for received messages (e.g., received message UI element 166), and one or more UI elements for sent messages (e.g., sent message UI element 168). In some embodiments, the received and/or sent messages can be text, image data (e.g., video and/or image content), audio data, contact data (e.g., phone numbers, emails, etc.), and/or other digital content.

Figure 5A:
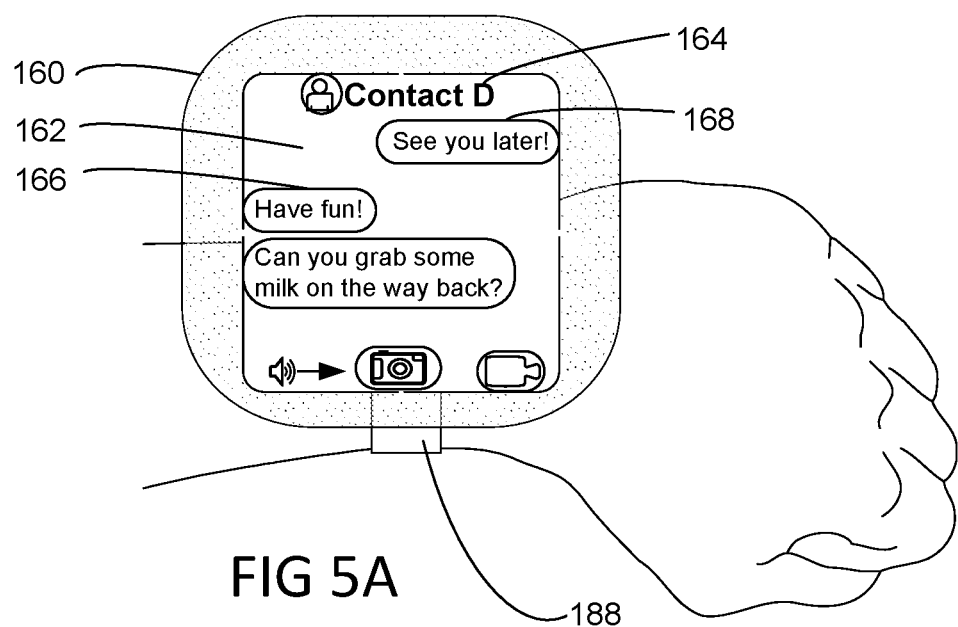
FIGS. 5A-5E illustrate receiving a hand-drawn gesture at a wrist-wearable device and displaying the hand-drawn gesture with a predetermined typeface at a head-wearable device, in accordance with some embodiments.
Figure 5B:
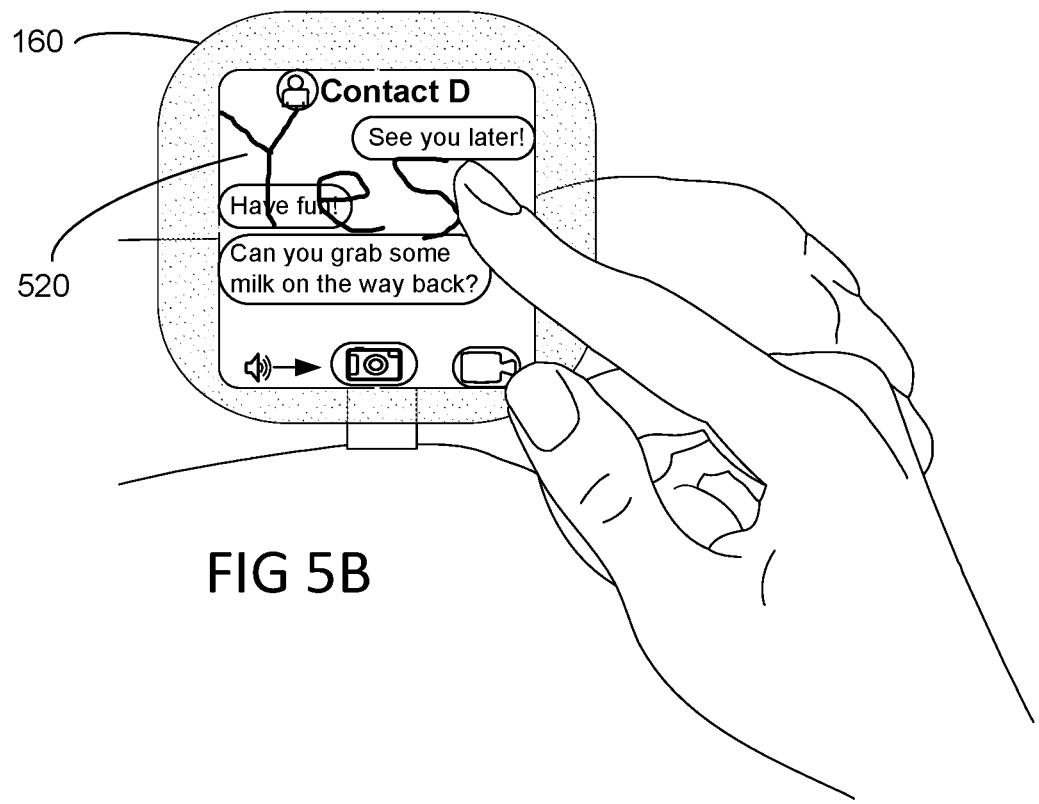

FIG. 5B illustrates a hand-drawn gesture input at the augmented representation of the messaging UI 160, in accordance with some embodiments. In some embodiments, the user 130 can provide one or more hand-drawn gestures via an augmented representation of a UI presented by a head-wearable device 110 that cause a hand-drawn message 520 (e.g., "Yes") to be presented at the augmented representation of the messaging UI 160. The one or more hand-drawn gestures can be detected from the sensor data and/or image data captured by the head-wearable device 110 and/or wrist-wearable device 188 as described above in reference to FIGS. 1A-5. In some embodiments, the head-wearable device 110 and/or the wrist-wearable device 188 detect hand gesture performed in-air or without interacting with a presented user interface. For example, instead of drawing "yes" on the display 120 or in an augmented representation of a UI, the user 130 can imitate the writing gesture on the hand wearing the wrist-wearable device 188, and based on the EMG and/or data, the text "yes" is presented in the augmented representation of the messaging UI 160.

In some embodiments, the head-wearable device 110 and/or the wrist-wearable device determine one or more symbols, gestures, or text based on the one or more hand-drawn gestures performed by the user 130. For example, the one or more hand-drawn gestures performed by the user 130 can be shorthand, acronyms, abbreviations, etc. and the head-wearable device 110 and/or wrist-wearable device 188 can generate inputs based on the shorthand, acronyms, abbreviations, etc. In some embodiments, the hand-drawn symbol, character, or message is associated with a longer form phrase, and the causing the head-wearable device 110 to present the typed message 530 to the user 130 includes causing the head-wearable device 110 to present the longer form phrase in the predetermined typeface. Although the above example describes the hand-drawn symbol as text, other symbols are also contemplated, such as emojis, emoticons, predetermined gestures (e.g., gestures that are associated with one or more commands that are performed when an associated hand-drawn symbol is detected, such as a user performing a thumbs-up gesture causing a thumbs-up emoji to be presented), and/or user customized gestures (e.g., user-defined gestures that are associated with one or more commands that performed when an associated hand-drawn symbol is detected). In some embodiments, the hand-drawn symbol, character, or message may be associated with a longer form phrase.

Figure 5C:
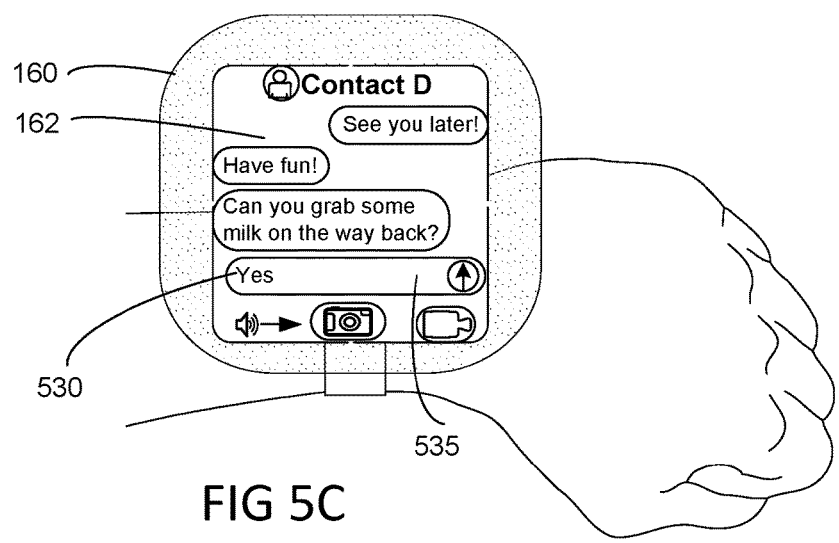

FIG. 5C illustrates generation of representations of one or more characters using a predetermined typeface based on a hand-drawn gesture, in accordance with some embodiments. In particular, head-wearable device 110 and/or the wrist-wearable device 188 determine one or more characters that were drawn by the hand-drawn gesture (e.g., handwritten message 520) and generate representations of the one or more character using a predetermined typeface (e.g., resulting in typed message 530). In this way, the user 130 is able to handwrite a message (e.g., via a touch-sensitive display, an augmented representation of a UI, in-air, etc.) and the handwritten message can be detected and generated into a typed message 530 that is presented to the user 130 by the wrist-wearable device 188 and/or the head-wearable device 110 (e.g., in the augmented representation of the messaging UI 160). The typed message 530 can be generated within a user message input UI element 535 of a user interface to allow the user 130 to review and/or confirm the generated message before it is sent. In some embodiments, the text-to-speech is performed on the typed message 530 (e.g., speakers 1117c; FIGS. 11A-11B) of the wrist-wearable device 188 and/or head-wearable device 110 read out the typed message 530) such that the user can review and confirm the message without looking at the wrist-wearable device 188 and/or head-wearable device 110.

In some embodiments, the predetermined typeface can be any of a number of fonts that have been selected by the user 130 or defined in a default configuration of the wrist-wearable device 188 and/or wrist-wearable device as the typeface to be used for rendering provided hand-drawn inputs. Examples of predetermined typeface include Times New Roman, Arial, Cambria, Courier New, and the like. In some embodiments, the predetermined typeface is selected from among a plurality of available predetermined typeface options based on a type or style of the hand-drawn gesture. For example, the hand-drawn gesture can be a hand-drawn message in cursive, block text, and the like, and the predetermined typeface can be selected to correspond with the hand-drawn message (e.g., a cursive typeface if the hand-drawn message is in cursive). In some embodiments, the predetermined typeface is selected from among a plurality of available typeface options based on a current application that is in focus on the wrist-wearable device 188 and/or the head-wearable device 110. For example, when the application in focus (e.g., in use) is a messaging application, one available typeface is used, and when the application in focus is a note-taking application, a different available typeface is used.

As described above, the typed message 530 can be determined by the head-wearable device 110 and/or the wrist-wearable device 188. In some embodiments, the typed message 530 is determined after receiving a request from the user to present the hand-drawn gesture using the predetermined typeface. In some embodiments, the request to present the hand-drawn gesture using the predetermined typeface is detected based on an in-air hand gesture detected by one or more sensors 1125a and/or imaging device 1155 (e.g., FIGS. 11A-11B) of the wrist-wearable device 188 and/or head-wearable device 110 and/or other request received at the wrist-wearable device 188 and/or head-wearable device 110 (e.g., surface contact gesture, UI inputs, etc.).

In some embodiments, the head-wearable device 110 presents the augmented representation of the messaging UI 160 and the typed message 530 (e.g., within the user message input UI element 535) along with an application for modification of the typed message 530. The typed message 530 can be modified by one or more in-air hand gestures performed by the user 130 and detected by sensors 1125a and/or imaging devices 1155 of the wrist-wearable device 188 and/or head-wearable device. Alternatively or in addition, in some embodiments, the typed message 530 is modified by one or more surface contact gesture, UI inputs, and/or other inputs received at the wrist-wearable device 188 and/or head-wearable device 110. In some embodiments, the hand-drawn gesture (which is used to generate the hand-drawn message 520 and/or the typed message 530) is a triggering event such that, when the hand-drawn gesture is received by the head-wearable device 110, the head-wearable device 110 is caused to present representations of the one or more characters using the predetermined typeface. In some embodiments, in response to receiving the hand-drawn gesture, the head-wearable device 110 selects an application to present and allow modification of the representations of the one or more characters using the predetermined typeface. The head-wearable device 110 can select of the application based on an operational context of the wrist-wearable device 188 and/or the head-wearable device 110. For example, the head-wearable device 110 can select of a messaging application based on the user 130 actively having a conversation with another user via a messaging thread.

Figure 5D:
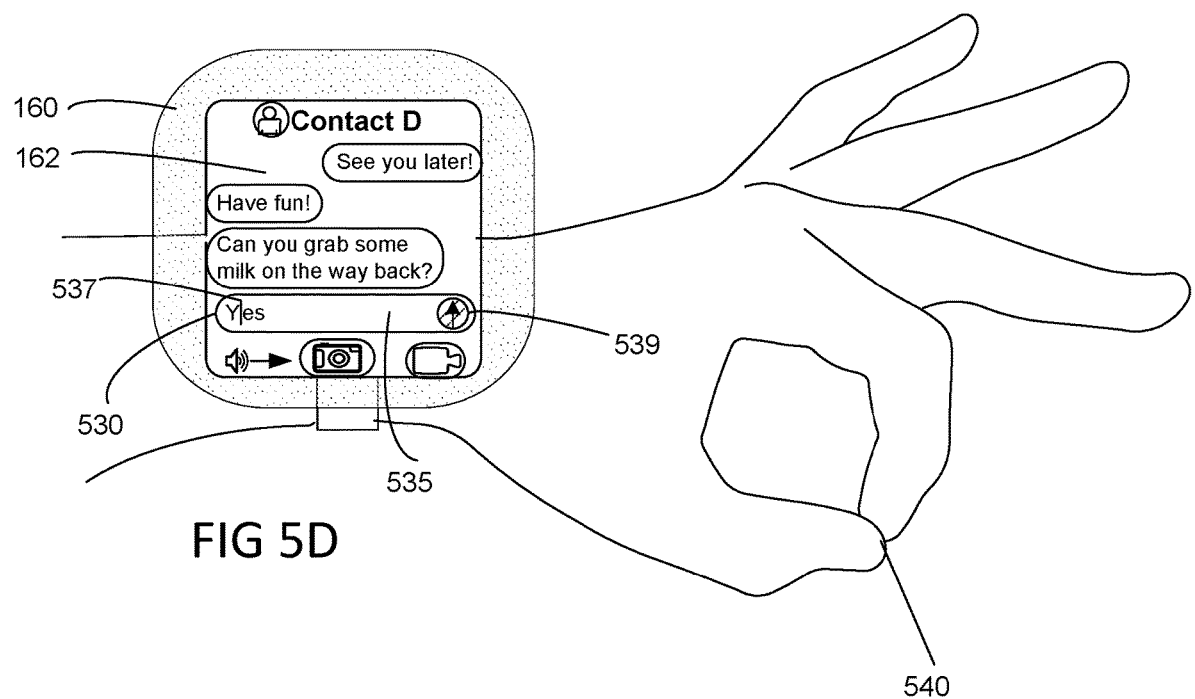

FIG. 5D illustrates modifications of representations of one or more characters using a predetermined typeface, in accordance with some embodiments. In particular, the user 130 can provide one or more inputs (e.g., an in-air hand gesture 540, such as an index finger pinch, a middle finger pinch, a finger snap, and the like) while the head-wearable device 110 presents representations of one or more characters using a predetermined typeface (e.g., typed message 530) to modify a portion of the representations of one or more characters. For example, the user 130 can modifying the representations of one or more characters by deleting and/or adding one or more characters (e.g., letters, symbols, etc.) of the representations of one or more characters, editing (e.g., adjusting the spelling and/or grammar) the representations of one or more characters, reformatting (e.g., changing the predetermined typeface) the representations of one or more characters, etc. In some embodiments, modification of representations of the one or more characters includes the movement of a cursor 537 presented alongside one or more characters such that the position of the cursor 537 dictates a point at which new characters, symbols, or messages are inserted into the representations of one or more characters.

In some embodiments, the head-wearable device 110 and/or wrist-wearable device 188 can receive and/or detect additional hand-drawn gestures, and, responsive to receiving and/or detecting the additional hand-drawn gestures, the head-wearable device 110 and/or the wrist-wearable device 188 can generate and present additional representations of one or more characters based on the additional hand-drawn gestures. In some embodiments, the additional representations of one or more characters are presented with the initial representations of one or more characters. In some embodiments, the additional representations of one or more characters modify the initial representations of one or more characters (e.g., using the cursor to select a location to add additional representations of the characters to the initial representations of the characters). Alternatively, in some embodiments the additional representations of one or more characters replace all or a portion of the initial representations of one or more characters.

After reviewing and/or modifying the representations of one or more characters the user 130 can provide additional inputs (e.g., an in-air hand gesture 540) to confirm and/or send the representations of one or more characters (e.g., cause the representations of one or more characters to be sent to an electronic device that is distinct from the wrist-wearable device 188 and the head-wearable device 110 and/or associated with another user). For example, as shown in FIG. 5D, the user 130 provides an input selecting the send UI element 539 and, in response to detecting selection of the send UI element 539, the wrist-wearable device 188 and/or the head-wearable device 110 send the representations of one or more characters, as discussed below in reference to FIG. 5E.

Figure 5E:
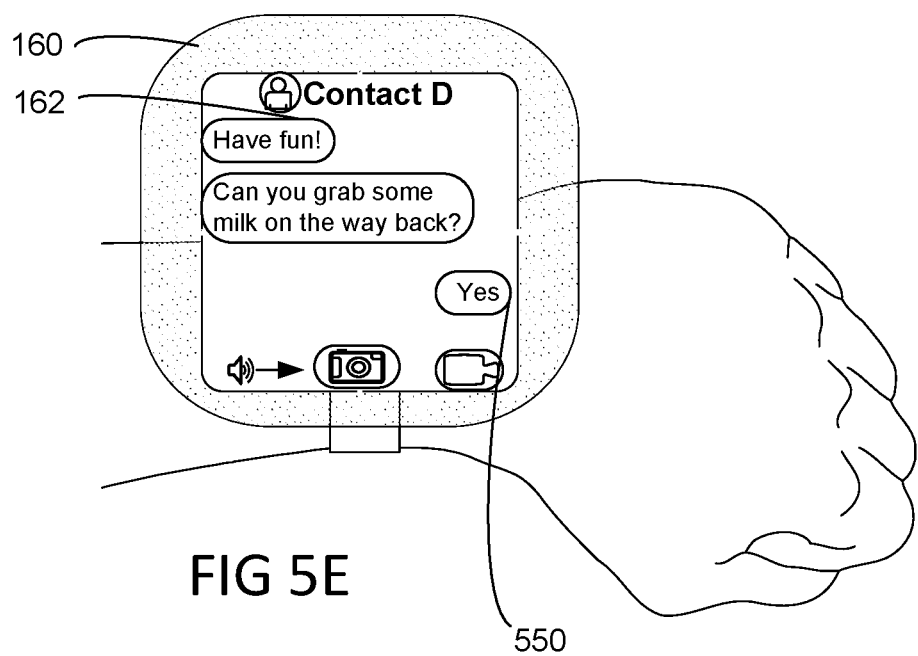

FIG. 5E illustrates one or more sent characters, in accordance with some embodiments. More specifically, FIG. 5E shows the augmented representation of the messaging UI 160 after the representations of one or more characters were sent by the wrist-wearable device 188 and/or the head-wearable device 110 (e.g., as shown by another sent message UI element 550). In some embodiments, the user 130 can provide additional inputs to scroll through the presented message thread and/or provide an additional hand-drawn gesture.

FIGS. 6A-6E illustrate another embodiment of a technique for detecting hand-drawn gestures and presenting a representation of the hand-drawn gestures using a predetermined typeface, in accordance with some embodiments. A user wearing a wrist-wearable device 188 and a head-wearable device 110 can receive and/or send one or more electronic messages via the wrist-wearable device 188 and/or the head-wearable device 110. For example, as shown in FIG. 1A, the user can receive an electronic message (e.g., via the wrist-wearable device 188, the head-wearable device 110, and/or another communicatively coupled electronic device (e.g., a smartphone, laptop, tablet, etc.)) and the head-wearable device 110 can display the electronic message (e.g., via a display 121, which can be a lens or a portion of a lens). In some embodiments, the electronic message is displayed as a message UI element 612 along with a contact element 614 (which identifies a sender of the electronic message) on a portion of the display 121. In some embodiments, the received and/or sent messages can be text, images, audio files, video, contacts (e.g., phone numbers, emails, etc.), and/or other digital content.

Figure 6A:
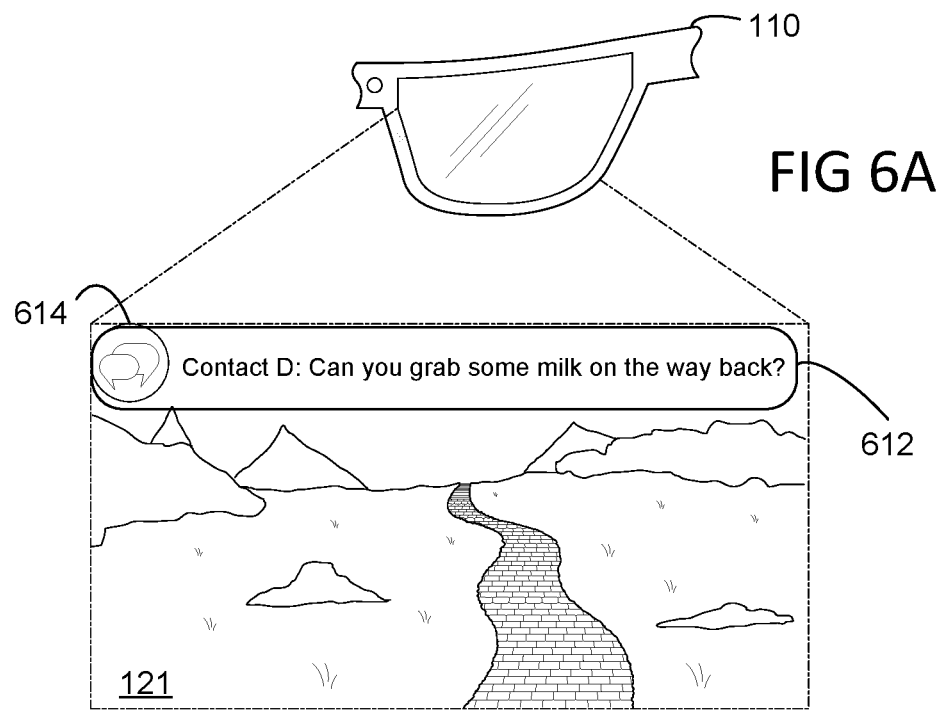
FIGS. 6A-6E illustrate another embodiment of a technique for detecting hand-drawn gestures and presenting a representation of the hand-drawn gestures using a predetermined typeface, in accordance with some embodiments.
Figure 6B:
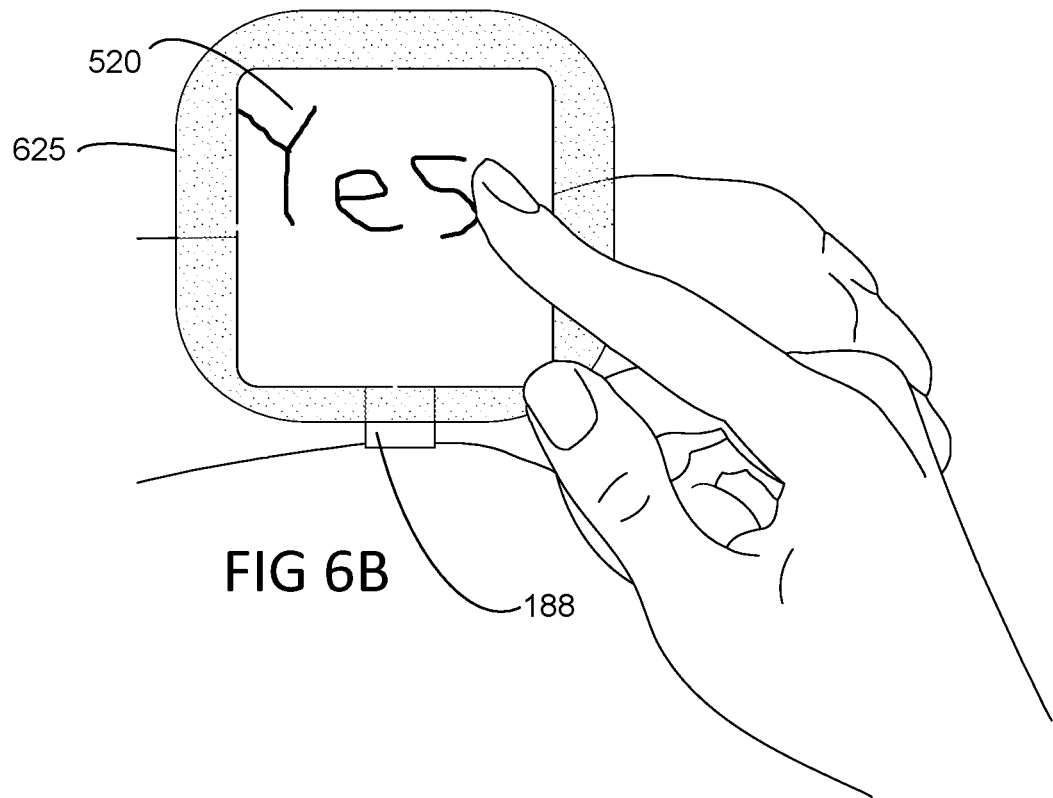

FIG. 6B shows the user responding to the received electronic message using one or more hand gestures, in accordance with some embodiments. As described above in reference to FIGS. 5A-5E, the wrist-wearable device 188 and/or the head-wearable device 110 can detect a hand-drawn gesture performed by the user, and the wrist-wearable device 188 and/or the head-wearable device 110 (or other communicatively coupled device, such as a smartphone) can determine that the hand-drawn gestures is associated with one or more characters. In response to a determination that the hand-drawn gestures is associated with one or more characters, the wrist-wearable device 188 and/or the head-wearable device 110 (or other communicatively coupled device) can cause a display communicative coupled with the wrist-wearable device 188 and/or the head-wearable device 110 to present a representation of the one or more characters (as described below in reference to FIG. 6C). The representation of one or more characters can be displayed using a predetermined typeface. For example, as shown in FIG. 6B, the user can perform one or more hand-drawn gestures at an augmented representation of a display 625 responsive to the received electronic message (e.g., the one or more hand-drawn gestures generating hand-drawn message 520). The hand-drawn message 520 can be presented to the user via the augmented representation of the display 625. Alternatively, as discussed below in reference to FIGS. 8A-8C, the user can perform the one or more hand-drawn gestures on a display or other surface (e.g., on a touch screen of the wrist-wearable device 188 and/or smartphone, on a table, etc.). In some embodiments, the user can perform the one or more hand-drawn gestures in-air (e.g., without contacting an electronic device or other surface).

Figure 6C:
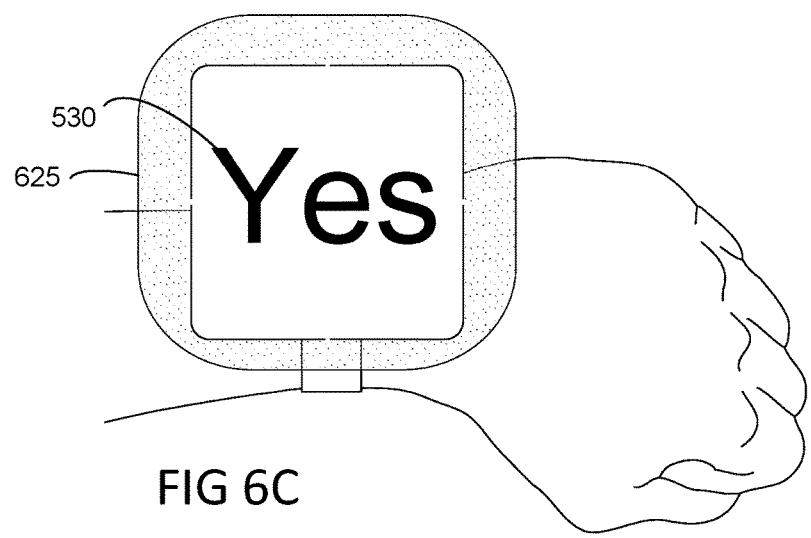

FIG. 6C shows the presentation of the representation of the hand-drawn message 520, in accordance with some embodiments. In particular, the wrist-wearable device 188 and/or the head-wearable device 110 (or other communicatively coupled device) present the one or more characters of the hand-drawn message 520 using a predetermined typeface as show by typed message 530. The typed message 530 can be presented at the augmented representation of the display 625 and/or on another communicatively coupled display (e.g., display 121 of the head-wearable device 110, display of the wrist-wearable device 188, etc.). The typed message 530 is presented to the user for review. The user is able to modify typed message 530 using one or more additional hand gestures or other inputs as described above in reference to FIGS. 5A-5E.

Figure 6D:
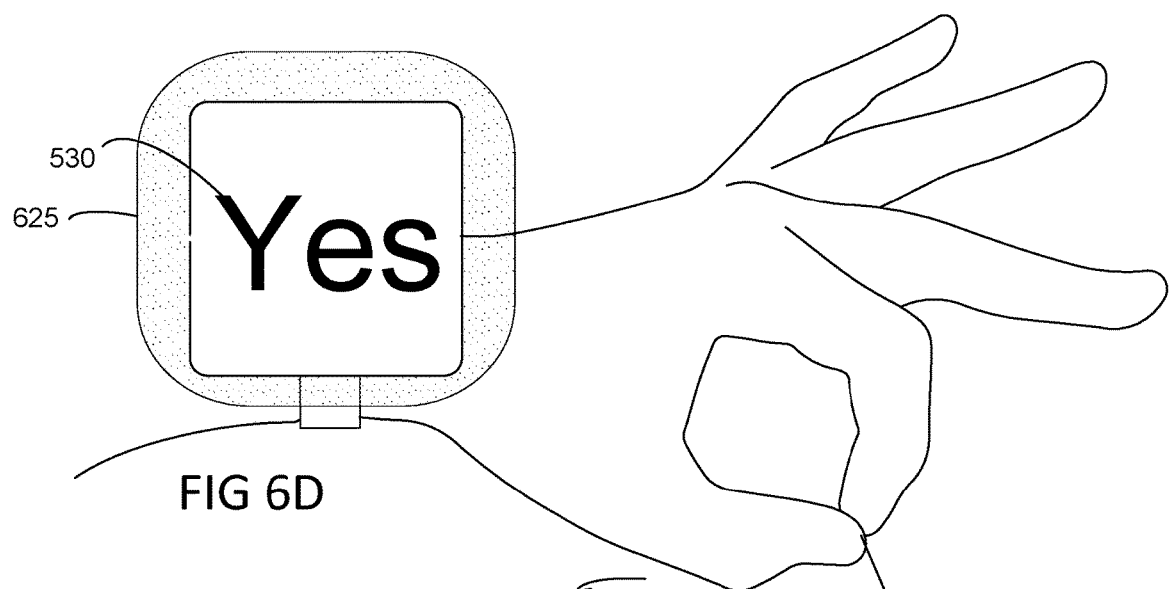

In FIG. 6D, the user performs an in-air hand gesture 540 confirming or approving of the typed message 530. More specifically, after reviewing the typed message 530 and/or modifying the typed message 530, the user can provide an additional input to confirm and/or send the typed message. The in-air hand gesture 540 can be a contact between one or more digits of the user's hand. In some embodiments, the in-air hand gesture 540 is a specific hand symbol. For example, in FIG. 6D, the in-air hand gesture is an "OK" hand symbol.

Figure 6E:
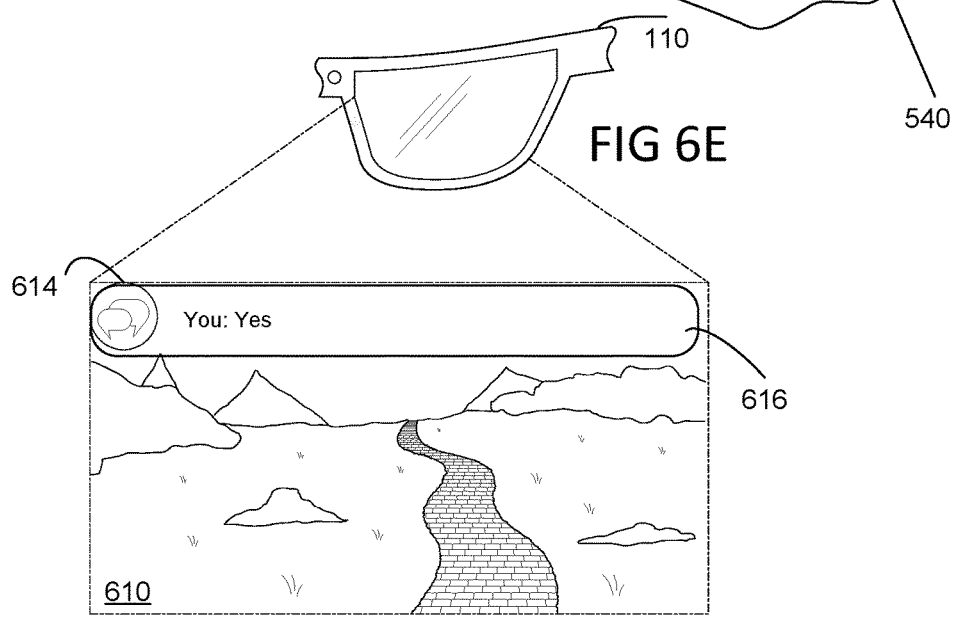

FIG. 6E shows a reply message sent to a contact, in accordance with some embodiments. In particular, after the user confirms the typed message 530 (e.g., via the in-air hand gesture 540), the typed messages is sent to a corresponding contact (e.g., to the contact shown in the contact element 614). The typed message 530, when sent, can be presented to the user via the display 121. For example, as shown in FIG. 6E, the typed message 530 is presented to the user as reply UI element 616. This allows the user to view an ongoing conversation with a contact frictionlessly. More specifically, the user can view an ongoing conversation via the head-wearable device 110 without having to look at the wrist-wearable device 188 or any other one of their electronic devices, such as a smartphone.

Figure 7A:
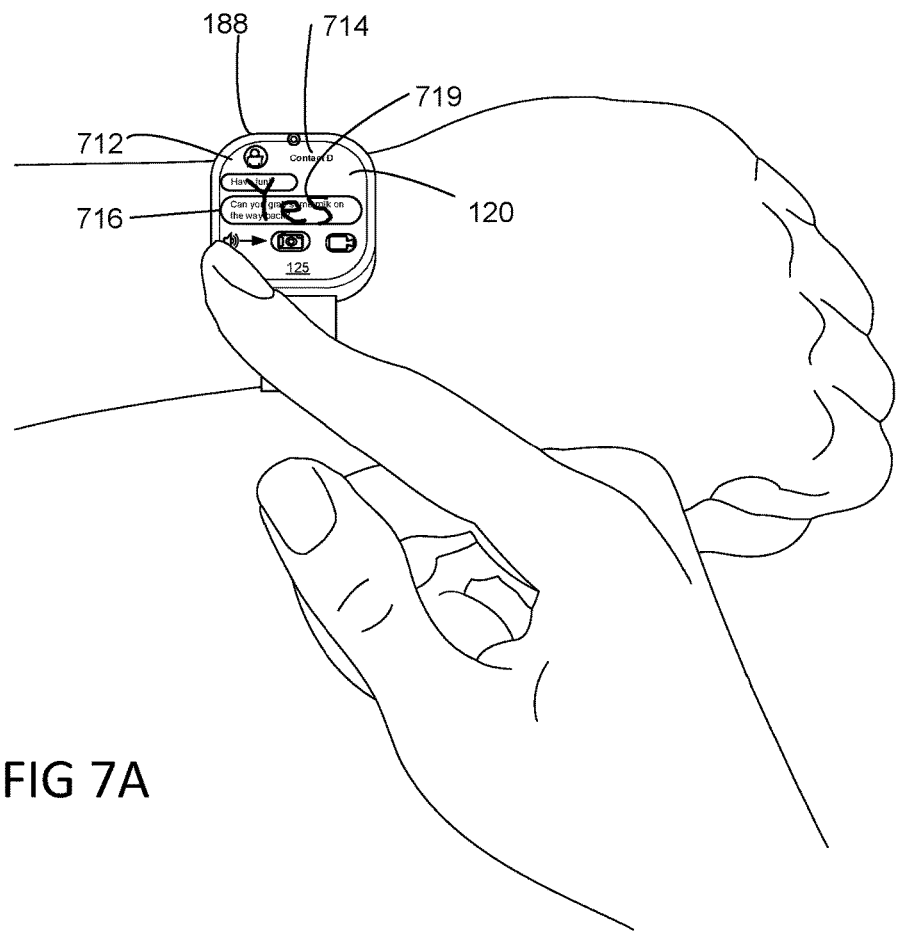
FIGS. 7A-7C illustrate techniques for detecting handwritten inputs at a wrist-wearable device and presenting a representation of the handwritten at the wrist-wearable device, in accordance with some embodiments.
Figure 7B:
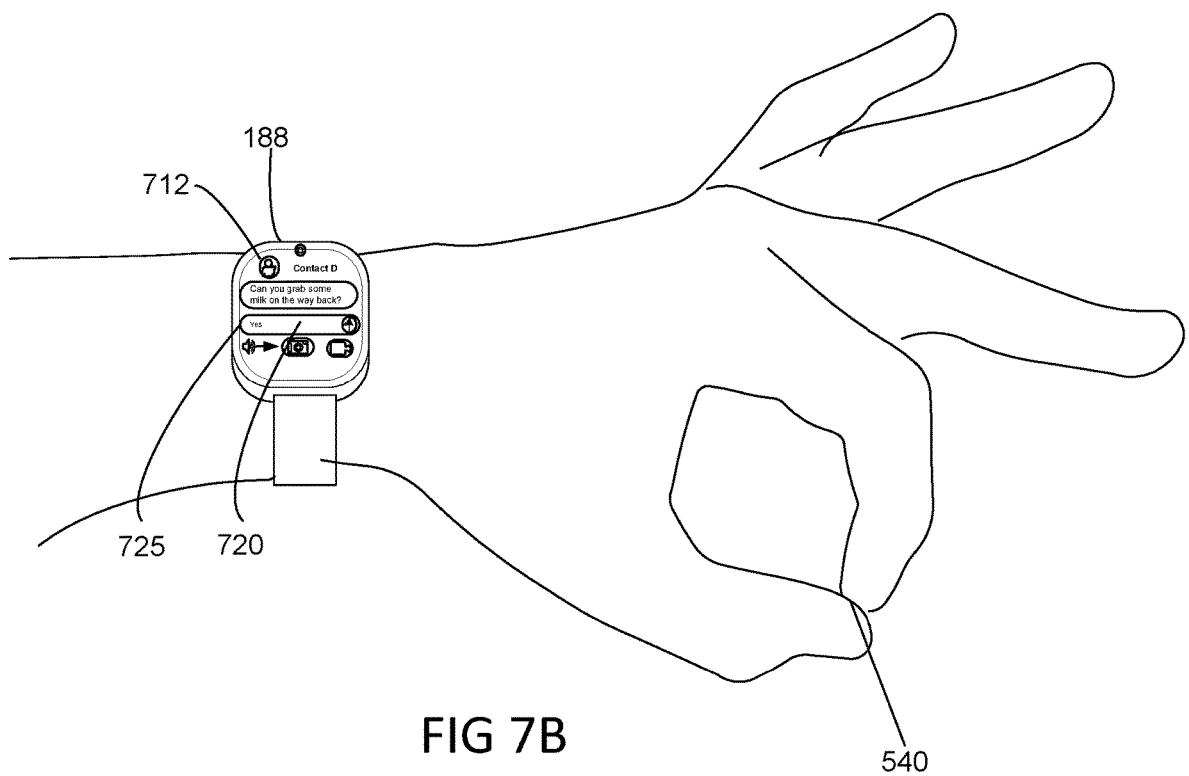
Figure 7C:
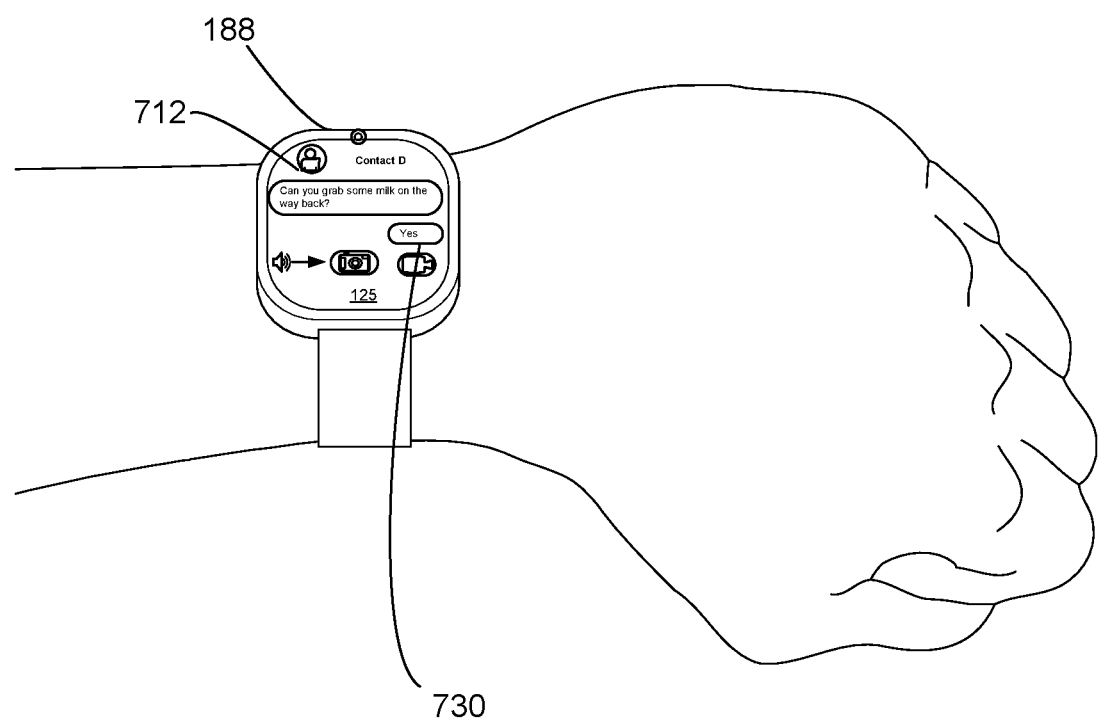

FIGS. 7A-7C illustrate techniques for detecting handwritten inputs at a wrist-wearable device 188 and presenting a representation of the handwritten at the wrist-wearable device, in accordance with some embodiments. In some embodiments, a wrist-wearable device 188 displays messaging interface 712. The messaging interface 712 can include a message thread between a user and a contact or group of contacts. The messaging interface can include a contact element 714 that identifies a corresponding contact, one or more received message UI elements 716 for each received message, and one or more sent message UI elements for each sent message.

FIG. 7A shows a user performing hand-drawn gesture input at a display 120 of the wrist-wearable device 188. As described above, the wrist-wearable device 188 and/or the head-wearable device 110 can detect one or more in-air hand or surface gestures performed by the user. The wrist-wearable device 188, the head-wearable device 110, or other communicatively coupled device can determine that the one or more in-air hand or surface gestures are a hand-drawn gesture 719 associated with one or more characters. In some embodiments, the hand-drawn gestures 719 can be presented on the display 120 while the user performs the hand drawn gesture 719.

In FIG. 7B, the wrist-wearable device 188, the head-wearable device 110, or other communicatively coupled device convert the hand-drawn message 719 into a typed message 725 with predetermined typeface. The typed message 725 is based on the one or more characters associated with the hand-drawn message 719. In some embodiments, the typed message 725 is presented to the user within a text field of the messaging interface 712 to allow the user to review and/or modify the text message 725. The user can provide one or more additional inputs to confirm and/or send the typed message 725 (e.g., "OK" hand gesture 540).

Turning to FIG. 7C, the typed message 725 has been sent to an electronic device associated with the contact. The wrist-wearable device 188 presents the sent message as a sent message UI element 730. The sent message UI element 730 is presented within the message thread of the messaging interface 712 to allow the user to view their interaction with the contact.

Figure 8:
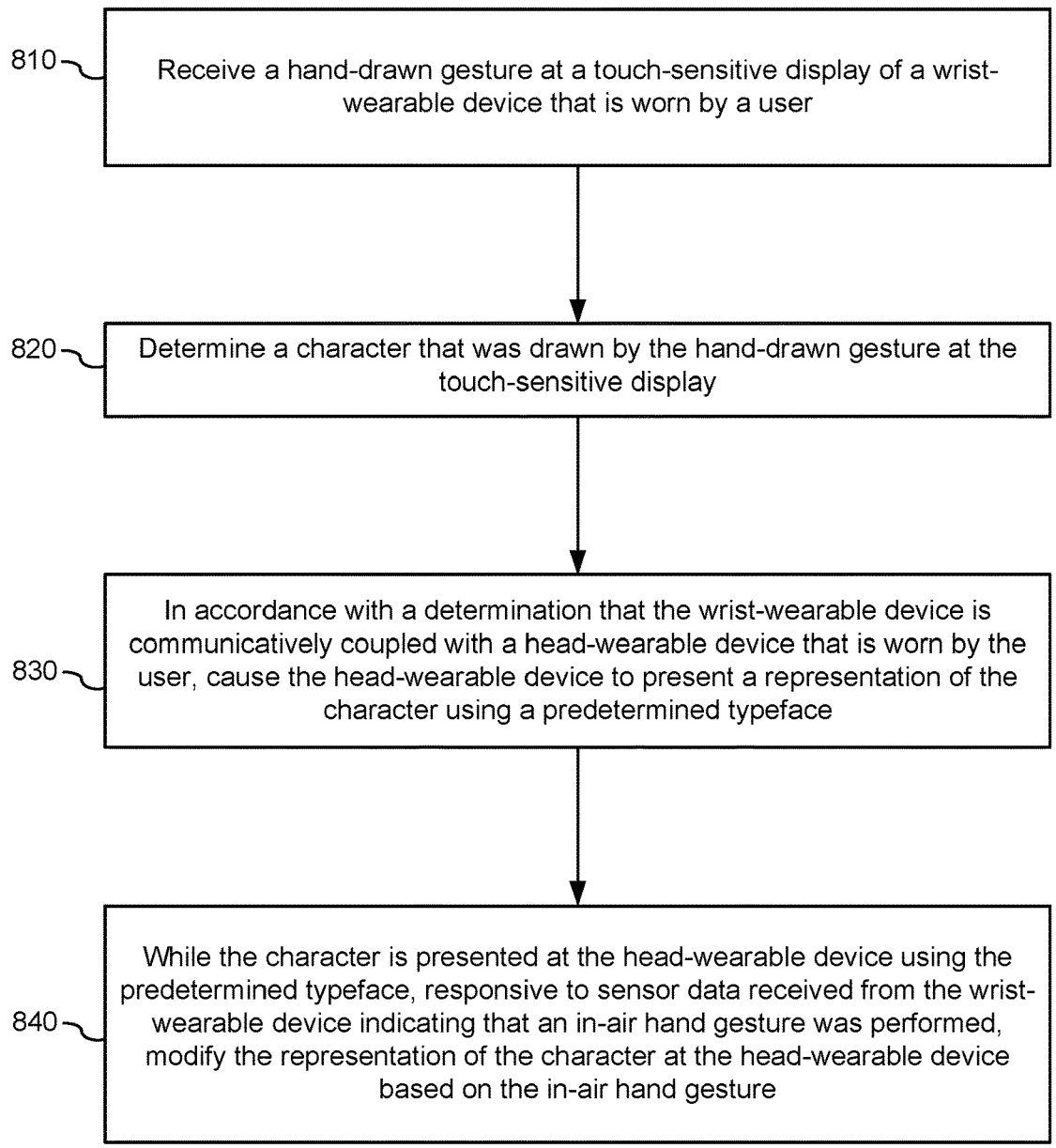
FIG. 8 is a detailed flow diagram illustrating a method of detecting and presenting one or more characters associated with a hand-drawn gesture, in accordance with some embodiments.

FIG. 8 is a detailed flow diagram illustrating a method of detecting and presenting one or more characters associated with a hand-drawn gesture, in accordance with some embodiments. Similar to methods 300 and 400 of FIGS. 3 and 4, respectively, operations of the method 800 can be performed by one or more processors of the one or more devices described below in reference to FIGS. 11A-11B. At least some of the operations shown in FIG. 8 correspond to instructions stored in a computer memory or computer-readable storage medium. Operations of the method 800 can be performed by a single device or at least two devices communicatively coupled to one another (e.g., a head-wearable device 110 and/or a wrist-wearable device 188). Additionally or alternatively, operations of the method 800 can be performed by instructions stored in memory or computer-readable medium of another device communicatively coupled to one or more devices described above in reference to FIGS. 11A-11B.

Method 800 includes receiving (810) a hand-drawn gesture at a touch-sensitive display of a wrist-wearable device that is worn by a user. In some embodiments, the user provides a request to the wrist-wearable device and/or another communicatively coupled device to capture the hand-drawn gesture. Alternatively, in some embodiments, the wrist-wearable device and/or the other communicatively coupled device automatically detect when a user is performing a hand-drawn gesture. The wrist-wearable device and/or the other communicatively coupled device can automatically detect that the user is performing a hand-drawn gesture based on sensor data captured by the wrist-wearable device (e.g., neuromuscular signal data sensed based on neuromuscular signals travelling through a user's wrist), image data (e.g., captured by the head-wearable device 110), and/or a combination of data captured by one or more sensors and/or imaging devices of communicatively coupled devices.

While the primary example described relates to a hand-drawn gesture at the touch-sensitive display, the hand-drawn gesture in certain other embodiments can be provided at a displayed user interface that is either presented directly on the touch-sensitive display or that is presented as an augmented representation viewed using a head-wearable device (e.g., as was explained above in conjunction with FIGS. 5A-6E).

Method 800 includes determining (820) a character that was drawn by the hand-drawn gesture at the touch-sensitive display. In some embodiments, a character drawn by the hand-drawn gesture is determined after receiving a request from the user to present the hand-drawn gesture using the predetermined typeface. The request from the user to present the hand drawn gesture using the predetermined typeface is detected based on in-air hand gesture detected via the sensors of the wrist-wearable device, an imaging device of the head-wearable device 110, and/or a combination of data captured by one or more sensors and/or imaging devices of communicatively coupled devices. In other words, the hand-drawn gesture can be presented to the user in their handwriting (e.g., "Yes," as shown above in FIGS. 5A-7C) and converted into a predetermined typeface (as discussed below) at the user's request.

Method 800 includes, in accordance with a determination that the wrist-wearable device is communicatively coupled with a head-wearable device that is worn by the user, causing (830) the head-wearable device to present a representation of the character using a predetermined typeface.

For example, as shown and described above in reference to FIGS. 6A-6E, a hand-drawn gesture performed on or at the wrist-wearable device can be presented on a display 121 of the head-wearable device 110. The predetermined typeface can include Times New Roman, Arial, Cambria, Courier New, and the like. In some embodiments, the predetermined typeface is a variation to the user's handwriting (e.g., converting a user's cursive handwriting to block text, and vice versa).

The predetermined typeface can be selected from among a plurality of available predetermined typeface options based on a type of the hand-drawn gesture. In some embodiments, the predetermined typeface is selected from among a plurality of available predetermined typeface options based on a current application that is in focus (e.g., an active application) on the wrist-wearable device or the head-wearable device. For example, a first application can be a messaging application and the method 800 can include selecting a first predetermined typeface when the messaging application is in focus and a second application can be a note-taking application and the method 800 can include selecting a second predetermined typeface when the note-taking application is in focus.

In some embodiments, the character is associated with a longer-form phrase and the causing the head-wearable device to present the representation of the character includes causing the head-wearable device to present a representation of the longer-form phrase using the predetermined typeface. More specifically, the user can associate one or more characters with a phrase or an autofill. For example, the user can associate "JS" as a shorthand for his name such that when "JS" is detected it is presented as "John Smith." Similar shorthand can be used for other phrases. For example, "Omw" can be presented as "On my way." By allowing the user to associate one or more characters to long-form phrases or other shorthand, the user is able to increase their input speed and customize the text inputs to improve user experience and reduce and human-to-machine friction (e.g., having to reach for a smartphone to send a text message).

In some embodiments, causing the head-wearable device to present the representation of the character using a predetermined typeface also includes causing the head wearable device to present the representation of the character using the predetermined typeface within an application for modification by the user using in-air hand gestures detected via the sensors of the wrist-wearable device. For example, the representation of the character can be presented in a text field of a messaging application to allow the user to review and/or modify the character before it is sent to another electronic device (e.g., as described above in reference to FIGS. 6A-6E).

Method 800 further includes, while the character is presented at the head-wearable device using the predetermined typeface, responsive to sensor data received from the wrist-wearable device indicating that an in-air hand gesture was performed, modifying (840) the representation of the character at the head-wearable device based on the in-air hand gesture. In particular, the user can add or delete one or more characters to the presented character, the user can navigate between one or more characters (e.g., using a cursor 537; FIGS. 5A-5E), the user can highlight one or more characters, and/or perform any other modification to the characters. This allows the user to review and/or edit the presented characters before they are finalized or sent to another electronic device.

In some embodiment, the method 800 includes receiving a second hand-drawn gesture at the touch sensitive display of the wrist-wearable device, determining a second character that was drawn by the second hand-drawn gesture at the touch-sensitive display, and, in accordance with a determination that the wrist-wearable device is communicatively coupled with a head-wearable device that is worn by the user, causing the head-wearable device to present a representation of the second character using a predetermined typeface. In other words, the user can provide subsequent inputs (e.g., hand-drawn gestures) to add to, edit, delete, or otherwise modify the initial determined characters. In some embodiments, while the second character is presented at the head-wearable device using the predetermined typeface, responsive to second sensor data received from the wrist-wearable device indicating that a second in-air hand gesture was performed, modifying the representation of the second character at the head-wearable device based on the second in-air hand gesture (e.g., the user can modify the second character along with the initial character).

The method 800 further includes receiving one or more in-air hand gestures that cause the representation of the character, as modified, to be sent to an electronic device that is distinct from the wrist-wearable device and the head-wearable device. For example, as shown in FIGS. 5A-7C, the user can review and send the determined characters to another electronic device.

Further embodiments also include various subsets of the above embodiments including embodiments described with reference to FIGS. 1A-8 combined or otherwise re-arranged.

Example Wrist-Wearable Devices

Figure 9A:
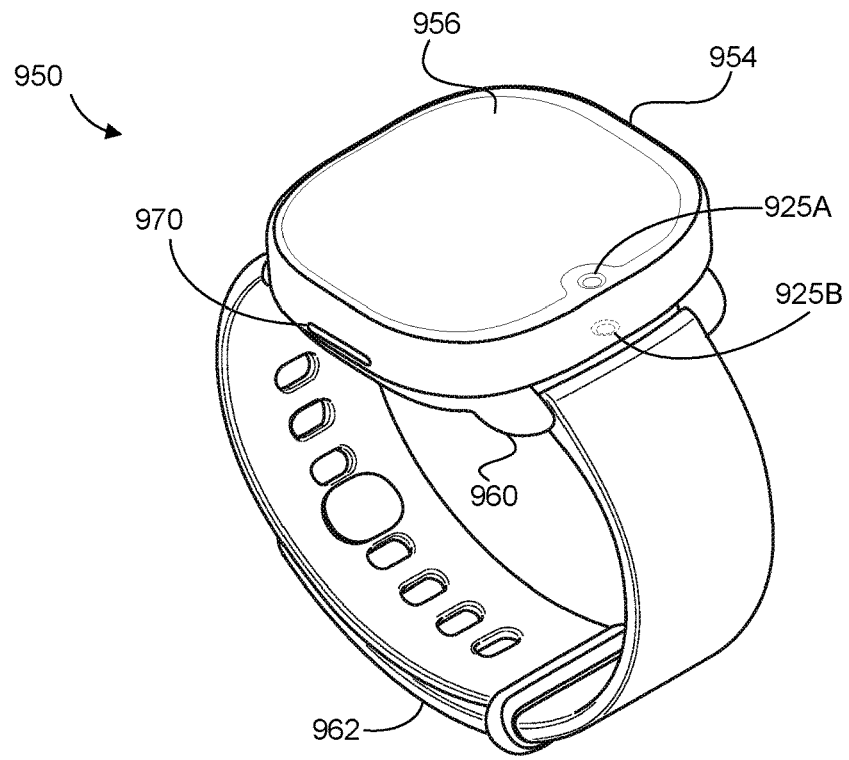
FIGS. 9A-9E illustrate an example wrist-wearable device, in accordance with some embodiments.
Figure 9A:
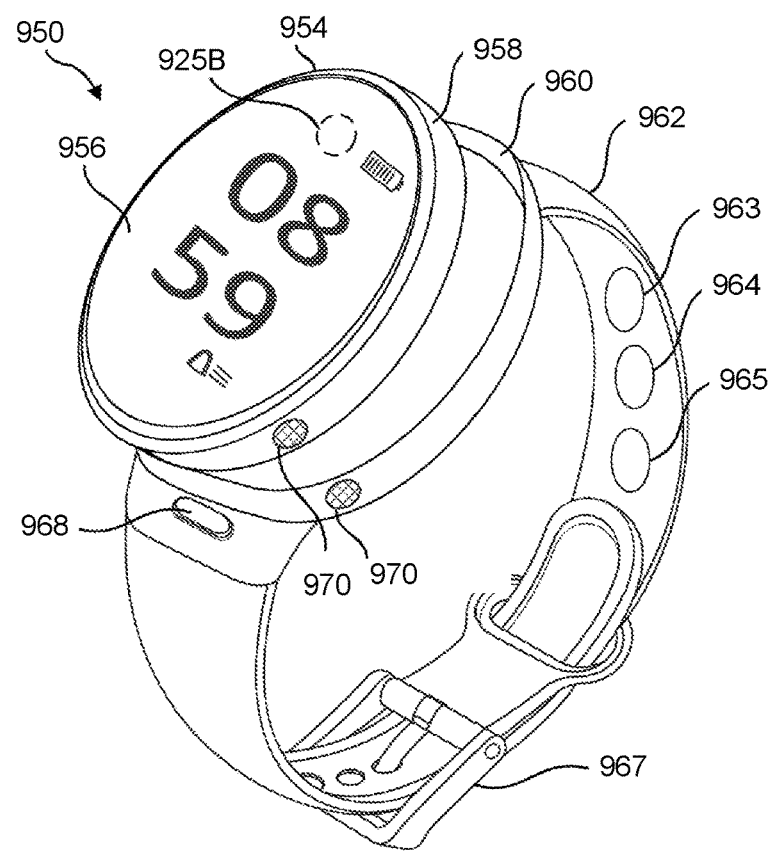
Figure 9B:
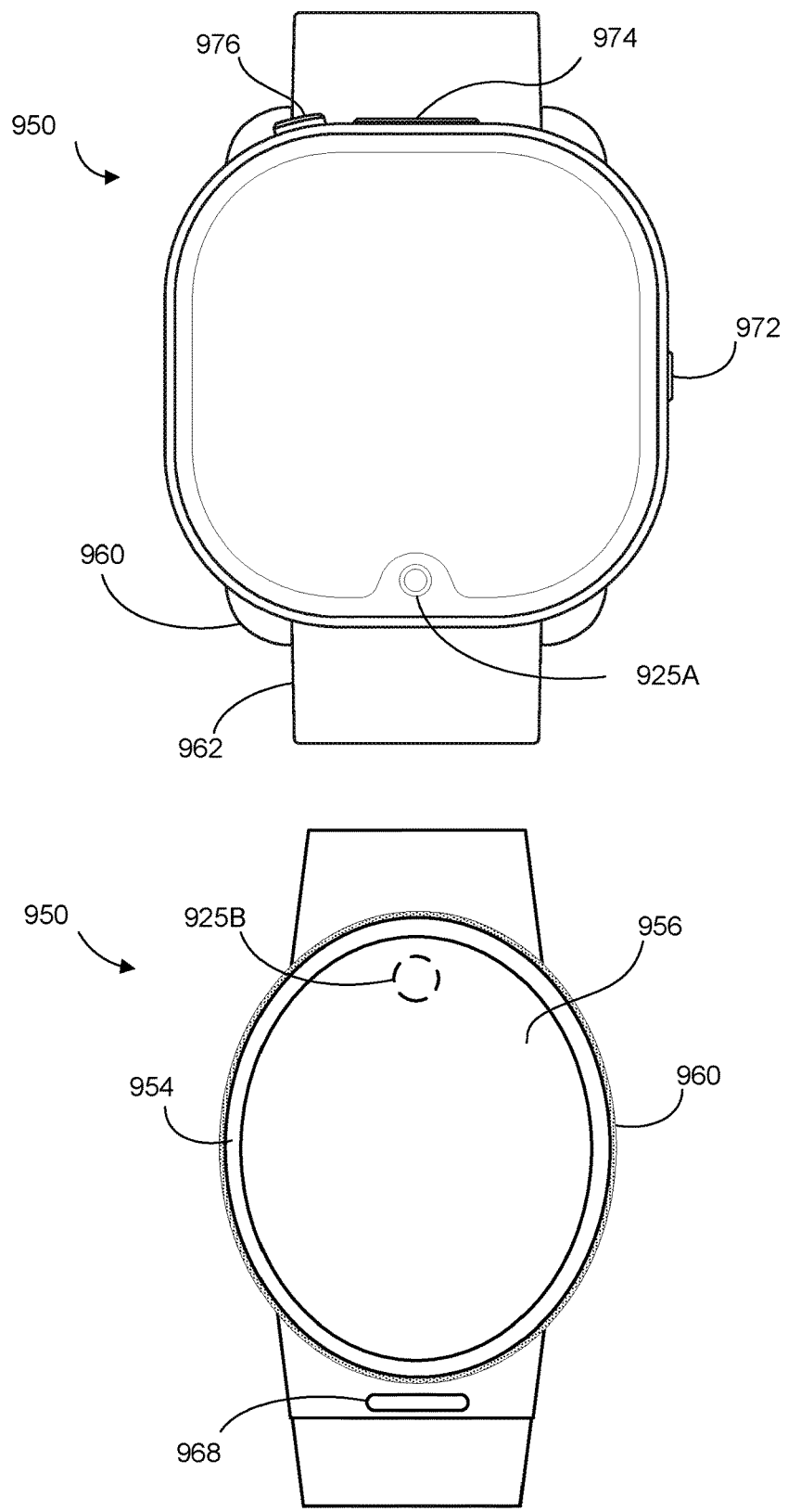

FIGS. 9A and 9B illustrate an example wrist-wearable device 950, in accordance with some embodiments. The wrist-wearable device 950 is an instance of the wearable device described herein (e.g., wrist-wearable device 188), such that the wearable device should be understood to have the features of the wrist-wearable device 950 and vice versa. FIG. 9A illustrates a perspective view of the wrist-wearable device 950 that includes a watch body 954 coupled with a watch band 962. The watch body 954 and the watch band 962 can have a substantially rectangular or circular shape and can be configured to allow a user to wear the wrist-wearable device 950 on a body part (e.g., a wrist). The wrist-wearable device 950 can include a retaining mechanism 967 (e.g., a buckle, a hook and loop fastener, etc.) for securing the watch band 962 to the user's wrist. The wrist-wearable device 950 can also include a coupling mechanism 960 (e.g., a cradle) for detachably coupling the capsule or watch body 954 (via a coupling surface of the watch body 954) to the watch band 962.

The wrist-wearable device 950 can perform various functions associated with navigating through user interfaces and selectively opening applications, as described above with reference to FIGS. 1A-8. As will be described in more detail below, operations executed by the wrist-wearable device 950 can include, without limitation, display of visual content to the user (e.g., visual content displayed on display 956); sensing user input (e.g., sensing a touch on peripheral button 968, sensing biometric data on sensor 964, sensing neuromuscular signals on neuromuscular sensor 965, etc.); messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions can be executed independently in the watch body 954, independently in the watch band 962, and/or in communication between the watch body 954 and the watch band 962. In some embodiments, functions can be executed on the wrist-wearable device 950 in conjunction with an AR environment. As the skilled artisan will appreciate upon reading the descriptions provided herein, the novel wearable devices described herein can be used with any type of AR environment.

The watch band 962 can be configured to be worn by a user such that an inner surface of the watch band 962 is in contact with the user's skin. When worn by a user, sensor 964 is in contact with the user's skin. The sensor 964 can be a biosensor that senses a user's heart rate, saturated oxygen level, temperature, sweat level, muscle intentions, or a combination thereof. The watch band 962 can include multiple sensors 964 that can be distributed on an inside and/or an outside surface of the watch band 962. Additionally, or alternatively, the watch body 954 can include sensors that are the same or different than those of the watch band 962 (or the watch band 962 can include no sensors at all in some embodiments). For example, multiple sensors can be distributed on an inside and/or an outside surface of the watch body 954. As described below with reference to FIGS. 9B and/or 9C, the watch body 954 can include, without limitation, a front-facing image sensor 925A and/or a rear-facing image sensor 925B, a biometric sensor, an IMU, a heart rate sensor, a saturated oxygen sensor, a neuromuscular sensor (s), an altimeter sensor, a temperature sensor, a bioimpedance sensor, a pedometer sensor, an optical sensor (e.g., imaging sensor 9104), a touch sensor, a sweat sensor, etc. The sensor 964 can also include a sensor that provides data about a user's environment including a user's motion (e.g., an IMU), altitude, location, orientation, gait, or a combination thereof. The sensor 964 can also include a light sensor (e.g., an infrared light sensor, a visible light sensor) that is configured to track a position and/or motion of the watch body 954 and/or the watch band 962. The watch band 962 can transmit the data acquired by sensor 964 to the watch body 954 using a wired communication method (e.g., a Universal Asynchronous Receiver/Transmitter (UART), a USB transceiver, etc.) and/or a wireless communication method (e.g., near field communication, Bluetooth, etc.). The watch band 962 can be configured to operate (e.g., to collect data using sensor 964) independent of whether the watch body 954 is coupled to or decoupled from watch band 962.

In some examples, the watch band 962 can include a neuromuscular sensor 965 (e.g., an EMG sensor, a mechanomyogram (MMG) sensor, a sonomyography (SMG) sensor, etc.). Neuromuscular sensor 965 can sense a user's intention to perform certain motor actions. The sensed muscle intention can be used to control certain user interfaces displayed on the display 956 of the wrist-wearable device 950 and/or can be transmitted to a device responsible for rendering an AR environment (e.g., a head-mounted display) to perform an action in an associated AR environment, such as to control the motion of a virtual device displayed to the user.

Signals from neuromuscular sensor 965 can be used to provide a user with an enhanced interaction with a physical object and/or a virtual object in an artificial-reality application generated by an artificial-reality system (e.g., user interface objects presented on the display 956, or another computing device (e.g., a smartphone)). Signals from neuromuscular sensor 965 can be obtained (e.g., sensed and recorded) by one or more neuromuscular sensors 965 of the watch band 962. Although FIG. 9A shows one neuromuscular sensor 965, the watch band 962 can include a plurality of neuromuscular sensors 965 arranged circumferentially on an inside surface of the watch band 962 such that the plurality of neuromuscular sensors 965 contact the skin of the user. The watch band 962 can include a plurality of neuromuscular sensors 965 arranged circumferentially on an inside surface of the watch band 962. Neuromuscular sensor 965 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 962 and/or watch body 954 can include a haptic device 963 (e.g., a vibratory haptic actuator) that is configured to provide haptic feedback (e.g., a cutaneous and/or kinesthetic sensation, etc.) to the user's skin. The sensors 964 and 965, and/or the haptic device 963 can be configured to operate in conjunction with multiple applications including, without limitation, health monitoring, social media, game playing, and artificial reality (e.g., the applications associated with artificial reality).

The wrist-wearable device 950 can include a coupling mechanism (also referred to as a cradle) for detachably coupling the watch body 954 to the watch band 962. A user can detach the watch body 954 from the watch band 962 in order to reduce the encumbrance of the wrist-wearable device 950 to the user. The wrist-wearable device 950 can include a coupling surface on the watch body 954 and/or coupling mechanism(s) 960 (e.g., a cradle, a tracker band, a support base, a clasp). A user can perform any type of motion to couple the watch body 954 to the watch band 962 and to decouple the watch body 954 from the watch band 962. For example, a user can twist, slide, turn, push, pull, or rotate the watch body 954 relative to the watch band 962, or a combination thereof, to attach the watch body 954 to the watch band 962 and to detach the watch body 954 from the watch band 962.

As shown in the example of FIG. 9A, the watch band coupling mechanism 960 can include a type of frame or shell that allows the watch body 954 coupling surface to be retained within the watch band coupling mechanism 960. The watch body 954 can be detachably coupled to the watch band 962 through a friction fit, magnetic coupling, a rotation-based connector, a shear-pin coupler, a retention spring, one or more magnets, a clip, a pin shaft, a hook and loop fastener, or a combination thereof. In some examples, the watch body 954 can be decoupled from the watch band 962 by actuation of the release mechanism 970. The release mechanism 970 can include, without limitation, a button, a knob, a plunger, a handle, a lever, a fastener, a clasp, a dial, a latch, or a combination thereof.

As shown in FIGS. 9A-9B, the coupling mechanism 960 can be configured to receive a coupling surface proximate to the bottom side of the watch body 954 (e.g., a side opposite to a front side of the watch body 954 where the display 956 is located), such that a user can push the watch body 954 downward into the coupling mechanism 960 to attach the watch body 954 to the coupling mechanism 960. In some embodiments, the coupling mechanism 960 can be configured to receive a top side of the watch body 954 (e.g., a side proximate to the front side of the watch body 954 where the display 956 is located) that is pushed upward into the cradle, as opposed to being pushed downward into the coupling mechanism 960. In some embodiments, the coupling mechanism 960 is an integrated component of the watch band 962 such that the watch band 962 and the coupling mechanism 960 are a single unitary structure.

The wrist-wearable device 950 can include a single release mechanism 970 or multiple release mechanisms 970 (e.g., two release mechanisms 970 positioned on opposing sides of the wrist-wearable device 950 such as spring-loaded buttons). As shown in FIG. 9A, the release mechanism 970 can be positioned on the watch body 954 and/or the watch band coupling mechanism 960. Although FIG. 9A shows release mechanism 970 positioned at a corner of watch body 954 and at a corner of watch band coupling mechanism 960, the release mechanism 970 can be positioned anywhere on watch body 954 and/or watch band coupling mechanism 960 that is convenient for a user of wrist-wearable device 950 to actuate. A user of the wrist-wearable device 950 can actuate the release mechanism 970 by pushing, turning, lifting, depressing, shifting, or performing other actions on the release mechanism 970. Actuation of the release mechanism 970 can release (e.g., decouple) the watch body 954 from the watch band coupling mechanism 960 and the watch band 962 allowing the user to use the watch body 954 independently from watch band 962. For example, decoupling the watch body 954 from the watch band 962 can allow the user to capture images using rear-facing image sensor 925B.

FIG. 9B includes top views of examples of the wrist-wearable device 950. The examples of the wrist-wearable device 950 shown in FIGS. 9A-9B can include a coupling mechanism 960 (as shown in FIG. 9B, the shape of the coupling mechanism can correspond to the shape of the watch body 954 of the wrist-wearable device 950). The watch body 954 can be detachably coupled to the coupling mechanism 960 through a friction fit, magnetic coupling, a rotation-based connector, a shear-pin coupler, a retention spring, one or more magnets, a clip, a pin shaft, a hook and loop fastener, or any combination thereof.

In some examples, the watch body 954 can be decoupled from the coupling mechanism 960 by actuation of a release mechanism 970. The release mechanism 970 can include, without limitation, a button, a knob, a plunger, a handle, a lever, a fastener, a clasp, a dial, a latch, or a combination thereof. In some examples, the wristband system functions can be executed independently in the watch body 954, independently in the coupling mechanism 960, and/or in communication between the watch body 954 and the coupling mechanism 960. The coupling mechanism 960 can be configured to operate independently (e.g., execute functions independently) from watch body 954. Additionally, or alternatively, the watch body 954 can be configured to operate independently (e.g., execute functions independently) from the coupling mechanism 960. As described below with reference to the block diagram of FIG. 9A, the coupling mechanism 960 and/or the watch body 954 can each include the independent resources required to independently execute functions. For example, the coupling mechanism 960 and/or the watch body 954 can each include a power source (e.g., a battery), a memory, data storage, a processor (e.g., a central processing unit (CPU)), communications, a light source, and/or input/output devices.

The wrist-wearable device 950 can have various peripheral buttons 972, 974, and 976, for performing various operations at the wrist-wearable device 950. Also, various sensors, including one or both of the sensors 964 and 965, can be located on the bottom of the watch body 954, and can optionally be used even when the watch body 954 is detached from the watch band 962.

Figure 9C:
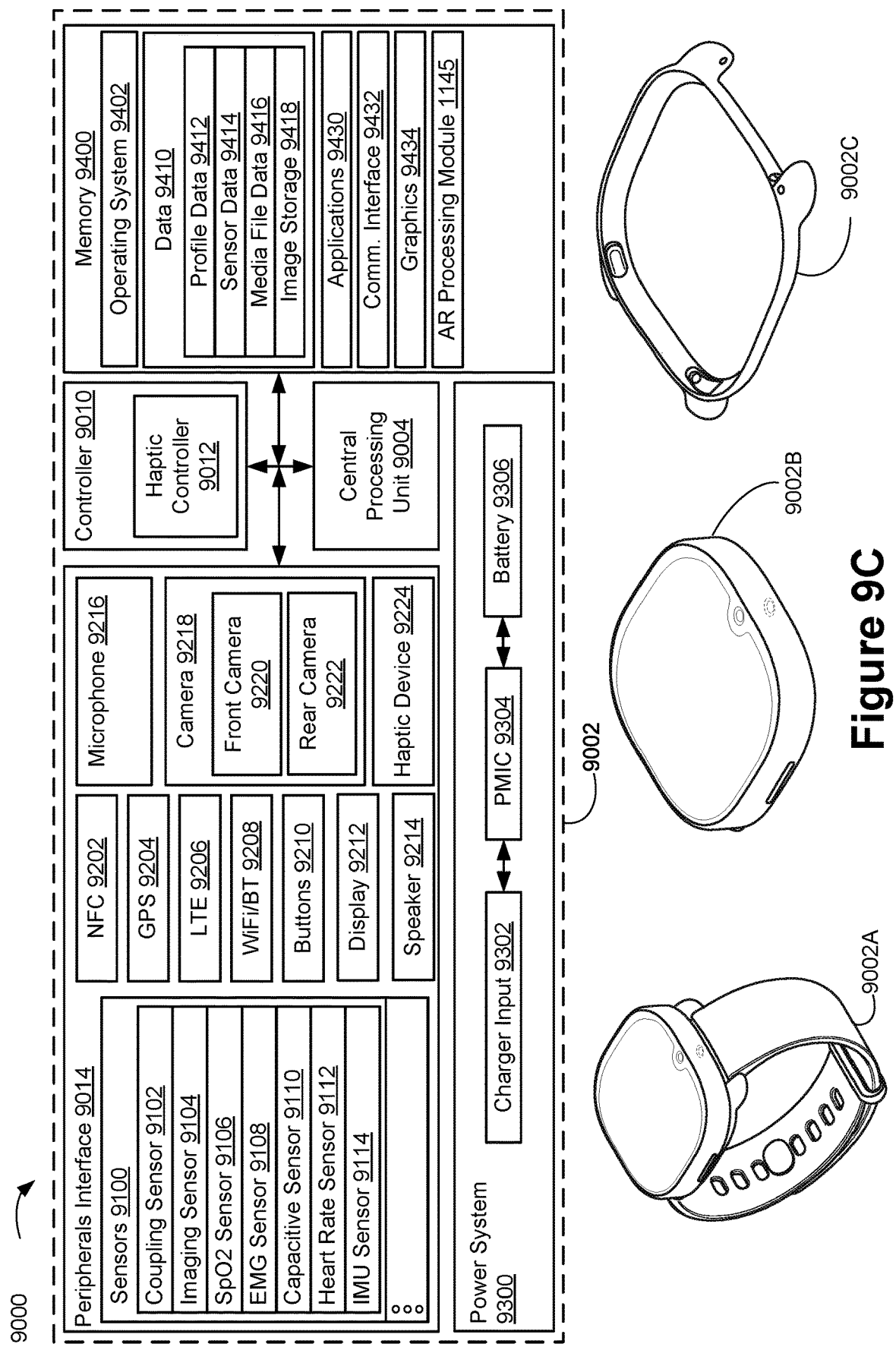

FIG. 9C is a block diagram of a computing system 9000, according to at least one embodiment of the present disclosure. The computing system 9000 includes an electronic device 9002, which can be, for example, a wrist-wearable device. The wrist-wearable device 950 described in detail above with respect to FIGS. 9A-9B is an example of the electronic device 9002, so the electronic device 9002 will be understood to include the components shown and described below for the computing system 9000. In some embodiments, all, or a substantial portion of the components of the computing system 9000 are included in a single integrated circuit. In some embodiments, the computing system 9000 can have a split architecture (e.g., a split mechanical architecture, a split electrical architecture) between a watch body (e.g., a watch body 954 in FIGS. 9A-9B) and a watch band (e.g., a watch band 962 in FIGS. 9A-9B). The electronic device 9002 can include a processor (e.g., a central processing unit 9004), a controller 9010, a peripherals interface 9014 that includes one or more sensors 9100 and various peripheral devices, a power source (e.g., a power system 9300), and memory (e.g., a memory 9400) that includes an operating system (e.g., an operating system 9402), data (e.g., data 9410), and one or more applications (e.g., applications 9430).

In some embodiments, the computing system 9000 includes the power system 9300 which includes a charger input 9302, a power-management integrated circuit (PMIC) 9304, and a battery 9306.

In some embodiments, a watch body and a watch band can each be electronic devices 9002 that each have respective batteries (e.g., battery 9306), and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 9300 to enable each to operate independently. The watch body and watch band can also share power (e.g., one can charge the other) via respective PMICs 9304 that can share power over power and ground conductors and/or over wireless charging antennas.

In some embodiments, the peripherals interface 9014 can include one or more sensors 9100. The sensors 9100 can include a coupling sensor 9102 for detecting when the electronic device 9002 is coupled with another electronic device 9002 (e.g., a watch body can detect when it is coupled to a watch band, and vice versa). The sensors 9100 can include imaging sensors 9104 for collecting imaging data, which can optionally be the same device as one or more of the cameras 9218. In some embodiments, the imaging sensors 9104 can be separate from the cameras 9218. In some embodiments the sensors include an SpO2 sensor 9106. In some embodiments, the sensors 9100 include an EMG sensor 9108 for detecting, for example muscular movements by a user of the electronic device 9002. In some embodiments, the sensors 9100 include a capacitive sensor 9110 for detecting changes in potential of a portion of a user's body. In some embodiments, the sensors 9100 include a heart rate sensor 9112. In some embodiments, the sensors 9100 include an inertial measurement unit (IMU) sensor 9114 for detecting, for example, changes in acceleration of the user's hand.

In some embodiments, the peripherals interface 9014 includes a near-field communication (NFC) component 9202, a global-position system (GPS) component 9204, a long-term evolution (LTE) component 9206, and or a Wi-Fi or Bluetooth communication component 9208.

In some embodiments, the peripherals interface includes one or more buttons (e.g., the peripheral buttons 972, 974, and 976 in FIG. 9B), which, when selected by a user, cause operation to be performed at the electronic device 9002.

The electronic device 9002 can include at least one display 9212, for displaying visual affordances to the user, including user-interface elements and/or three-dimensional virtual objects. The display can also include a touch screen for inputting user inputs, such as touch gestures, swipe gestures, and the like.

The electronic device 9002 can include at least one speaker 9214 and at least one microphone 9216 for providing audio signals to the user and receiving audio input from the user. The user can provide user inputs through the microphone 9216 and can also receive audio output from the speaker 9214 as part of a haptic event provided by the haptic controller 9012.

The electronic device 9002 can include at least one camera 9218, including a front camera 9220 and a rear camera 9222. In some embodiments, the electronic device 9002 can be a head-wearable device, and one of the cameras 9218 can be integrated with a lens assembly of the head-wearable device.

One or more of the electronic devices 9002 can include one or more haptic controllers 9012 and associated componentry for providing haptic events at one or more of the electronic devices 9002 (e.g., a vibrating sensation or audio output in response to an event at the electronic device 9002). The haptic controllers 9012 can communicate with one or more electroacoustic devices, including a speaker of the one or more speakers 9214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 9012 can provide haptic events to that are capable of being sensed by a user of the electronic devices 9002. In some embodiments, the one or more haptic controllers 9012 can receive input signals from an application of the applications 9430.

Memory 9400 optionally includes high-speed random-access memory and optionally also includes non-volatile memory, such as one or more magnetic disk storage devices, flash memory devices, or other non-volatile solid-state memory devices. Access to the memory 9400 by other components of the electronic device 9002, such as the one or more processors of the central processing unit 9004, and the peripherals interface 9014 is optionally controlled by a memory controller of the controllers 9010.

In some embodiments, software components stored in the memory 9400 can include one or more operating systems 9402 (e.g., a Linux-based operating system, an Android operating system, etc.). The memory 9400 can also include data 9410, including structured data (e.g., SQL databases, MongoDB databases, GraphQL data, JSON data, etc.). The data 9410 can include profile data 9412, sensor data 9414, media file data 9416, and image storage 9418.

In some embodiments, software components stored in the memory 9400 include one or more applications 9430 configured to be perform operations at the electronic devices 9002. In some embodiments, the software components stored in the memory 9400 one or more communication interface modules 9432, one or more graphics modules 9434, and an AR processing module 1145 (FIGS. 11A and 11B). In some embodiments, a plurality of applications 9430 and modules can work in conjunction with one another to perform various tasks at one or more of the electronic devices 9002.

It should be appreciated that the electronic devices 9002 are only some examples of the electronic devices 9002 within the computing system 9000, and that other electronic devices 9002 that are part of the computing system 9000 can have more or fewer components than shown optionally combines two or more components, or optionally have a different configuration or arrangement of the components. The various components shown in FIG. 9C are implemented in hardware, software, firmware, or a combination thereof, including one or more signal processing and/or application-specific integrated circuits.

As illustrated by the lower portion of FIG. 9C, various individual components of a wrist-wearable device can be examples of the electronic device 9002. For example, some or all of the components shown in the electronic device 9002 can be housed or otherwise disposed in a combined watch device 9002A, or within individual components of the capsule device watch body 9002B, the cradle portion 9002C, and/or a watch band.

Figure 9D:
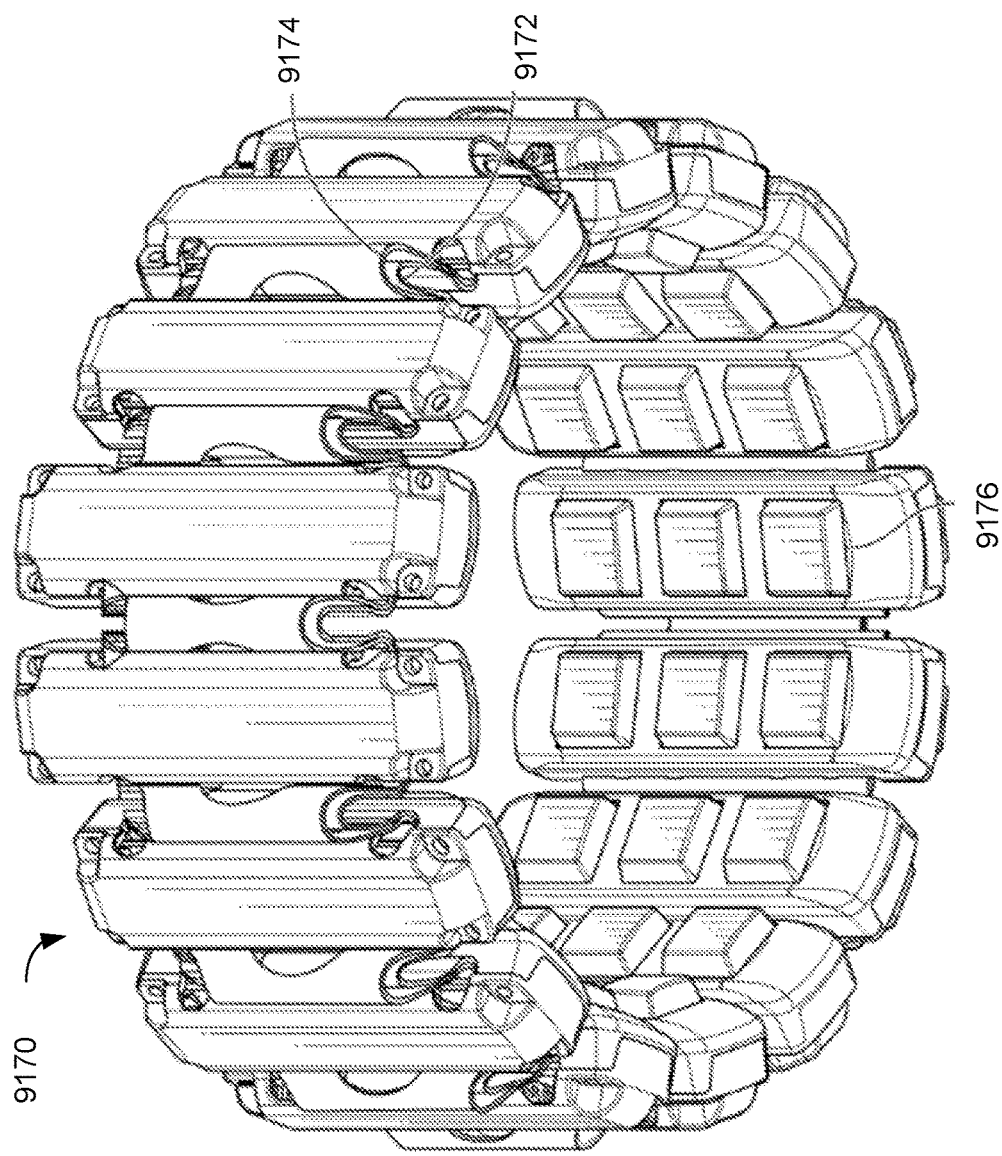

FIG. 9D illustrates a wearable device 9170, in accordance with some embodiments. In some embodiments, the wearable device 9170 is used to generate control information (e.g., sensed data about neuromuscular signals or instructions to perform certain commands after the data is sensed) for causing a computing device to perform one or more input commands. In some embodiments, the wearable device 9170 includes a plurality of neuromuscular sensors 9176. In some embodiments, the plurality of neuromuscular sensors 9176 includes a predetermined number of (e.g., 16) neuromuscular sensors (e.g., EMG sensors) arranged circumferentially around an elastic band 9174. The plurality of neuromuscular sensors 9176 may include any suitable number of neuromuscular sensors. In some embodiments, the number and arrangement of neuromuscular sensors 9176 depends on the particular application for which the wearable device 9170 is used. For instance, a wearable device 9170 configured as an armband, wristband, or chest-band may include a plurality of neuromuscular sensors 9176 with different number of neuromuscular sensors and different arrangement for each use case, such as medical use cases as compared to gaming or general day-to-day use cases. For example, at least 16 neuromuscular sensors 9176 may be arranged circumferentially around elastic band 9174.

In some embodiments, the elastic band 9174 is configured to be worn around a user's lower arm or wrist. The elastic band 9174 may include a flexible electronic connector 9172. In some embodiments, the flexible electronic connector 9172 interconnects separate sensors and electronic circuitry that are enclosed in one or more sensor housings. Alternatively, in some embodiments, the flexible electronic connector 9172 interconnects separate sensors and electronic circuitry that are outside of the one or more sensor housings. Each neuromuscular sensor of the plurality of neuromuscular sensors 9176 can include a skin-contacting surface that includes one or more electrodes. One or more sensors of the plurality of neuromuscular sensors 9176 can be coupled together using flexible electronics incorporated into the wearable device 9170. In some embodiments, one or more sensors of the plurality of neuromuscular sensors 9176 can be integrated into a woven fabric, wherein the fabric one or more sensors of the plurality of neuromuscular sensors 9176 are sewn into the fabric and mimic the pliability of fabric (e.g., the one or more sensors of the plurality of neuromuscular sensors 9176 can be constructed from a series woven strands of fabric). In some embodiments, the sensors are flush with the surface of the textile and are indistinguishable from the textile when worn by the user.

Figure 9E:
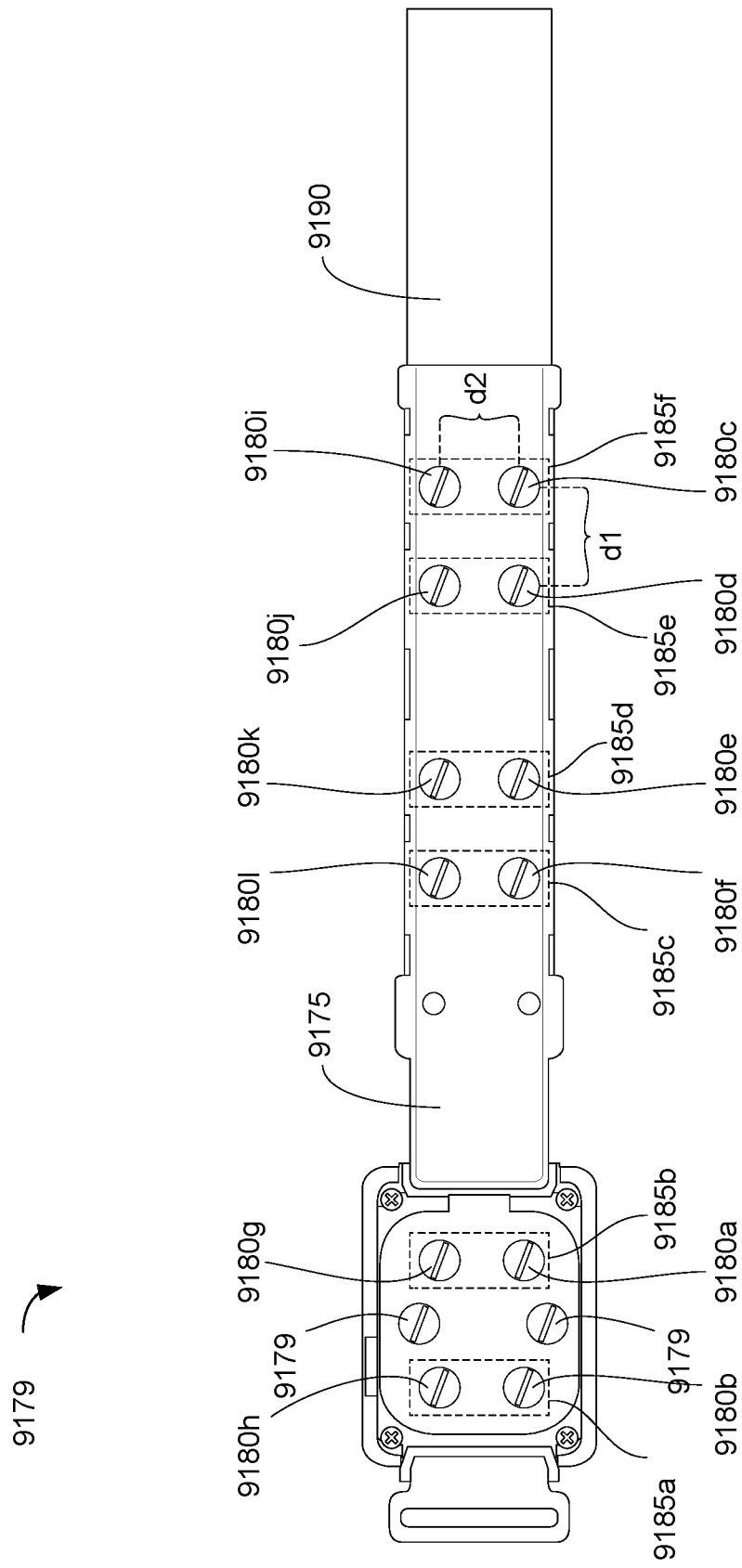

FIG. 9E illustrates a wearable device 9179 in accordance with some embodiments. The wearable device 9179 includes paired sensor channels 9185a-9185f along an interior surface of a wearable structure 9175 that are configured to detect neuromuscular signals. Different number of paired sensors channels can be used (e.g., one pair of sensors, three pairs of sensors, four pairs of sensors, or six pairs of sensors). The wearable structure 9175 can include a band portion 9190, a capsule portion 9195, and a cradle portion (not pictured) that is coupled with the band portion 9190 to allow for the capsule portion 9195 to be removably coupled with the band portion 9190. For embodiments in which the capsule portion 9195 is removable, the capsule portion 9195 can be referred to as a removable structure, such that in these embodiments the wearable device includes a wearable portion (e.g., band portion 9190 and the cradle portion) and a removable structure (the removable capsule portion which can be removed from the cradle). In some embodiments, the capsule portion 9195 includes the one or more processors and/or other components of the wearable device 1188 described above in reference to FIGS. 11A and 11B. The wearable structure 9175 is configured to be worn by a user 11015. More specifically, the wearable structure 9175 is configured to couple the wearable device 9179 to a wrist, arm, forearm, or other portion of the user's body. Each paired sensor channels 9185a-9185f includes two electrodes 9180 (e.g., electrodes 9180a-9180h) for sensing neuromuscular signals based on differential sensing within each respective sensor channel. In accordance with some embodiments, the wearable device 9170 further includes an electrical ground and a shielding electrode.

The techniques described above can be used with any device for sensing neuromuscular signals, including the arm-wearable devices of FIG. 9A-9C, but could also be used with other types of wearable devices for sensing neuromuscular signals (such as body-wearable or head-wearable devices that might have neuromuscular sensors closer to the brain or spinal column).

In some embodiments, a wrist-wearable device can be used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

Example Head-Wearable Devices

Figure 10A:
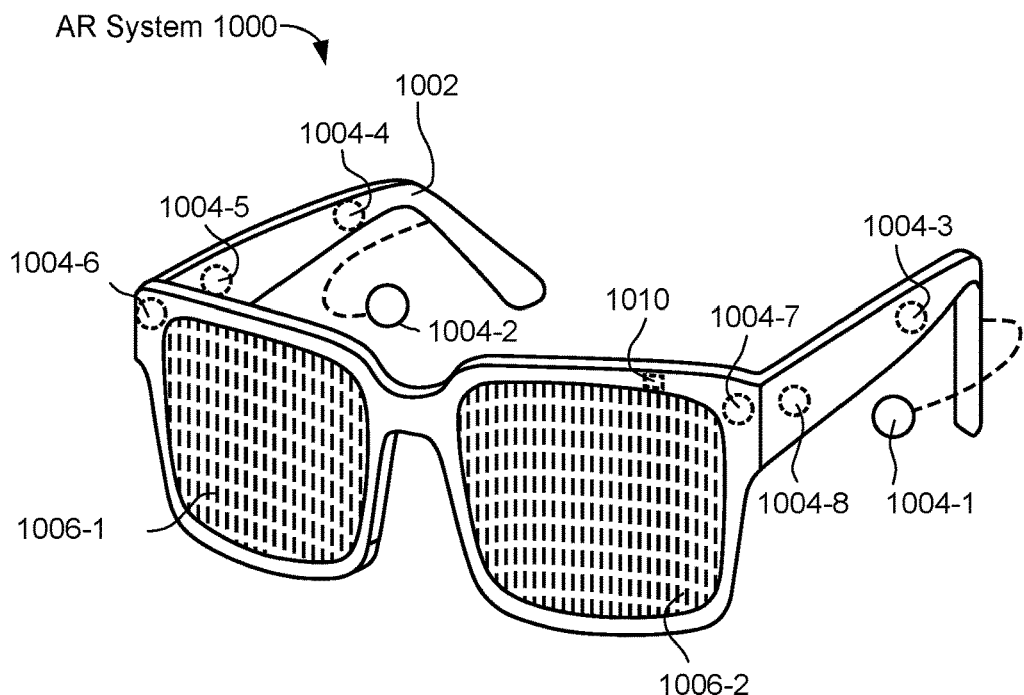
FIGS. 10A-10B illustrate an example AR system in accordance with some embodiments.

FIG. 10A shows an example AR system 1000 in accordance with some embodiments. In FIG. 10A, the AR system 1000 includes an eyewear device with a frame 1002 configured to hold a left display device 1006-1 and a right display device 1006-2 in front of a user's eyes. The display devices 1006-1 and 1006-2 may act together or independently to present an image or series of images to a user. While the AR system 1000 includes two displays, embodiments of this disclosure may be implemented in AR systems with a single near-eye display (NED) or more than two NEDs.

In some embodiments, the AR system 1000 includes one or more sensors, such as the acoustic sensors 1004. For example, the acoustic sensors 1004 can generate measurement signals in response to motion of the AR system 1000 and may be located on substantially any portion of the frame 1002. Any one of the sensors may be a position sensor, an IMU, a depth camera assembly, or any combination thereof. In some embodiments, the AR system 1000 includes more or fewer sensors than are shown in FIG. 10A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1000 includes a microphone array with a plurality of acoustic sensors 1004-1 through 1004-8, referred to collectively as the acoustic sensors 1004. The acoustic sensors 1004 may be transducers that detect air pressure variations induced by sound waves. In some embodiments, each acoustic sensor 1004 is configured to detect sound and convert the detected sound into an electronic format (e.g., an analog or digital format). In some embodiments, the microphone array includes ten acoustic sensors: 1004-1 and 1004-2 designed to be placed inside a corresponding ear of the user, acoustic sensors 1004-3, 1004-4, 1004-5, 1004-6, 1004-7, and 1004-8 positioned at various locations on the frame 1002, and acoustic sensors positioned on a corresponding neckband, where the neckband is an optional component of the system that is not present in certain embodiments of the artificial-reality systems discussed herein.

The configuration of the acoustic sensors 1004 of the microphone array may vary. While the AR system 1000 is shown in FIG. 10A having ten acoustic sensors 1004, the number of acoustic sensors 1004 may be more or fewer than ten. In some situations, using more acoustic sensors 1004 increases the amount of audio information collected and/or the sensitivity and accuracy of the audio information. In contrast, in some situations, using a lower number of acoustic sensors 1004 decreases the computing power required by a controller to process the collected audio information. In addition, the position of each acoustic sensor 1004 of the microphone array may vary. For example, the position of an acoustic sensor 1004 may include a defined position on the user, a defined coordinate on the frame 1002, an orientation associated with each acoustic sensor, or some combination thereof.

The acoustic sensors 1004-1 and 1004-2 may be positioned on different parts of the user's ear. In some embodiments, there are additional acoustic sensors on or surrounding the ear in addition to acoustic sensors 1004 inside the ear canal. In some situations, having an acoustic sensor positioned next to an ear canal of a user enables the microphone array to collect information on how sounds arrive at the ear canal. By positioning at least two of the acoustic sensors 1004 on either side of a user's head (e.g., as binaural microphones), the AR device 1000 is able to simulate binaural hearing and capture a 3D stereo sound field around a user's head. In some embodiments, the acoustic sensors 1004-1 and 1004-2 are connected to the AR system 1000 via a wired connection, and in other embodiments, the acoustic sensors 1004-1 and 1004-2 are connected to the AR system 1000 via a wireless connection (e.g., a Bluetooth connection). In some embodiments, the AR system 1000 does not include the acoustic sensors 1004-1 and 1004-2.

The acoustic sensors 1004 on the frame 1002 may be positioned along the length of the temples, across the bridge of the nose, above or below the display devices 1006, or in some combination thereof. The acoustic sensors 1004 may be oriented such that the microphone array is able to detect sounds in a wide range of directions surrounding the user that is wearing the AR system 1000. In some embodiments, a calibration process is performed during manufacturing of the AR system 1000 to determine relative positioning of each acoustic sensor 1004 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1000 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an AR environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 1000. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1000. For example, the controller may process information from the acoustic sensors 1004. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1000 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 1050 in FIG. 10B, which mostly or completely covers a user's field of view.

Figure 10B:
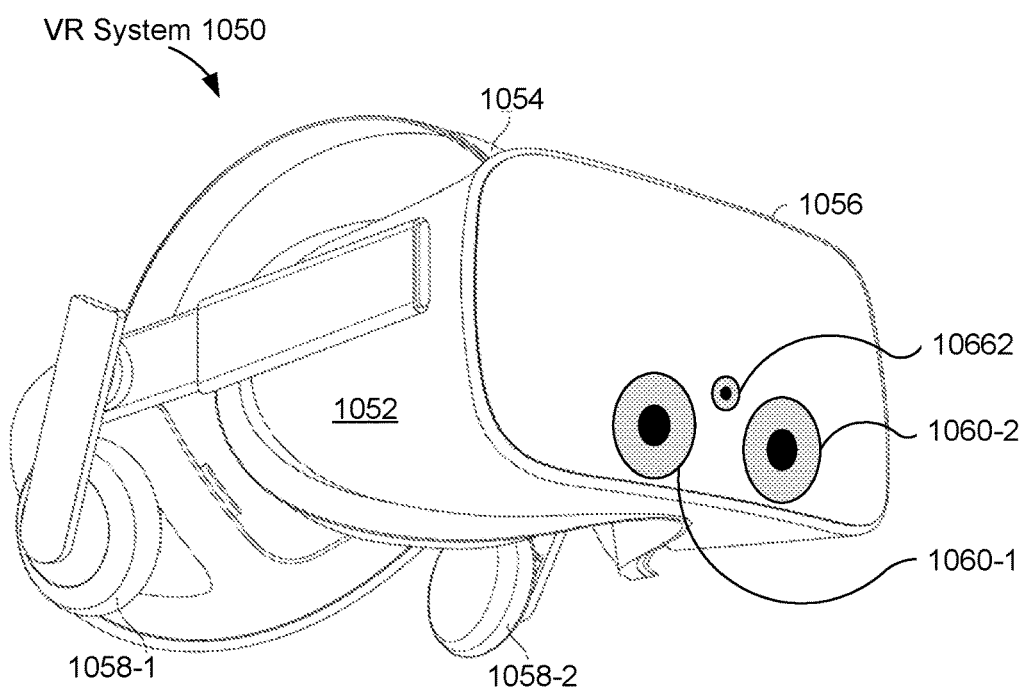

FIG. 10B shows a VR system 1050 (e.g., also referred to herein as VR headsets or VR headset) in accordance with some embodiments. The VR system 1050 includes a head-mounted display (HMD) 1052. The HMD 1052 includes a front body 1056 and a frame 1054 (e.g., a strap or band) shaped to fit around a user's head. In some embodiments, the HMD 1052 includes output audio transducers 1058-1 and 1058-2, as shown in FIG. 10B (e.g., transducers). In some embodiments, the front body 1056 and/or the frame 1054 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 1000 and/or the VR system 1050 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1000 and/or the VR system 1050 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 1000 and/or the VR system 1050 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 10B shows VR system 1050 having cameras 1060-1 and 1060-2 that can be used to provide depth information for creating a voxel field and a two-dimensional mesh to provide object information to the user to avoid collisions. FIG. 10B also shows that the VR system includes one or more additional cameras 1062 that are configured to augment the cameras 1060-1 and 1060-2 by providing more information. For example, the additional cameras 1062 can be used to supply color information that is not discerned by cameras 1060-1 and 1060-2. In some embodiments, cameras 1060-1 and 1060-2 and additional cameras 1062 can include an optional IR cut filter configured to remove IR light from being received at the respective camera sensors.

In some embodiments, the AR system 1000 and/or the VR system 1050 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 10A-10B, but could also be used with other types of wearable devices for sensing neuromuscular signals (such as body-wearable or head-wearable devices that might have neuromuscular sensors closer to the brain or spinal column). The AR system 1000 and/or the VR system 1050 are instances of the head-wearable device 110 and the AR headset 210 described herein, such that the head-wearable device 110 and the AR headset 210 should be understood to have the features of the AR system 1000 and/or the VR system 1050 and vice versa. Having thus described example wrist-wearable device and head-wearable devices, attention will now be turned to example feedback systems that can be integrated into the devices described above or be a separate device.

Example Systems

FIGS. 11A and 11B are block diagrams illustrating an example artificial-reality system in accordance with some embodiments. The system 1100 includes one or more devices for facilitating an interactivity with an artificial-reality environment in accordance with some embodiments. For example, the head-wearable device 1111 (e.g., an instance of the head-wearable device 110 and the AR headset 210) can present to the user 11015 with a user interface within the artificial-reality environment. As a non-limiting example, the system 1100 includes one or more wearable devices, which can be used in conjunction with one or more computing devices. In some embodiments, the system 1100 provides the functionality of a virtual-reality device, an augmented-reality device, a mixed-reality device, hybrid-reality device, or a combination thereof. In some embodiments, the system 1100 provides the functionality of a user interface and/or one or more user applications (e.g., games, word processors, messaging applications, calendars, clocks, etc.).

The system 1100 can include one or more of servers 1170, electronic devices 1174 (e.g., a computer, 1174a, a smartphone 1174b, a controller 1174c, and/or other devices), head-wearable devices 1111 (e.g., the AR system 1000 or the VR system 1050), and/or wrist-wearable devices 1188 (e.g., the wrist-wearable device 188). In some embodiments, the one or more of servers 1170, electronic devices 1174, head-wearable devices 1111, and/or wrist-wearable devices 1188 are communicatively coupled via a network 1172. In some embodiments, the head-wearable device 1111 is configured to cause one or more operations to be performed by a communicatively coupled wrist-wearable device 1188, and/or the two devices can also both be connected to an intermediary device, such as a smartphone 1174b, a controller 1174c, or other device that provides instructions and data to and between the two devices. In some embodiments, the head-wearable device 1111 is configured to cause one or more operations to be performed by multiple devices in conjunction with the wrist-wearable device 1188. In some embodiments, instructions to cause the performance of one or more operations are controlled via an artificial-reality processing module 1145. The artificial-reality processing module 1145 can be implemented in one or more devices, such as the one or more of servers 1170, electronic devices 1174, head-wearable devices 1111, and/or wrist-wearable devices 1188. In some embodiments, the one or more devices perform operations of the artificial-reality processing module 1145, using one or more respective processors, individually or in conjunction with at least one other device as described herein. In some embodiments, the system 1100 includes other wearable devices not shown in FIG. 11A and FIG. 11B, such as rings, collars, anklets, gloves, and the like.

In some embodiments, the system 1100 provides the functionality to control or provide commands to the one or more computing devices 1174 based on a wearable device (e.g., head-wearable device 1111 or wrist-wearable device 1188) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1160. Similar to the motor actions, the one or more processors 1150a can use the detected neuromuscular signals by the one or more sensors 1125a to determine that a user-defined gesture was performed by the user.

The electronic devices 1174 can also include a communication interface 1115e, an interface 1120e (e.g., including one or more displays, lights, speakers, and haptic generators), one or more sensors 1125, one or more applications 1135e, an artificial-reality processing module 1145e, one or more processors 1150e, and memory 1160e (including sensor data 1162e and AR processing data 1164e). The electronic devices 1174 are configured to communicatively couple with the wrist-wearable device 1188 and/or head-wearable device 1111 (or other devices) using the communication interface 1115e. In some embodiments, the electronic devices 1174 are configured to communicatively couple with the wrist-wearable device 1188 and/or head-wearable device 1111 (or other devices) via an application programming interface (API). In some embodiments, the electronic devices 1174 operate in conjunction with the wrist-wearable device 1188 and/or the head-wearable device 1111 to determine a hand gesture and cause the performance of an operation or action at a communicatively coupled device.

The server 1170 includes a communication interface 1115d, one or more applications 1135d, an artificial-reality processing module 1145d, one or more processors 1150d, and memory 1160d (including sensor data 1162d and AR processing data 1164d). In some embodiments, the server 1170 is configured to receive sensor data from one or more devices, such as the head-wearable device 1111, the wrist-wearable device 1188, and/or electronic device 1174, and use the received sensor data to identify a gesture or user input. The server 1170 can generate instructions that cause the performance of operations and actions associated with a determined gesture or user input at communicatively coupled devices, such as the head-wearable device 1111.

The wrist-wearable device 1188 can also include a communication interface 1115a, an interface 1120a (e.g., including one or more displays, lights, speakers, and haptic generators), one or more sensors 1125a, one or more applications 1135a, an artificial-reality processing module 1145a, one or more processors 1150a, and memory 1160a (including sensor data 1162a and AR processing data 1164a). In some embodiments, the wrist-wearable device 1188 includes one or more haptic generators 1121a, one or more imaging devices 1155a (e.g., a camera), microphones, speakers, and/or one or more applications 1135a. The wrist-wearable device 1188 is configured to communicatively couple with one or more electronic devices 1174, head-wearable device 1111, servers 1170 (or other devices) using the communication interface 1115a. In some embodiments, the wrist-wearable device 1188 operates in conjunction with the electronic devices 1174, the head-wearable device 1111, and/or other device to perform the different operations and functions described herein.

The head-wearable device 1111 includes smart glasses (e.g., the augmented-reality glasses), artificial reality headsets (e.g., VR/AR headsets), or other head worn device. In some embodiments, one or more components of the head-wearable device 1111 are housed within a body of the HMD 1114 (e.g., frames of smart glasses, a body of a AR headset, etc.). In some embodiments, one or more components of the head-wearable device 1111 are stored within or coupled with lenses of the HMD 1114. Alternatively or in addition, in some embodiments, one or more components of the head-wearable device 1111 are housed within a modular housing 1106. The head-wearable device 1111 is configured to communicatively couple with other electronic device 1174 and/or a server 1170 using communication interface 1115c as discussed above.

FIG. 11B describes additional details of the HMD 1114 and modular housing 1106 described above in reference to 11A, in accordance with some embodiments.

The HMD 1114 includes a communication interface 1115b, a display 1130, an AR processing module 1145b, one or more processors 1150b, and memory 1160b (including sensor data 1162b and AR processing data 1164b). In some embodiments, the HMD 1114 includes one or more sensors 1125b, one or more haptic generators 1121b, one or more imaging devices 1155b (e.g., a camera), microphones 1113b, speakers 1117b, and/or one or more applications 1135b. The HMD 1114 operates in conjunction with the housing 1106 to perform one or more operations of a head-wearable device 1111, such as capturing camera data, presenting a representation of the image data at a coupled display, operating one or more applications 1135b, and/or allowing a user to participate in an AR environment.

The housing 1106 include(s) a communication interface 1115c, circuitry 1146, a power source 1107c (e.g., a battery for powering one or more electronic components of the housing 1106 and/or providing usable power to the HMD 1114), one or more processors 1150c, and memory 1160c (including sensor data 1162c and AR processing data 1164c). In some embodiments, the housing 1106 can include one or more supplemental components that add to the functionality of the HMD 1114. For example, in some embodiments, the housing 1106 can include one or more sensors 1125c, an AR processing module 1145c, one or more haptic generators 1121c, one or more imaging devices 1155c, one or more microphones 1113c, one or more speakers 1117c, etc. The housing 1106 is configured to couple with the HMD 1114 via the one or more retractable side straps. More specifically, the housing 1106 is a modular portion of the head-wearable device 1111 that can be removed from head-wearable device 1111 and replaced with another housing (which includes more or less functionality). The modularity of the housing 1106 allows a user to adjust the functionality of the head-wearable device 1111 based on their needs.

In some embodiments, the communications interface 1115c is configured to communicatively couple the housing 1106 with the HMD 1114, the server 1170, and/or other electronic device 1174 (e.g., the controller 1174c, a tablet, a computer, etc.). The communication interface 1115c is used to establish wired or wireless connections between the housing 1106 and the other devices. In some embodiments, the communication interface 1115c includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1106 is configured to communicatively couple with the HMD 1114 and/or other electronic device 1174 via an application programming interface (API).

In some embodiments, the power source 1107 (e.g., 1107a, 1107b, and 1107c) is a battery. The power source 1107b can be a primary or secondary battery source for the HMD 1114. In some embodiments, the power source 1107b or 1107c provides useable power to the one or more electrical components of the housing 1106 or the HMD 1114. For example, the power source 1107c can provide usable power to the sensors 1125c, the speakers 1117c, the HMD 1114, and the microphone 1113c. In some embodiments, the power source 1107 is a rechargeable battery. In some embodiments, the power source 1107 is a modular battery that can be removed and replaced with a fully charged battery while it is charged separately.

The one or more sensors 1125 (e.g., 1125a, 1125b, and 1125c) can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU)s. Additional non-limiting examples of the one or more sensors 1125 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1125 are configured to gather additional data about the user (e.g., an impedance of the user's body). Examples of sensor data output by these sensors includes body temperature data, infrared rangefinder data, positional information, motion data, activity recognition data, silhouette detection and recognition data, gesture data, heart rate data, and other wearable device data (e.g., biometric readings and output, accelerometer data). The one or more sensors 1125 can include location sensing devices (e.g., GPS) configured to provide location information. In some embodiment, the data measured or sensed by the one or more sensors 1125 is stored in memory 1160. In some embodiments, the housing 1106 receives sensor data from communicatively coupled devices, such as the HMD 1114, the server 1170, and/or other electronic device 1174. Alternatively, the housing 1106 can provide sensors data to the HMD 1114, the server 1170, and/or other electronic device 1174.

The one or more haptic generators 1121 (e.g., 1121a, 1121b, and 1121c) can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1121 are hydraulic, pneumatic, electric, and/or mechanical actuators. In some embodiments, the one or more haptic generators 1121 are part of a surface of the housing 1106 that can be used to generate a haptic response (e.g., a thermal change at the surface, a tightening or loosening of a band, increase or decrease in pressure, etc.). For example, the one or more haptic generators 1121 can apply vibration stimulations, pressure stimulations, squeeze simulations, shear stimulations, temperature changes, or some combination thereof to the user. In addition, in some embodiments, the one or more haptic generators 1121 include audio generating devices (e.g., speakers 1117c and other sound transducers) and illuminating devices (e.g., light-emitting diodes (LED)s, screen displays, etc.). The one or more haptic generators 1121 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1135 (e.g., 1135a, 1135b, and 1135c) include social-media applications, banking applications, health applications, messaging applications, web browsers, gaming application, streaming applications, media applications, imaging applications, productivity applications, social applications, etc. In some embodiments, the one or more applications 1135 include artificial reality applications. The one or more applications 1135 are configured to provide data to the head-wearable device 1111 for performing one or more operations. In some embodiments, the one or more applications 1135 can be displayed via a display 1130 of the head-wearable device 1111 (e.g., via the HMD 1114).

In some embodiments, instructions to cause the performance of one or more operations are controlled via an artificial reality (AR) processing module 1145 (e.g., 1145a, 1145b, and 1145c). The AR processing module 1145 can be implemented in one or more devices, such as the one or more of servers 1170, electronic devices 1174, head-wearable devices 1111, and/or wrist-wearable devices 11020. In some embodiments, the one or more devices perform operations of the AR processing module 1145, using one or more respective processors, individually or in conjunction with at least one other device as described herein. In some embodiments, the AR processing module 1145 is configured process signals based at least on sensor data. In some embodiments, the AR processing module 1145 is configured process signals based on image data received that captures at least a portion of the user hand, mouth, facial expression, surrounding, etc. For example, the housing 1106 can receive EMG data and/or IMU data from one or more sensors 1125 and provide the sensor data to the AR processing module 1145 for a particular operation (e.g., gesture recognition, facial recognition, etc.). The AR processing module 1145, causes a device communicatively coupled to the housing 1106 to perform an operation (or action). In some embodiments, the AR processing module 1145 performs different operations based on the sensor data and/or performs one or more actions based on the sensor data.

In some embodiments, the AR processing module 1145 (e.g., 1145a, 1145b, and 1145c) is configured to perform one or more operations described herein. For example, the AR processing module 1145 can be configured to detect and determine satisfaction of an augmented-display criterion, render and place an augmented representation of a user interface on a particular surface (e.g., a display of the wrist-wearable device 188), and interaction with the augmented representation of the user interface. In some embodiments, the AR processing module 1145 is configured to perform the above-identified operations based on sensor data from the one or more sensors 1125 and/or image data captured by a communicatively coupled imaging device 128. For example, the head-wearable device can receive IMU data from the one or more sensors 1125 and the AR processing module 1145 can determine whether an augmented-display criterion is satisfied based on the IMU data. In another example, the head-wearable device 110 can receive from the wrist-wearable device 188 EMG data and/or IMU data and the AR processing module 1145 can determine whether an augmented-display criterion is satisfied based on data provided by the wrist-wearable device 188. The AR processing module 1145, based on a determination that augmented-display criterion is satisfied, causes the head-wearable device 110 to present an augmented representation of a UI displayed on an electronic device.

In some embodiments, the one or more imaging devices 1155 (e.g., 1155a, 1155b, and 1155c) can include an ultra-wide camera, a wide camera, a telephoto camera, a depth-sensing cameras, or other types of cameras. In some embodiments, the one or more imaging devices 1155 are used to capture image data and/or video data. The imaging devices 1155c can be coupled to a portion of the housing 1106. The captured image data can be processed and stored in memory and then presented to a user for viewing. The one or more imaging devices 1155 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 1155 is stored in memory 1160 (which can include volatile and non-volatile memory such that the image data and/or video data can be temporarily or permanently stored, as needed depending on the circumstances).

The circuitry 1146 is configured to facilitate the interaction between the housing 1106 and the HMD 1114. In some embodiments, the circuitry 1146 is configured to regulate the distribution of power between the power source 1107c and the HMD 1114. In some embodiments, the circuitry 1146 is configured to transfer audio and/or video data between the HMD 1114 and/or one or more components of the housing 1106.

The one or more processors 1150 (e.g., 1150a, 1150b, and 1150c) can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1160. The memory 1160 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 1150c. The memory 1160 also provides a storage area for data and instructions associated with applications and data handled by the processor 1150.

In some embodiments, the memory 1160 stores at least user data 1161 including sensor data 1162 and AR processing data 1164 (e.g., 1164a, 1164b, and 1164c). The sensor data 1162 includes sensor data monitored by one or more sensors 1125 of the housing 1106 and/or sensor data received from one or more devices communicative coupled with the housing 1106, such as the HMD 1114, the smartphone 1174b, the controller 1174c, etc. The sensor data 1162 can include sensor data collected over a predetermined period of time that can be used by the AR processing module 1145. The AR processing data 1164 can include one or more one or more predefined camera-control gestures, user defined camera-control gestures, predefined non-camera-control gestures, and/or user defined non-camera-control gestures. In some embodiments, the AR processing data 1164 further includes one or more predetermined threshold for different gestures, one or more augmented-display criteria, augmented representation positioning information, as well as other instructions for performing the features of FIGS. 1A-8.

Example Aspects

A few example aspects will now be briefly described.

(A1) In accordance with some embodiments, a method of using a head-wearable device to present an augmented representation of a user interface associated with an electronic device using a head-wearable device to present an augmented representation of a user interface associated with an electronic device is disclosed. The method includes, while a user interface is displayed on a display of an electronic device associated with a user, receiving sensor data from one or more sensors of the electronic device or from a head-wearable device worn by the user that is in communication with the electronic device. The method further includes determining, based at least in part on the sensor data from the one or more sensors, whether an augmented-display criterion is satisfied for the electronic device, and in accordance with a determination that the augmented-display criterion is satisfied, causing presentation, via a display of the head-wearable device, of an augmented representation of the user interface. The augmented-display criterion is satisfied when it is determined that the electronic device is within a field of view of the head-wearable device. The augmented representation of the user interface includes at least one visual characteristic that was not present in the user interface displayed on the electronic device.

(A2) In some embodiments of A1, the method further includes in conjunction with causing presentation of the augmented representation of the user interface via the display of the head-wearable device, causing the display of the electronic device to cease displaying the user interface.

(A3) In some embodiments of any of A1 and A2, the user interface is associated with a first application executing on the electronic device and the method further includes, while causing presentation of the augmented representation via the display of the head-wearable device, receiving, via the electronic device, information associated with an electronic notification from a second application executing on the electronic device, and causing the information associated with the electronic notification to be presented via the display of the head-wearable device.

(A4) In some embodiments of A3, the information associated with the electronic notification is displayed only via the display of the head-wearable device while presentation of the augmented representation via the display of the head-wearable device is ongoing.

(A5) In some embodiments of any of A1-A4, the method further includes receiving updated sensor data from the one or more sensors and in accordance with a determination that the updated sensor data indicates that the augmented-display criterion is no longer satisfied, ceasing to cause presentation of the augmented representation of the user interface via the display of the head-wearable device.

(A6) In some embodiments of any of A1-A5, the method further includes, while an additional electronic device, distinct from the electronic device, is displaying an additional user interface, receiving further sensor data from the one or more sensors, in accordance with a determination that the augmented-display criterion is satisfied for the additional electronic device, causing presentation, via the display of the head-wearable device, of an augmented representation of the additional user interface. The augmented representation of the additional user interface includes at least one visual characteristic that was not present in the additional user interface displayed on the additional electronic device.

(A7) In some embodiments of any of A1-A6, the method further includes, while causing presentation of the augmented representation of the user interface via the display of the head-wearable device, detecting one more electronic devices within the field of view of the head-wearable device, and in response to the detecting, causing presentation via the display of the head-wearable device of one or more controls for activating respective functions of the one more electronic device. The one or more electronic devices either do not have a display or are in a display-off state.

(A8) In some embodiments of any of A1-A7, the method further includes before causing presentation of the augmented representation of the user interface, providing an indication to the user that an augmented representation is available.

(A9) In some embodiments of any of A1-A8, the method further includes, while presenting the augmented representation of the user interface via the display of the head-wearable device, detecting a user input selecting a user interface element from within the augmented representation of the user interface, and responsive to the user input, causing an update to the augmented representation of the user interface based on performance of the input command. The user element is associated with an input command.

(A10) In some embodiments of any of A1-A9, the user interface is associated with a fitness application and initiation of the application causes the head-wearable device to present an augmented representation of a fitness user interface including captured biometric information.

(A11) In some embodiments of any of A1-A9, the user interface is associated with an image viewing application and initiation of the application causes the head-wearable device to present an augmented representation of an image viewing user interface including one or more stored images.

(A12) In some embodiments of A11, the method further includes, while the head-wearable device displays the augmented representation of the image viewing user interface, detecting a user input selecting, via the augmented representation of the image viewing user interface, a user element associated with an image of the one or more stored images and responsive to the user input, presenting an augmented representation of the image selected via the user input. The augmented representation of the image includes a 3-dimensional representation of the image.

(A13) In some embodiments of any of A1-A9, the user interface is associated with an image capturing application and initiation of the application causes the head-wearable device to present an augmented representation of a field of view of an imaging device commutatively coupled with the head-wearable device.

(A14) In some embodiments of A13, the augmented representation of the field of view of the imaging device is a 3-dimensional representation of image data captured by the imaging device communicatively coupled with the head-wearable device.

(A15) In some embodiments of any of A13 and A14, the imaging device is a first imaging device and the head-wearable device is communicatively coupled with a second imaging device, and the method further includes, while the head-wearable device presents the augmented representation of the field of view of the first imaging device, detecting a user input selecting, via the augmented representation of the field of view of the first imaging device, a user element configured to cause the head-wearable device to present an augmented representation of a field of view of the second imaging device and responsive to the user input, presenting the augmented representation of the field of view of the second imaging device.

(A16) In some embodiments of any of A1-A15, the head-wearable device is an artificial reality (AR) headset and the electronic device is a wrist-wearable device and the augmented representation of the user interface is an AR user interface presented to the user in an AR environment via the display of the head-wearable device.

(A17) In some embodiments of any of A1-A16, the sensor data that is used to determine whether the augmented-display criterion is satisfied includes one or more of position and orientation data from an inertial measurement unit, neuromuscular signals detected by an electromyography sensor, and signal-strength data for a communications radio.

(A18) In some embodiments of any of A1-A17, the at least one visual characteristic that was not present in the user interface displayed on the electronic device is one or more of (i) a larger size of the user interface and (ii) one or more additional user interface elements.

(A19) In some embodiments of A18, the at least one visual characteristic is the larger size of the user interface, and the causing presentation of the augmented representation of the user interface includes magnifying the user interface such that it appears, when viewed through the head-wearable device, to be in a region of space that is above the electronic device.

(A20) In some embodiments of A19, the method further incudes repositioning the augmented representation of the user interface, via the display of the head-wearable device, as the electronic device is moved and while the augmented-display criterion remains satisfied, such that the augmented representation of the user interface remains above the electronic device as it is repositioned.

(A21) In some embodiments of A20, the augmented representation of the user interface is oriented and repositioned using spatial positioning.

(A22) In some embodiments of any of A1-A21, the method further includes receiving a gesture that corresponds to a handwritten symbol on the display of the electronic device and, responsive to the handwritten symbol, updating the display of the head-wearable device to present the handwritten symbol. Alternatively, in some embodiments, the handwritten symbol can be detected via a user input provided at the augmented representation of the user interface and updating the augmented representation of the user interface to present the handwritten symbol. Examples of the handwritten symbols are provided above in reference to FIGS. 1K-1L-2.

(B1) In accordance with some embodiments, a wrist-wearable device configured to coordinate presentation of and interaction with a user interface provided to a head-wearable device for augmentation is provided. The wrist-wearable device includes a display, one or more sensors, and one or more processors. The one or more processors are configured to, while a user interface is displayed on the display of a wrist-wearable device, receive sensor data from one or more sensors or from a head-wearable device worn by the user that is in communication with the wrist-wearable device, and determine, based at least in part on the sensor data from the one or more sensors, whether an augmented-display criterion is satisfied for the wrist-wearable device. The augmented-display criterion is satisfied when it is determined that the wrist-wearable device is within a field of view of the head-wearable device. The one or more processors are further configured to in accordance with a determination that the augmented-display criterion is satisfied, cause presentation, via a display of the head-wearable device, of an augmented representation of the user interface. The augmented representation of the user interface includes at least one visual characteristic that was not present in the user interface displayed on the wrist-wearable device.

(B2) In some embodiments of B1, the wrist-wearable device is further configured to perform operations of the wrist-wearable device recited in the method of any of A2-A22.

(C1) In accordance with some embodiments, a head-wearable device configured to coordinate presentation of and interaction with a user interface presented by wrist-wearable device is provided. The head-wearable device includes a heads-up display, one or more sensors, and one or more processors. The one or more processors are configured to, while a user interface is displayed on a display of an electronic device, receive sensor data from one or more sensors of the electronic device or from the head-wearable device worn by the user that is in communication with the electronic device, and determine, based at least in part on the sensor data from the one or more sensors, whether an augmented-display criterion is satisfied for the electronic device. The augmented-display criterion is satisfied when it is determined that the electronic device is within a field of view of the head-wearable device. The one or more processors are further configured to in accordance with a determination that the augmented-display criterion is satisfied, cause presentation, via a display of the head-wearable device, of an augmented representation of the user interface. The augmented representation of the user interface includes at least one visual characteristic that was not present in the user interface displayed on the electronic device.

(C2) In some embodiments of C1, the head-wearable device is further configured to perform operations of the head-wearable device recited in the method of any of A2-A22.

(D1) In accordance with some embodiments, a system for coordinating operation of a head-wearable device and an electronic device to assist a user in interacting with the electronic device is provided. The system includes an electronic device and a head-wearable device. The electronic device includes a display, one or more sensors, and one or more processors. The one or more processors of the electronic device are configured to, while a user interface is displayed on the display of the electronic device, receive sensor data from the one or more sensors or from a head-wearable device worn by the user that is in communication with the wrist-wearable device. The head-wearable device includes a heads-up display, one or more sensors, and one or more processors. The one or more processors of the head-wearable device are configured to, while the user interface is displayed on the display of the electronic device, receive sensor data from one or more sensors of the electronic device or from the head-wearable device worn by the user that is in communication with the electronic device. The system is configured to determine, based at least in part on the sensor data from the one or more sensors, whether an augmented-display criterion is satisfied for the electronic device, and in accordance with a determination that the augmented-display criterion is satisfied, cause presentation, via a display of the head-wearable device, of an augmented representation of the user interface. The augmented representation of the user interface including at least one visual characteristic that was not present in the user interface displayed on the electronic device. The augmented-display criterion is satisfied when it is determined that the electronic device is within a field of view of the head-wearable device (D2) In some embodiments of D1, the system is further configured such that the wrist-wearable device performs operations of the electronic device recited in the method of any of A2-A21 and the head-wearable device performs operations of the head-wearable device recited in the method of any of claims A2-A22.

(E1) In accordance with some embodiments, a wrist-wearable device including means for causing performance of any of A1-A22.

(F1) In accordance with some embodiments, a head-wearable device including means for causing performance of any of A1-A22.

(G1) In accordance with some embodiments, an intermediary device configured to coordinate operations of a wrist-wearable device and a head-wearable device, the intermediary device configured to perform or cause performance of any of A1-A22.

(H1) In accordance with some embodiments, a method for receiving handwritten inputs at a wrist-wearable device and displaying the handwritten inputs using a typeface at a head-wearable device is disclosed. The method includes receiving a hand-drawn gesture at a touch-sensitive display of a wrist-wearable device that is worn by a user. The method also includes determining a character that was drawn by the hand-drawn gesture at the touch-sensitive display. In accordance with a determination that the wrist-wearable device is communicatively coupled with a head-wearable device that is worn by the user, the method includes causing the head-wearable device to present a representation of the character using a predetermined typeface. The method further includes, while the character is presented at the head-wearable device using the predetermined typeface, responsive to sensor data received from the wrist-wearable device indicating that an in-air hand gesture was performed, modifying the representation of the character at the head-wearable device based on the in-air hand gesture.

(H2) In some embodiments of H1, the character that was drawn by the hand-drawn gesture at the touch-sensitive display is determined after receiving a request from the user to present the hand-drawn gesture using the predetermined typeface. The user's hand-drawn gesture can be presented to the user in their handwriting or in the predetermined typeface.

(H3) In some embodiments of H2, the request from the user to present the hand drawn gesture using the predetermined typeface is detected based on another in-air hand gesture detected via the sensors of the wrist-wearable device.

(H4) In some embodiments of any of H1-H3, the predetermined typeface is selected from among a plurality of available predetermined typeface options based on the type of the hand gesture.

(H5) In some embodiments of any of H1-H4, the predetermined typeface is selected from among a plurality of available predetermined typeface options based on a current application that is in focus (e.g., actively used) on either the wrist-wearable device or the head-wearable device.

(H6) In some embodiments of H5, the predetermined typeface is a first predetermined typeface when the current application that is in focus is a messaging application, and the predetermined typeface is a second predetermined typeface that is distinct from the first typeface when the current application that is in focus is a note-taking application.

(H7) In some embodiments of any of H1-H6, causing of the head-wearable device to present the representation of the character using a predetermined typeface also includes causing the heads-wearable device to present the representation of the character using the predetermined typeface within an application for modification by the user using in-air hand gestures detected via the sensors of the wrist-wearable device. For example, the character can be presented in a text box or text field such that a user can modify the presented character.

(H8) In some embodiments of any of H1-H7, the method further includes receiving one more in-air hand gesture that causes the representation of the character, as modified, to be sent to an electronic device that is distinct from the wrist-wearable device.

(H9) In some embodiments of any of H1-H8, the method further includes receiving a second hand-drawn gesture at the touch sensitive display of the wrist-wearable device. The method also further includes determining a second character that was drawn by the second hand-drawn gesture at the touch-sensitive display. The method also further includes causing the head-wearable device to present a representation of the second character using a predetermined typeface in accordance with a determination that the wrist-wearable device is communicatively coupled with a head-wearable device that is worn by the user. The method also further includes, while the second character is presented at the head-wearable device using the predetermined typeface, modifying the representation of the second character at the head-wearable device based on the second in-air hand gesture in response to second sensor data received from the wrist-wearable device indicating that a second in-air hand gesture was performed.

(H10) In some embodiments of any of H1-H9, while modifying the representation of the second character presenting a cursor presented alongside the character such that a position of the cursor dictates a point at which the new character is inserted when another hand gesture is performed (e.g., in-air gesture, surface gesture, etc.).

(H10.5) In some embodiments of H10, the method further includes receiving another user hand gesture and causing the cursor to move based on the hand gesture (e.g., move to the left, right, etc. of the character).

(H11) In some embodiments of any of H1-H10.5, the character is associated with a longer-form phrase and the causing the head-wearable device to present the representation of the character includes causing the head-wearable device to present a representation of the longer-form phrase using the predetermined typeface.

(H12) In some embodiments of any of H1-H11, the sensor data is a neuromuscular signal data sensed based on neuromuscular signals travelling through a user's wrist.

(I1) In accordance with some embodiments, a head-wearable device for displaying a hand-drawn gesture with a predetermined typeface, the head-wearable device configured to perform or cause performance of the method of any of H1-H12.

(D1) In accordance with some embodiments, a system for receiving a hand-drawn gesture at a wrist-wearable device and displaying the hand-drawn gesture with a predetermined typeface at a head-wearable device, the system configured to perform or cause performance of the method of any of H1-H12.

(E1) In accordance with some embodiments, non-transitory, computer-readable storage medium including instructions that, when executed by a head-wearable device, a wrist-wearable device, and/or an intermediary device in communication with the head-wearable device and/or the wrist-wearable device, cause performance of the method of any of H1-H12.

(F1) In another aspect, a means on a wrist-wearable device, head-wearable device, and/or intermediary device for performing or causing performance of the method of any of H1-H12.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer readable storage medium associated with a head-wearable device to present an augmented representation of a user interface associated with an electronic device, the non-transitory computer readable storage medium including instructions that, when executed by one or more processors of a head-wearable device, cause the head-wearable device to:
   while a user interface is displayed on a display of an electronic device associated with a user, receive sensor data from one or more sensors of the electronic device or from a head-wearable device worn by the user that is in communication with the electronic device;
   determine, based at least in part on the sensor data from the one or more sensors, whether an augmented-display criterion is satisfied for the electronic device, wherein the augmented-display criterion is satisfied when it is determined that the electronic device is within a field of view of the head-wearable device;
      in accordance with a determination that the augmented-display criterion is satisfied, cause presentation, via a display of the head-wearable device, of an augmented representation of the user interface, the augmented representation of the user interface including at least one visual characteristic that was not present in the user interface displayed on the electronic device; and
   before causing presentation of the augmented representation of the user interface, provide an indication to the user that an augmented representation is available.

2. The non-transitory computer readable storage medium of claim 1, further comprising instructions that cause the head-wearable device to:
   in conjunction with causing presentation of the augmented representation of the user interface via the display of the head-wearable device, cause the display of the electronic device to cease displaying the user interface.

3. The non-transitory computer readable storage medium of claim 1, wherein the user interface is associated with a first application executing on the electronic device, and including instructions that cause the head-wearable device to:
   while causing presentation of the augmented representation via the display of the head-wearable device:
      receive, via the electronic device, information associated with an electronic notification from a second application executing on the electronic device; and
      cause the information associated with the electronic notification to be presented via the display of the head-wearable device.

4. The non-transitory computer readable storage medium of claim 3, wherein the information associated with the electronic notification is displayed only via the display of the head-wearable device while presentation of the augmented representation via the display of the head-wearable device is ongoing.

5. The non-transitory computer readable storage medium of claim 1, further comprising instructions that cause the head-wearable device to:
   receive updated sensor data from the one or more sensors; and
   in accordance with a determination that the updated sensor data indicates that the augmented-display criterion is no longer satisfied, cease to cause presentation of the augmented representation of the user interface via the display of the head-wearable device.

6. The non-transitory computer readable storage medium of claim 1, further comprising instructions that cause the head-wearable device to:
   while causing presentation of the augmented representation of the user interface via the display of the head-wearable device:
      detect one or more electronic devices within the field of view of the head-wearable device, wherein the one or more electronic devices either do not have a display or are in a display-off state; and
      in response to the detecting, cause presentation via the display of the head-wearable device of one or more controls for activating respective functions of the one more electronic devices.

7. The non-transitory computer readable storage medium of claim 1, wherein the user interface is associated with a fitness application and initiation of the application causes the head-wearable device to present an augmented representation of a fitness user interface including captured biometric information.

8. The non-transitory computer readable storage medium of claim 1:
   wherein the head-wearable device is an artificial reality (AR) headset and the electronic device is a wrist-wearable device; and
   wherein the augmented representation of the user interface is an AR user interface presented to the user in an AR environment via the display of the head-wearable device.

9. The non-transitory computer readable storage medium of claim 8, further comprising instructions that cause the head-wearable device to:
   while the head-wearable device displays the augmented representation of the user interface:
      detect a user input selecting, via the augmented representation of the user interface, a user element associated with an image of one or more stored images; and
      responsive to the user input, present an augmented representation of the image selected via the user input, wherein augmented representation of the image includes a 3-dimensional representation of the image.

10. The non-transitory computer readable storage medium of claim 1, wherein the at least one visual characteristic that was not present in the user interface displayed on the electronic device is one or more of (i) a larger size of the user interface and (ii) one or more additional user interface elements.

11. The non-transitory computer readable storage medium of claim 10, wherein the at least one visual characteristic is the larger size of the user interface, and the causing presentation of the augmented representation of the user interface includes magnifying the user interface such that it appears, when viewed through the head-wearable device, to be in a region of space that is above the electronic device.

12. The non-transitory computer readable storage medium of claim 10, further comprising instructions that cause the head-wearable device to:
reposition the augmented representation of the user interface, via the display of the head-wearable device, as the electronic device is moved and while the augmented-display criterion remains satisfied, such that the augmented representation of the user interface remains above the electronic device as it is repositioned.

13. The non-transitory computer readable storage medium of claim 1, further comprising instructions that cause the head-wearable device to:
receive a hand-drawn gesture at a touch-sensitive display of a wrist-wearable device that is worn by a user;
determine a character that was drawn by the hand-drawn gesture at the touch-sensitive display;
in accordance with a determination that the wrist-wearable device is communicatively coupled with a head-wearable device that is worn by the user, cause the head-wearable device to present a representation of the character using a predetermined typeface; and
while the character is presented at the head-wearable device using the predetermined typeface, responsive to sensor data received from the wrist-wearable device indicating that an in-air hand gesture was performed, modify the representation of the character at the head-wearable device based on the in-air hand gesture.

14. A head-wearable device configured to coordinate presentation of and interaction with a user interface presented by wrist-wearable device, the head-wearable device comprising:
a heads-up display;
one or more sensors; and
one or more processors configured to:
while a user interface is displayed on a display of an electronic device, receive sensor data from one or more sensors of the electronic device or from the head-wearable device worn by the user that is in communication with the electronic device;
determine, based at least in part on the sensor data from the one or more sensors, whether an augmented-display criterion is satisfied for the electronic device, wherein the augmented-display criterion is satisfied when it is determined that the electronic device is within a field of view of the head-wearable device;
in accordance with a determination that the augmented-display criterion is satisfied, cause presentation, via a display of the head-wearable device, of an augmented representation of the user interface, the augmented representation of the user interface including at least one visual characteristic that was not present in the user interface displayed on the electronic device; and
before causing presentation of the augmented representation of the user interface, provide an indication to the user that an augmented representation is available.

15. The head-wearable device of claim 14, wherein the user interface is associated with a first application executing on the electronic device, and
the one or more processors are further configured to:
while causing presentation of the augmented representation via the display of the head-wearable device:
receive, via the electronic device, information associated with an electronic notification from a second application executing on the electronic device; and
cause the information associated with the electronic notification to be presented via the display of the head-wearable device.

16. The head-wearable device of claim 14, wherein the one or more processors are further configured to:
while causing presentation of the augmented representation of the user interface via the display of the head-wearable device:
detect one or more electronic devices within the field of view of the head-wearable device, wherein the one or more electronic devices either do not have a display or are in a display-off state; and
in response to the detecting, cause presentation via the display of the head-wearable device of one or more controls for activating respective functions of the one more electronic devices.

17. The head-wearable device of claim 14, wherein the one or more processors are further configured to:
reposition the augmented representation of the user interface, via the display of the head-wearable device, as the electronic device is moved and while the augmented-display criterion remains satisfied, such that the augmented representation of the user interface remains above the electronic device as it is repositioned.

18. A method of using a head-wearable device to present an augmented representation of a user interface associated with an electronic device, the method comprising:
while a user interface is displayed on a display of an electronic device associated with a user, receiving sensor data from one or more sensors of the electronic device or from a head-wearable device worn by the user that is in communication with the electronic device;
determining, based at least in part on the sensor data from the one or more sensors, whether an augmented-display criterion is satisfied for the electronic device, wherein the augmented-display criterion is satisfied when it is determined that the electronic device is within a field of view of the head-wearable device;
in accordance with a determination that the augmented-display criterion is satisfied, causing presentation, via a display of the head-wearable device, of an augmented representation of the user interface, the augmented representation of the user interface including at least one visual characteristic that was not present in the user interface displayed on the electronic device; and
before causing presentation of the augmented representation of the user interface, provide an indication to the user that an augmented representation is available.

19. The method of claim 18, wherein the user interface is associated with a first application executing on the electronic device, and
the method further comprises:
while causing presentation of the augmented representation via the display of the head-wearable device:
receiving, via the electronic device, information associated with an electronic notification from a second application executing on the electronic device; and
causing the information associated with the electronic notification to be presented via the display of the head-wearable device.

20. The method of claim 18, further comprising:
while causing presentation of the augmented representation of the user interface via the display of the head-wearable device:
detecting one or more electronic devices within the field of view of the head-wearable device, wherein the one or more electronic devices either do not have a display or are in a display-off state; and in response to the detecting, causing presentation via the display of the head-wearable device of one or more controls for activating respective functions of the one more electronic devices.

\* \* \* \* \*